Dec. 6, 1960 J. O. McDONOUGH ET AL 2,963,137

CONTROLS FOR A TYPEWRITER AND ASSOCIATED APPARATUS

Filed Aug. 30, 1956 15 Sheets-Sheet 1

INVENTORS.
James O. McDonough
Alfred K. Susskind
Herbert P. Grossimon
Francis F. Lee
By: Carlson, Pitzner, Hubbard & Wolfe
Attys.

Dec. 6, 1960 J. O. McDONOUGH ET AL 2,963,137

CONTROLS FOR A TYPEWRITER AND ASSOCIATED APPARATUS

Filed Aug. 30, 1956 15 Sheets-Sheet 2

INVENTORS.
James O. McDonough
Alfred K. Susskind
Herbert P. Grossimon
By: Francis F. Lee
Carlson, Pitzner, Hubbard & Wolfe
Attys.

Fig. 5.

| COL. NO. | 1 | 2 | 3 | 4 | 5 | 6 |
|---|---|---|---|---|---|---|
| COL. FUNCTION | X FUNCTION & TIME | A AXIS SIGN & DISTANCE | B AXIS SIGN & DISTANCE | C AXIS SIGN & DISTANCE | D AXIS SIGN & DISTANCE | E AXIS SIGN & DISTANCE |
| | X05 | | | | | |
| | X04 | | | | | |
| | S20 | +S350235 | -SS59870 | +SS87655 | -S103450 | +SSSS785 |
| | S50 | pSS51420 | pSS62655 | SSSSSSS0 | MS506285 | SSSSSSS0 |
| | 100 | MS706200 | +S128310 | SSSSSSS0 | -S898265 | SSSSSSS0 |
| | SS5 | -SS18955 | +SS10000 | SSSSSSS0 | pSS88880 | SSSSSSS0 |
| | X27 | | | | | |
| | SS2 | +SSSS565 | +SS36590 | SSSSSSS0 | +SSS7850 | SSSSSSS0 |
| | S10 | +S112345 | -SS54965 | SSSSSSS0 | -SSS9600 | SSSSSSS0 |
| | SS5 | SSSSSSS0 | -SS64980 | SSSSSSS0 | -SSSS805 | SSSSSSS0 |
| | X46 | | | | | |
| | SS2 | +SS18540 | | +SSS6285 | | SSSSSSS0 |
| | S10 | -S106125 | | +SS10000 | | SSSSSSS0 |
| | X35 | | | | | |
| | 100 | +S900000 | -SS89230 | | +S218675 | |
| | SS5 | pSS76540 | pSS16285 | | MSSSS555 | |
| | 100 | p1820000 | SSSSSSS0 | | SSSSSSS0 | |
| | X36 | | | | | |
| | 200 | -3640280 | +S510685 | | | +SS97825 |
| | S50 | pS710005 | SSSSSSS0 | | | SSSSSSS0 |
| | X45 | | | | | |
| | S20 | +S183450 | | -SS96430 | +S112435 | |
| | S10 | MSS20640 | | SSSSSSS0 | +SS56290 | |
| | X00 | | | | | |

Fig. 7

| KEY PRESSED | CODING RELAYS ENERGIZED | | | | | | TYPEWRITER PRINTS OR ACTS | PATTERN PUNCHED IN TAPE — COLUMN — | | | | | | | |
|---|---|---|---|---|---|---|---|---|---|---|---|---|---|---|---|
| | R1 | R2 | R3 | R4 | R5 | R6 | | 5 | 4 | 3 | • | 2 | 1 | 6 | 7 |
| 1 | | X | | | X | | 1 | O | | | • | O | | | |
| 2 | X | X | X | | | X | 2 | | | O | • | O | O | O | |
| 3 | X | X | | | | X | 3 | | | | • | O | O | O | |
| 4 | X | | X | | | X | 4 | | | O | • | | O | O | |
| 5 | X | | | X | | X | 5 | | O | | • | | O | O | |
| 6 | X | | X | X | | X | 6 | | O | O | • | | O | O | |
| 7 | X | X | | X | | X | 7 | | O | | • | O | O | O | |
| 8 | X | | | | | X | 8 | | | | • | | O | O | |
| 9 | X | X | | X | X | | 9 | O | O | | • | O | O | | |
| 0 | X | X | X | X | X | | 0 | O | O | O | • | O | O | | |
| OR | | | OR | | | | OR | | | | OR | | | | |
| | | | X | | | | SPACE | | | O | • | | | | |
| + | | X | | X | | X | + | | O | | • | O | | O | |
| − | | X | | | | X | − | | | | • | O | | O | |
| P | | X | X | | X | | P | O | | O | • | O | | | |
| M | | | X | X | X | | M | O | O | O | • | | | | |
| X | X | | X | X | X | | X | O | O | O | • | | O | | |
| TAB. | | X | | | X | X | TABULATE | O | | | • | O | | O | |
| OR | | | OR | | | | OR | | | | OR | | | | |
| | | | X | | X | X | CARRIAGE RET. | O | | O | • | | | O | |

INVENTORS.
James O. McDonough
Alfred K. Susskind
Herbert P. Grossimon
By: Francis F. Lee
Carlson, Pitzner, Hubbard & Wolfe
Attys.

INVENTORS.
James O. McDonough
Alfred K. Susskind
Herbert P. Grossimon
Francis F. Lee
By: Carlson, Pitzner, Hubbard & Wolfe
Attys.

Dec. 6, 1960 J. O. McDONOUGH ET AL 2,963,137

CONTROLS FOR A TYPEWRITER AND ASSOCIATED APPARATUS

Filed Aug. 30, 1956 15 Sheets-Sheet 5

INVENTORS
James O. McDonough
Alfred K. Susskind
Herbert P. Grossimon
Francis F. Lee
By: Carlson, Pitzner, Hubbard & Wolfe
Attys.

CONTROLS FOR A TYPEWRITER AND ASSOCIATED APPARATUS

Filed Aug. 30, 1956 15 Sheets-Sheet 6

INVENTORS
James O. McDonough
Alfred K. Susskind
Herbert P. Grossimon
Francis F. Lee
By
Attys.

INVENTORS.
James O. McDonough
Alfred K. Susskind
Herbert P. Grossimon
Francis J. Lee
By: Carlson, Pitzner, Hubbard & Wolfe
Attys.

CONTROLS FOR A TYPEWRITER AND ASSOCIATED APPARATUS

Filed Aug. 30, 1956 15 Sheets-Sheet 8

INVENTORS.
James O. McDonough
Alfred K. Susskind
Herbert P. Grossimon
Francis F. Lee
By: Carlson, Pitzner, Hubbard & Wolfe
Attys.

CONTROLS FOR A TYPEWRITER AND ASSOCIATED APPARATUS

Filed Aug. 30, 1956

15 Sheets-Sheet 9

INVENTORS.
James O. McDonough
Alfred K. Susskind
Herbert P. Grossimon
Francis F. Lee
By: Carlson, Pitzner, Hubbard & Wolfe
Attys Dec. 6, 1960 J. O. McDONOUGH ET AL 2,963,137

CONTROLS FOR A TYPEWRITER AND ASSOCIATED APPARATUS

Filed Aug. 30, 1956 15 Sheets-Sheet 10

INVENTORS.
James O. McDonough
Alfred K. Susskind
Herbert P. Grossimon
Francis F. Lee
By: Carlson, Pitzner, Hubbard & Wolfe
Attys.

INVENTORS.
James O. McDonough
Alfred K. Susskind
Herbert P. Grossimon
Francis F. Lee
By: Carlson, Pitzner, Hubbard & Wolfe
Attys.

INVENTORS.
James O. McDonough
Alfred K. Susskind
Herbert P. Grossimon
Francis F. Lee
By: Carlson, Pitzner, Hubbard & Wolfe
Attys.

INVENTORS.
James O. McDonough
Alfred K. Susskind
Herbert P. Grossimon
Francis F. Lee
By: Carlson, Pitzner, Hubbard & Wolfe
Attys.

CONTROLS FOR A TYPEWRITER AND ASSOCIATED APPARATUS

Filed Aug. 30, 1956 15 Sheets-Sheet 14

INVENTORS.
James O. McDonough
Alfred K. Susskind
Herbert P. Grossimon
Francis F. Lee
By: Carlson, Pitzner, Hubbard & Wolfe
Attys.

CONTROLS FOR A TYPEWRITER AND ASSOCIATED APPARATUS

INVENTORS.
James O. McDonough
Alfred K. Susskind
Herbert P. Grossimon
By: Francis F. Lee
Carlson, Pitzner, Hubbard & Wolfe
Attys 2,963,137

CONTROLS FOR A TYPEWRITER AND ASSOCIATED APPARATUS

James O. McDonough and Alfred K. Susskind, Concord, and Herbert P. Grossimon, Arlington, Mass., and Francis F. Lee, Norristown, Pa., assignors to Giddings & Lewis Machine Tool Company, Fond du Lac, Wis., a corporation of Wisconsin Filed Aug. 30, 1956, Ser. No. 607,175

47 Claims. (Cl. 197—1)

This invention relates in general to the control of typewriters and associated apparatus and, more particularly, to the control and operation of a typewriter on which is printed numerical information which at the same time is put onto a digital record for subsequent use in a "computer" type of digital processing apparatus. The present invention finds advantageous, but not exclusive use in the preparation of coded digital records, and corresponding manuscripts, for use in the operation of numerical machine tool controls of the type described and claimed in applicants' copending application Serial No. 589,491, filed June 5, 1956, and assigned to the assignee of the present invention.

In the operation of digital data processing apparatus, the information to be processed must be first put in some code or "language" which the apparatus can accept. A great mass of data must often be reduced to some form of coded digital record, preferably one which uses a binary or coded binary system of notation, since that is the "language" which is best accepted by electric and electronic logic circuits. In preparing the data to be processed, the instructions or operations are progressively reduced to a series of routine manipulations requiring little judgment but concentrated attention to minute details of accuracy. A slip of the finger causing one number to be substituted for another could result in an error which would totally change the result obtained.

For example, in the preparation of a record to have serially spaced binary coded digits representing numerical values of time, distance, signs and special codes for the control of a machine tool, if the operator becomes so bored by the routine that his attention lags, one slight mistake such as the omission of one digit or the transposition of two digits could mean a ruined workpiece, when the processed data is later used to actually control a machine tool to cut a shape which was defined by the original numerical data. One slip by the operator in preparing the digital record could thus mean the loss of many dollars in wasted time and materials.

Moreover, it is possible that the person, often called the "program engineer," who makes up the original numerical data might make some slip or mistake, with the same undesirable consequences, unless that mistake is detected and corrected before the data is actually processed and employed in controlling the motions of a machine tool.

It is the general aim of the present invention to make the preparation of a digital record from numerical data so convenient that the operator is not apt to make errors and so foolproof that virtually no digital record can be prepared which reflects obvious errors on the part of the operator or the person who prepared the original numerical data.

It is an important object of the invention to relieve the operator of digital record preparation equipment from any necessity of consciously executing some routine operations, by causing those operations to be performed automatically when conditions so require.

Still another object is the provision of means for preparing a digital record in response to "typing in" of data on a keyboard together with means for printing a manuscript having a format which makes it convenient to read and check in decimal terms the data which has actually been placed on the digital record.

In a desirable form, numerical data is placed on the record by a plural-place coded binary notation for each decimal digit, sign, or special symbol, a group of serially spaced digits representing one component of an increment of movement, serially spaced groups forming one block representing an increment of movement, and serially spaced blocks representing successive increments of movement. To permit data processing equipment to recognize the end of one group of serially spaced digits and the beginning of another, i.e., the end of one numerical component and the beginning of another, a special coded symbol is interposed between successive groups, and in accordance with the present invention, the manuscript is type so that successive groups of decimal digits are placed in successive columns on the manuscript. This is done by making a manuscript printing typewriter tabulate from one column to another when one group of digits has been completed and this, in turn, results in the components along the several axes of motion for successive increments being alined in the same column of the manuscript. It becomes necessary, therefore, to cause the typewriter to tabulate between successive columns and to effect a return motion of its carriage between successive lines on the manuscript, this action of the typewriter also causing special binary coded symbols to be placed on the digital record.

It is another object of the invention to cause the manuscript typewriter to automatically tabulate between successive columns of the manuscript or to execute a carriage return motion, while the associated digital record preparation apparatus at the same time creates the corresponding special codes on the record, in response to the actuation of but a single key on the keyboard. This totally eliminates any burden on the part of an operator to decide whether at the end of any particular column the typewriter should be made to tabulate or to return its carriage, since the operator actuates only one key in either case and the typewriter and record preparation equipment perform the proper one of two functions.

A further object is to make the preparation of a digital record and corresponding manuscript especially convenient by providing means for causing the typewriter to print a predetermined number of a particular character, and to execute a tabulate or carriage return action in response to the single actuation of a control key at the beginning of that particular column. This, as will be explained, lets the operator, in effect, type "zero" in eight digit places by pressing a key once, if the number to be placed in any column is zero.

It is still another object of the invention to make certain that a manuscript typewriter and associated digital record preparation apparatus execute the function corresponding to respective ones of keys on a keyboard, even though the keys may be depressed only for a very short instant which is less than the time required for the execution of the corresponding function.

Another object is to automatically check the numerical times, distances and special codes as they are typed into the typewriter and placed on the digital record, providing an indication or an alarm in the event that certain impossible or erroneous combinations are called for.

In this connection, it is a more specific object to indicate if the time period for processing any block of information as numerically typed into the typewriter is less than the minimum time in which the data processing equipment is able to act, such indication being obtained from a comparison of time multiplier codes with numerical times programmed.

As has been generally indicated, various time periods may be numerically designated, and various distances may be numerically designated on the digital record, the ratio of the distance to the time representing a velocity, specfically the feed rate at which a machine tool component will be caused to move when controlled from the data processing equipment. Machine tools inherently have maximum feed rates or velocities for their movable elements. Accordingly, it is another important object of the invention to monitor each numerical time period called for as it is put into the digital record preparation equipment, and to monitor each distance called for to be traversed by the machine tool during that time period, the monitoring resulting in an indication or an alarm if the ratio of any time to any distance exceeds the maximum feed rate of the machine tool which is to be ultimately controlled.

Still another object is to provide in a control for a typewriter and an associated digital record preparation device, an automatic check to indicate if the first and last digit character typed in any of a plurality of columns, and thus the first and last coded binary symbols punched in the first and last positions of any of a plurality of serially spaced groups of coded binary digits, is anything but one of a selected group of permissible characters or code representations. In a specific sense, it is an object of the invention to indicate or provide an alarm if the first character typed at the beginning of a column which is to contain numerical distance information is not a representation of the sign of the number which is to follow.

A further object of the invention is to automatically check and provide an indication if the last digit typed in any of a plurality of successive columns, and the corresponding binary code appearing at the end of each of a plurality of successive binary code groups is not one of several permissible values. In a more specific sense, it is an object to check and indicate if the last digit typed in a distance number is neither a "0" nor a "5," and thus a value which cannot be processed accurately due to inherent limitations in the capacity of the data processing equipment which is to utilize the digital record.

Still another object is to provide means for checking and for indicating if the number of numerical digits typed in each of a plurality of succeeding columns, and thus the number of coded binary digits appearing in each of a plurality of successive groups on a digital record, exceeds a predetermined number which is beyond the capacity of the processing equipment with which the digital record is to be subsequently employed.

An additional object of the invention is to provide means for comparing the ratios of numerical time and distance information typed on a typewriter and correspondingly represented on a digital record, and to provide a special symbol or code representation on the digital record if the ratio of any distance to a corresponding time represents a velocity which is more than a predetermined percentage of the maximum velocity of the movable element which is ultimately to be controlled according to that numerical information. This automatic recordation of the special signal on the digital record is especially useful to prevent the maximum velocity of a machine tool element from being exceeded, if the data processing equipment is set to scale down the programmed time periods and thus proportionately increase the feed rates required of the machine tool elements.

Finally, it is an object of the invention to simplify and render more convenient the typing of numerical information onto a manuscript (and the simultaneous preparation of a corresponding digital record representing numerical information) by eliminating the need for both a "0" key and a "space" key on a keyboard by causing the actuation of a single key to print spaces on the manuscript except after a significant digit, when the actuation of that key then automatically causes zeros to be printed.

Other objects and advantages will become apparent as the following description proceeds, taken in conjunction with the accompanying drawings, in which:

Fig. 5 depicts an exemplary manuscript printed by the typewriter;

Fig. 7 is a chart illustrating the binary digital code employed on the digital record, as well as coding combination of certain relays energized in response to actuation of respective keys on the auxiliary keyboard;

Figure 9:
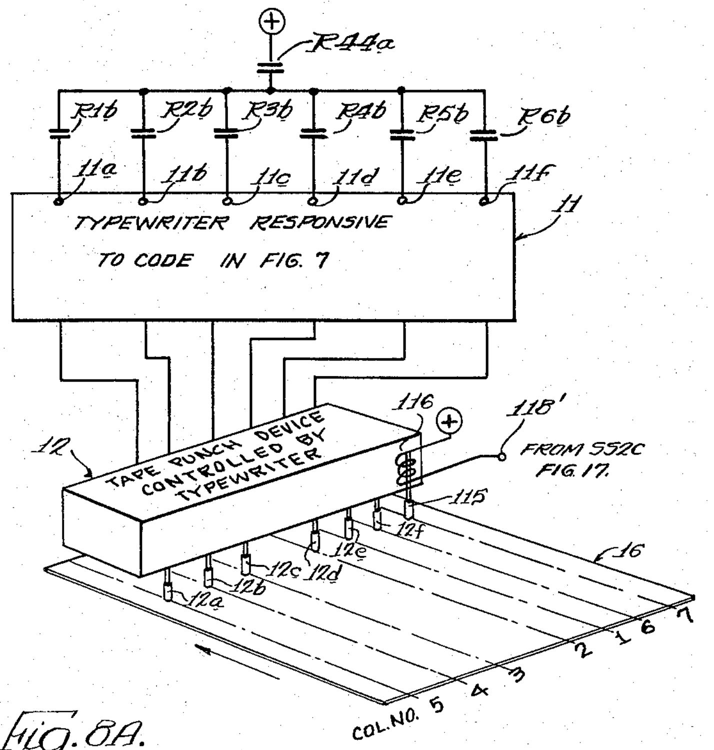
Figure 8A:
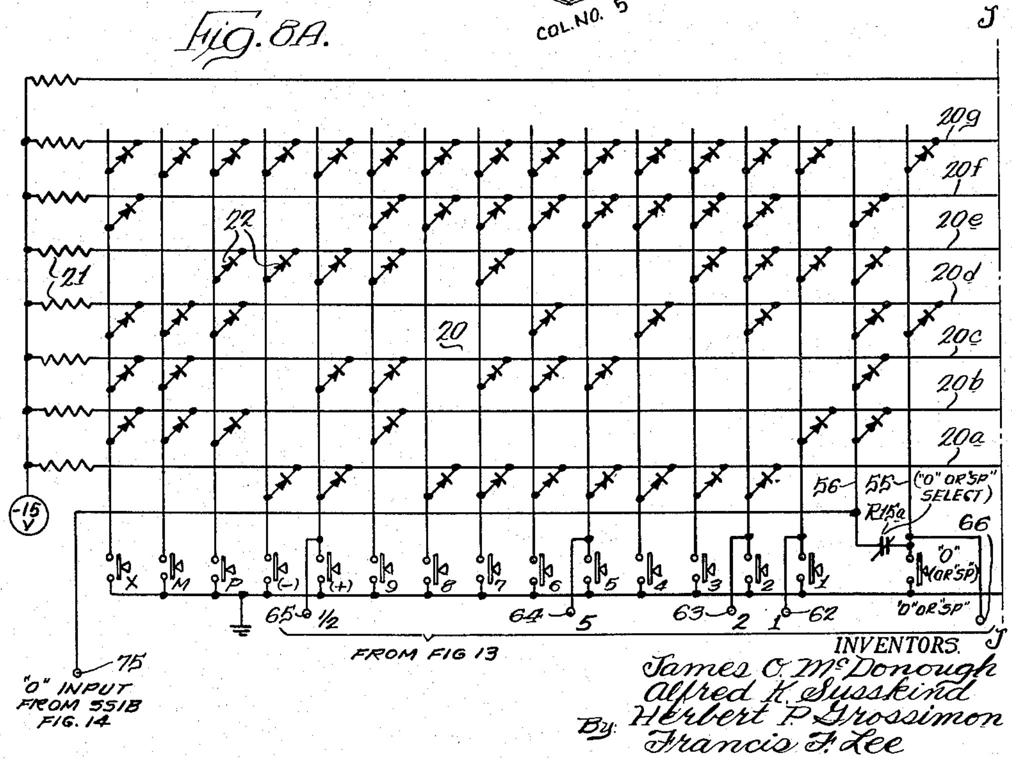
Figure 8B:
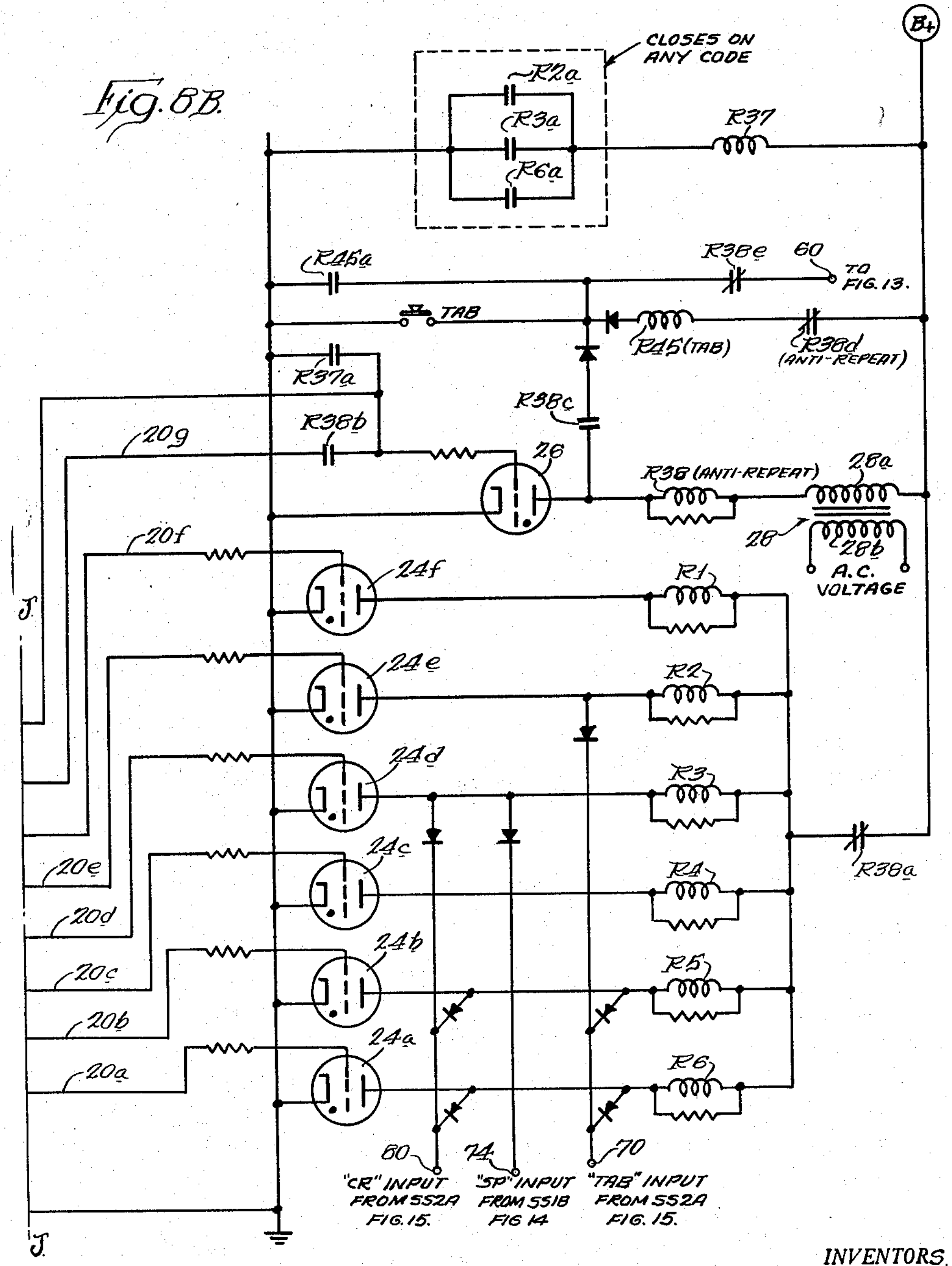
Figure 10:
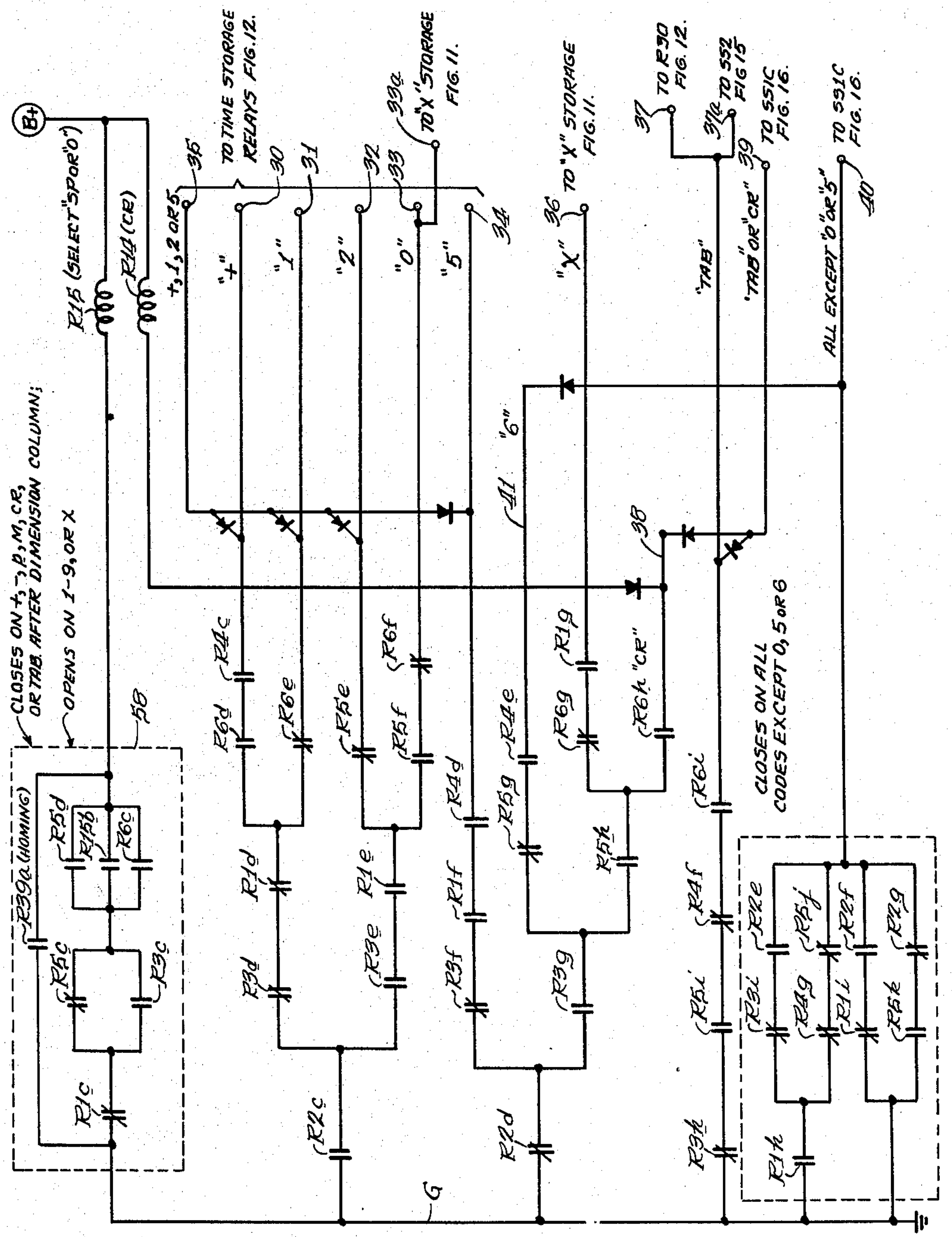
Figure 11:
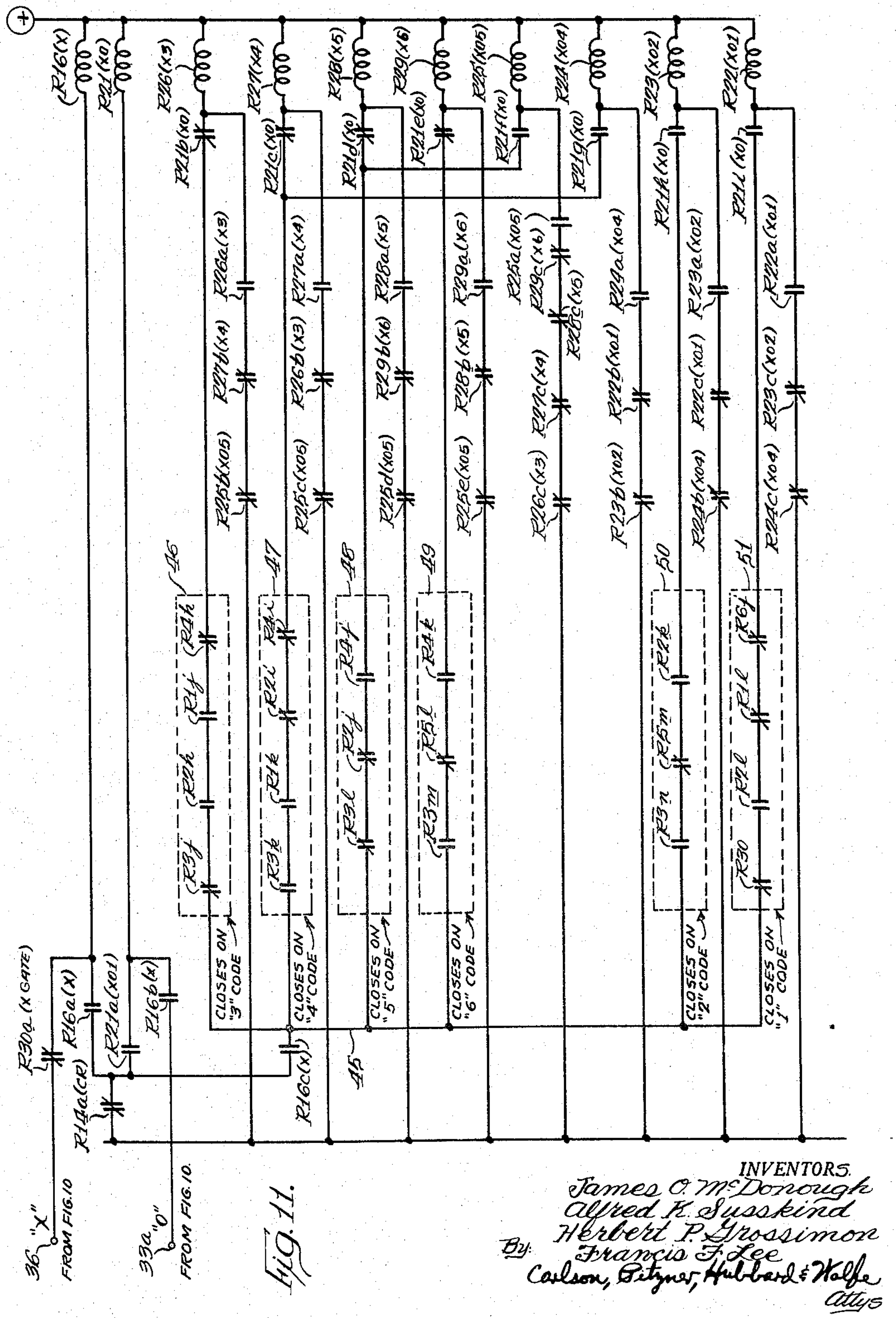
Figure 12:
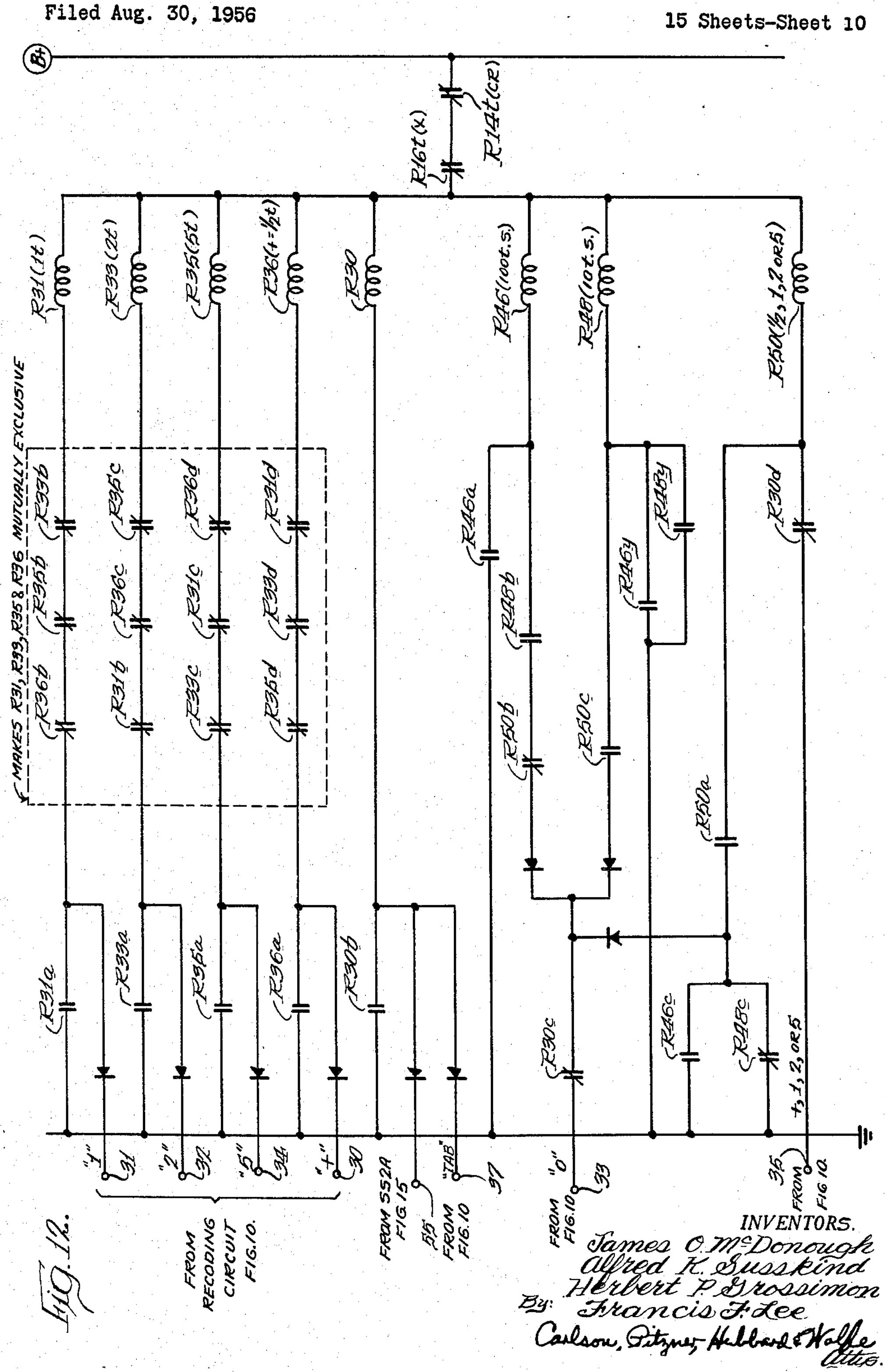
Figure 13:
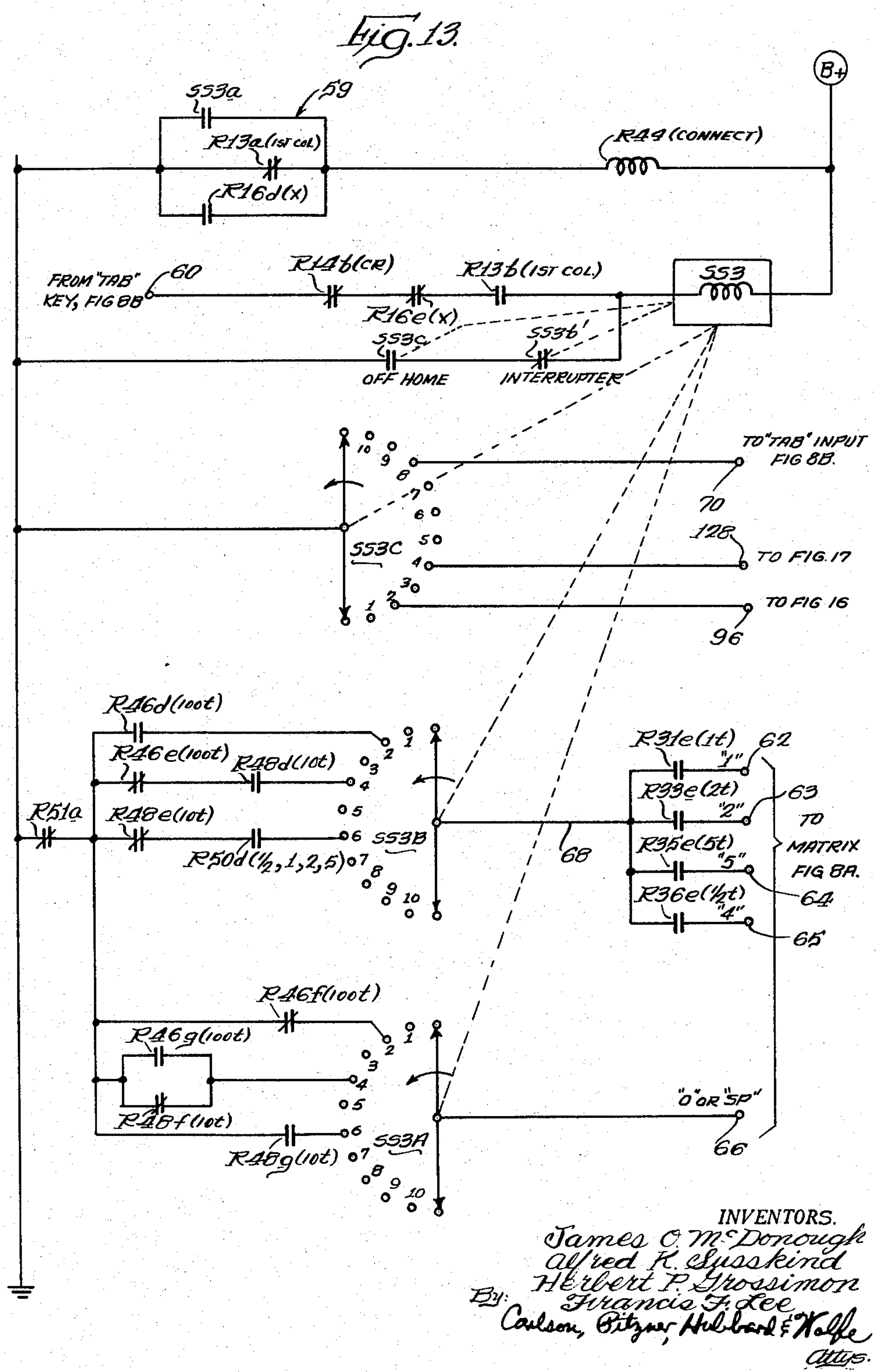
Figure 14:
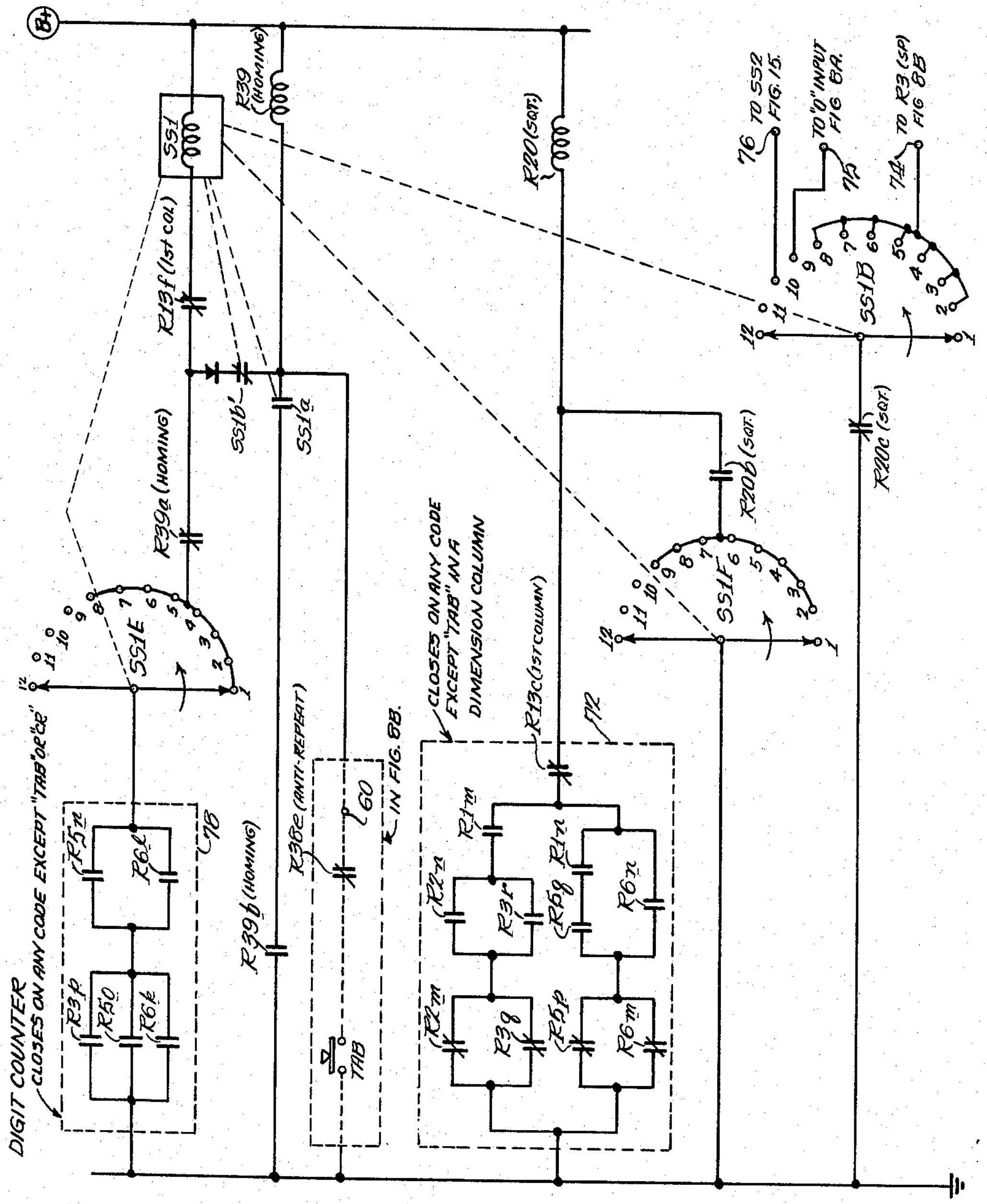
Figure 15:
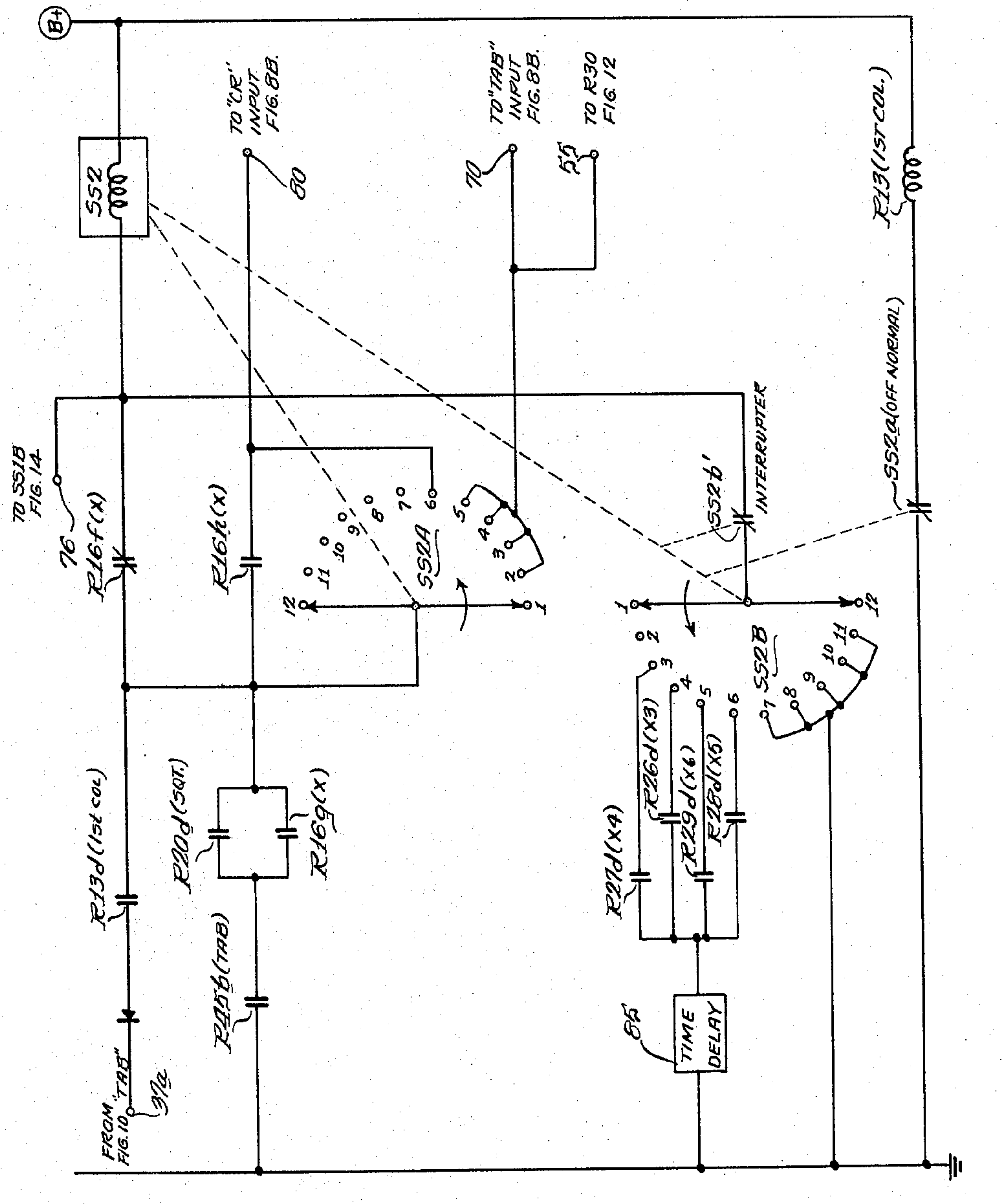
Figure 16:
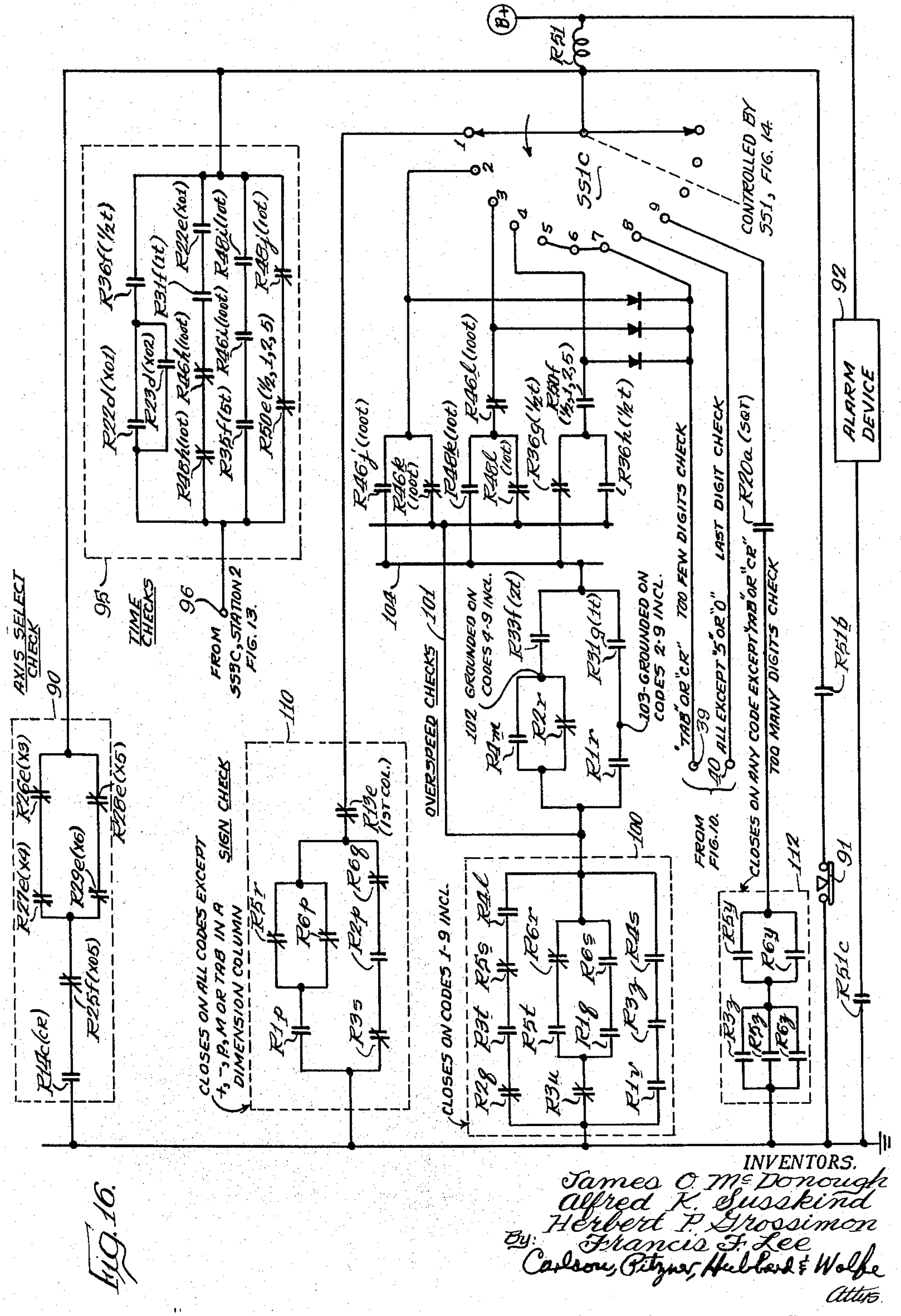
Figure 17:
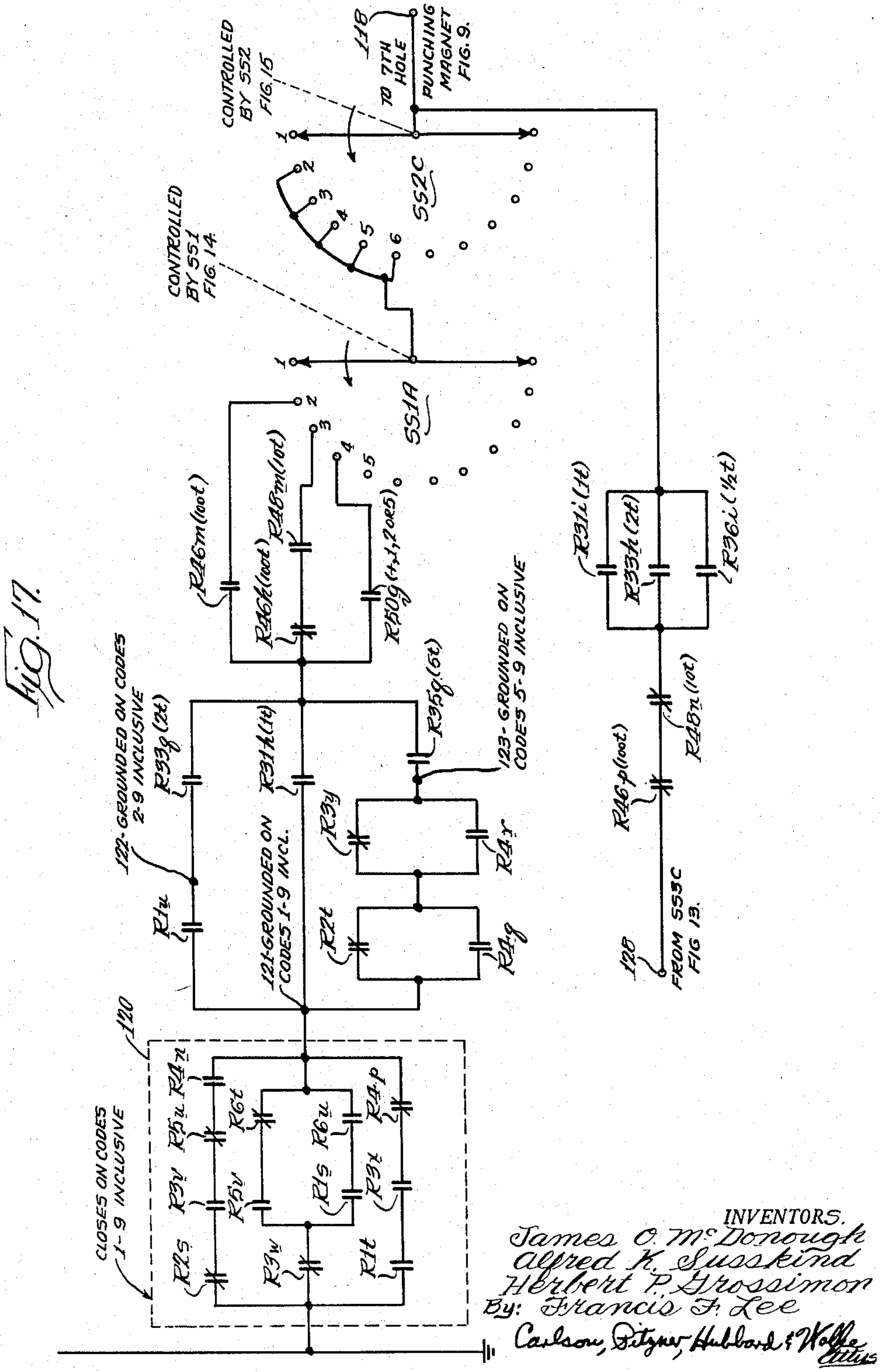

Figs. 8A and 8B when joined along the junction line J—J are a schematic circuit diagram of switches associated with the respective keys of the keyboard and the means respond directly to the actuation of those switches;

Fig. 9 is a block diagram of the typewriter and paper tape punching device illustrating the interconnections between the controls of the present invention and the typewriter and record preparing apparatus;

Fig. 10 is a schematic diagram of recoding circuits;

Fig 11 is a schematic diagram of time information storage means;

Fig. 12 is a schematic circuit diagram of auxiliary or "special code" storage means;

Fig. 13 is a schematic diagram of means which produce printing and punching of numerical time information after storage thereof;

Fig. 14 is a schematic circuit diagram of digit place sensing and counting means together with means for printing and punching a predetermined number of a particular character when a particular control key is actuated once at the beginning of a column;

Fig 15 is a schematic diagram of column sensing or counting means together with logic means which provide either tabulate or carriage return action at the typewriter, as required, in response to the actuation of a single key on the keyboard;

Fig 16 is a schematic diagram of means for checking and giving an indication of erroneous conditions; and Fig. 17 is a schematic representation of means for producing a special symbol on the digital record whenever the ratio of numerical time information and numerical distance information exceeds a predetermined amount.

Throughout the drawings, the coils of various relays are identified by reference characters having the prefix "R" and a distinguishing number, e.g., R38. In most instances these relays have a plurality of normally closed or normally open contacts. For clarity and consistency, each set of relay contacts is identified by the same reference character as the coil which controls them, but with the addition of a distinguishing alphabetical suffix. For example, relay contacts actuated when the coil R38 is energized, are identified by reference characters R38*a*, R38*b*, etc.

While the invention has been shown and will be described in some detail with reference to a particular embodiment thereof, there is no intention that it thus be limited to such details. On the contrary, it is intended here to cover all modifications, alternatives and equivalents falling within the spirit and scope of the invention as defined by the appended claims.

Referring now to Figs. 1–4, there is illustrated what is termed a "tape preparation desk" which embodies the features of the present invention. This apparatus includes a desk 10 which supports an electric typewriter 11 associated with a paper tape punching device 12 and a punched tape reading device 14. The punching device 12 may be viewed in a broader sense as a mechanism for producing a binary coded digital record in response to electric signals supplied thereto.

Figure 1:
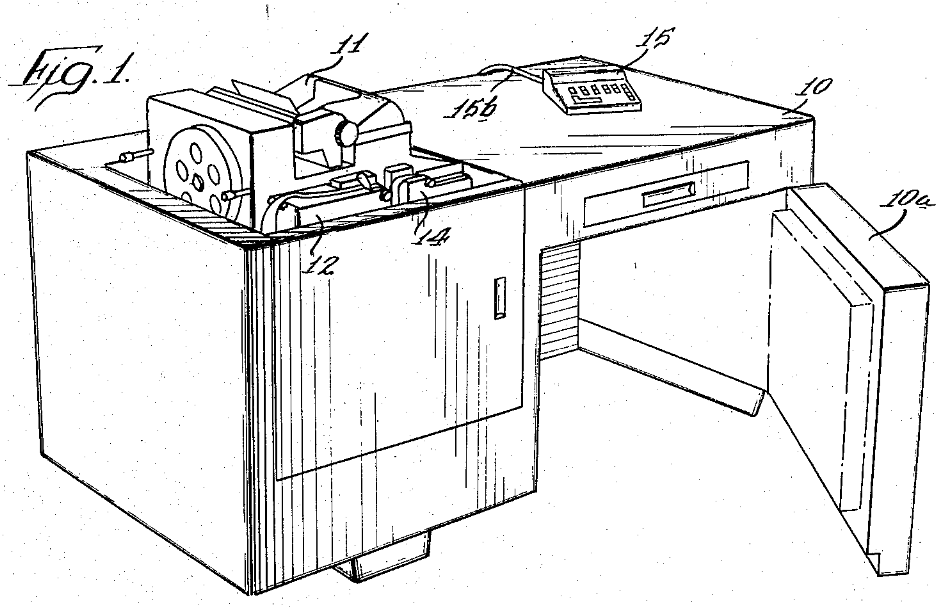
Figure 1 is a perspective view of apparatus embodying the features of the invention for simultaneously preparing a coded digital record from numerical information, and printing a manuscript in tabulated decimal form which corresponds to the numbers and symbols placed on the digital record.
Figure 6A:
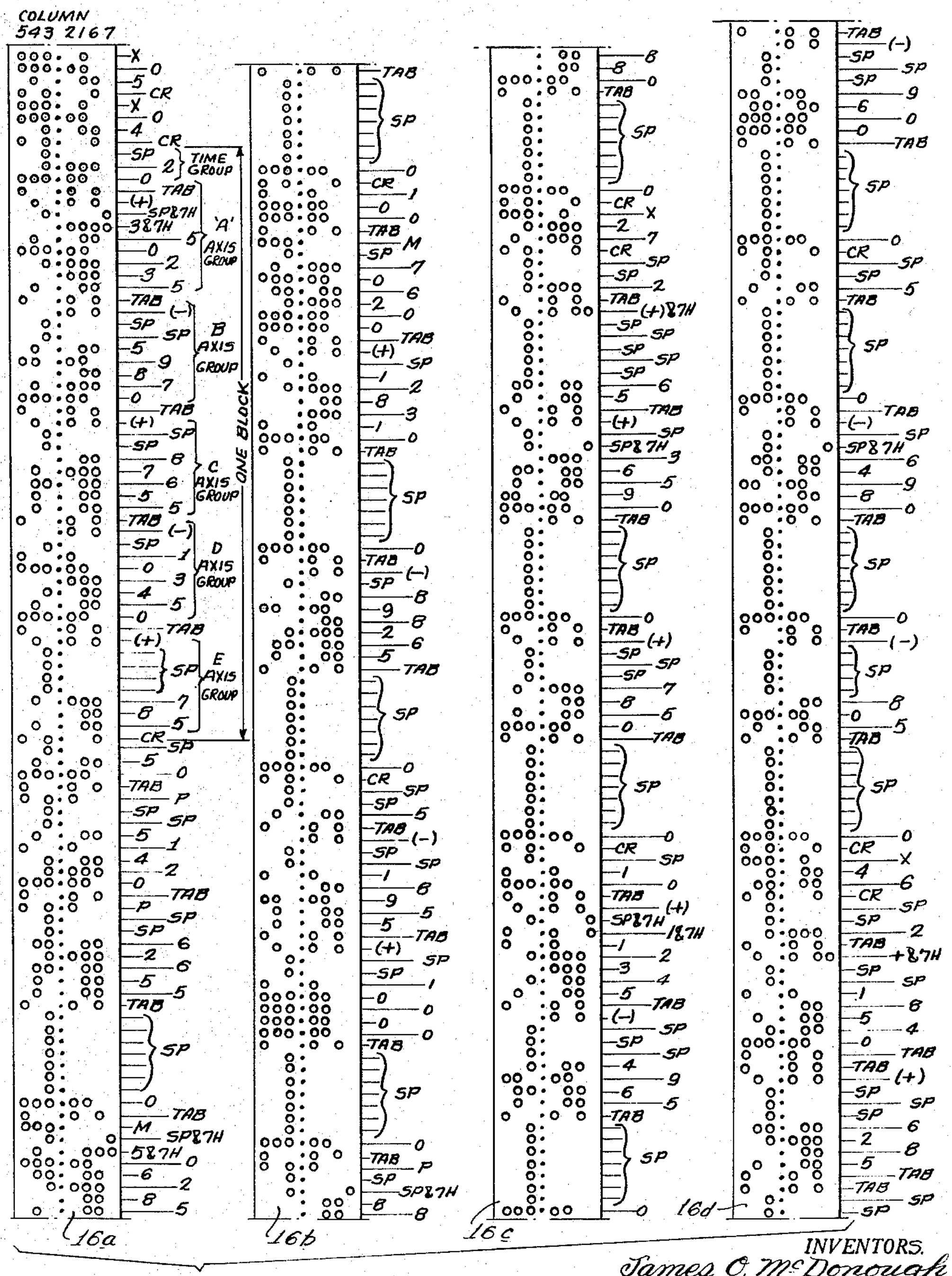
Figs. 6A and 6B are a pictorial representation of a digital record in the form of a punched paper tape (broken into short lengths for convenience of illustration) prepared on apparatus embodying the features of the present invention and corresponding in its contents to the manuscript of Fig. 5.

Since only a limited number of characters are employed in the present instance on the digital record, information is not typed directly on the typewriter keyboard; rather, an auxiliary keyboard 15 having sixteen keys, is employed, these keys being susceptible of convenient manipulation by the touch system with the fingers of one hand. The auxiliary keyboard is interconnected, by means of the control circuits to be described, with the typewriter 11 and the tape punching device 12 so that when numerical and special code digits are typed on the keyboard, they are printed on a manuscript (Fig. 5) by the typewriter, and punched in serially spaced form and in coded binary notation on a punched paper tape (Figs. 6A and B). As shown in Fig. 1, part of the electrical components for the control circuitry may be mounted on a swinging door or panel 10*a* of the desk to give convenient access for maintenance or repair.

Figure 3:
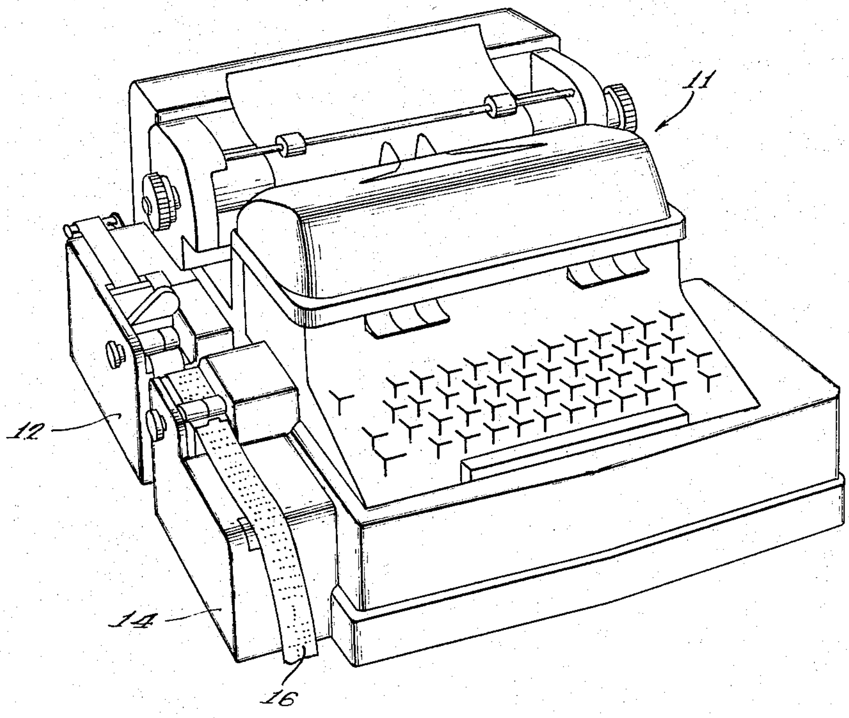
Fig. 3 is a perspective of the typewriter employed in the apparatus to print the manuscript.

The typewriter 11, which is shown more clearly in Fig. 3, is preferably one which is electrically controlled. In the present instance, the typewriter 11 is commercially available, being sold under the name "Flexowriter" by Commercial Controls Corporation of Rochester, New York. However, typewriters which are responsive to coded electrical signals may be used. This typewriter may be operated by typing characters on the keys of its own keyboard in the usual manner, or alternatively, it may be operated by supplying successive electrical signals in plural-place binary code to six input terminals therefor. Each character which the typewriter is capable of printing may be caused to be typed by supplying a different code to the six input terminals, and in a similar manner, the carriage for the typewriter may be caused to execute a tabulation operation from one tab stop to the next or to execute a carriage return action (with automatic space-up of the paper in the carriage) in response to appropriate plural-place coded electrical signals. While the typewriter 11 is capable of printing all of the alphabetical and numerical characters of the English language, the present application will consider its application only in handling numerical data and special code signals as are employed on a digital record for the control of a machine tool as described in the above-mentioned copending application.

The digital record to be prepared is, in the present instance, a paper tape 16 which has seven longitudinal columns, any of several characters or special symbols being representable on the tape by a predetermined pattern of holes punched in different ones of six columns along one transverse line. It will be apparent, however, that the digital record 16 may take other forms, such for example, as a magnetic tape with magnetized "spots" placed thereon in lieu of punched holes in the paper tape. The punching device 12 is also a commercially available item manufactured by the Commercial Controls Corporation of Rochester, New York, and sold in combination with the typewriter 11. As the typewriter 11 is actuated to print different characters, connections between the typewriter and the punching device 12 cause the latter to punch a coded line of holes in the paper tape 16 which corresponds to the particular character printed by the typewriter. Thus, in the present description, printing of the typewriter and the punching of a corresponding coded line of holes in the tape 16 may be considered as but a single operation, since the typewriter 11 and the punching device 12 are interconnected. However, it is to be understood that the advantages of the present invention may also be realized if they are employed only in the control of the typewriter 11 by itself, or in the control of the tape punching device 12 by itself.

The punched tape reader 14 is also a commercially available item manufactured by Commercial Controls Corporation. It is usually made available in combination with the typewriter 11, and it may be used to read a previously punched paper tape and to cause the typewriter to print out on a manuscript that information which is contained in the punched tape. Also, the reader 14 may at the same time control the punching device 12 so that a duplicate of the tape is prepared.

Figure 2:
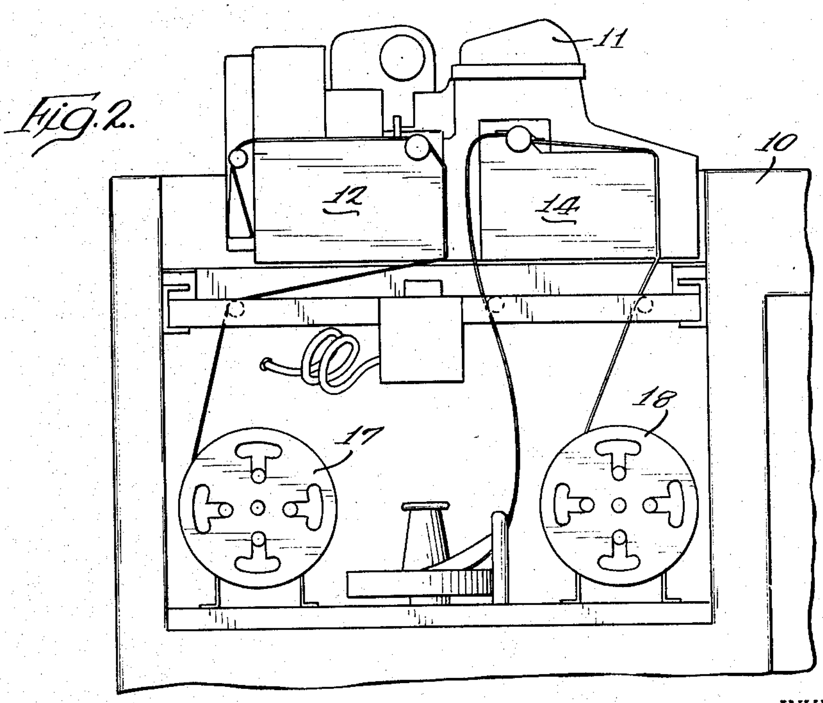
Fig. 2 is an end view of the apparatus shown in Fig. 1.

As shown best in Fig. 2, the typewriter 11 together with the tape punching and reading devices 12, 14, are mounted on a recessed portion of the desk 10, there being provided reels 17, 18 for storing and supplying paper tape which is operated upon by the devices 12 and 14.

Figure 4:
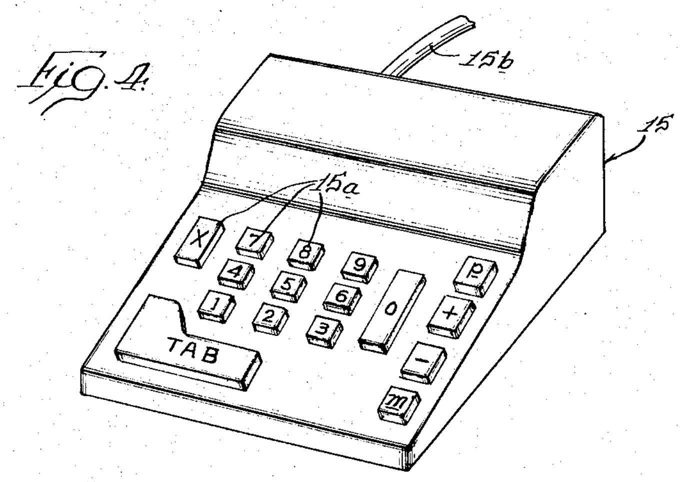
Fig. 4 is a perspective of an auxiliary keyboard used to control the typewriter and the digital record preparation apparatus.

The auxiliary keyboard 15 is best shown in Fig. 4 and comprises simply a housing through which a plurality of depressible keys 15*a* project. There are sixteen keys on the keyboard for sixteen character labeled as shown and listed at the left in Fig. 7. Each of these keys controls a simple switch, as will be further described, and these switches are interconnected with the remaining circuits through a suitable cable 15*b*. Noteworthy here is the absence of any carriage return key on the keyboard and also the absence of a "space" key. The keyboard 15 is of such small size that numerical and special code information may be type thereon conveniently with one hand.

As the operator presses or actuates any of the keys 1–9, +, −, P, M, or ×, the typewriter responds to print the corresponding character, while the tape punch device 12 punches corresponding coded binary patterns in successive lines of the tape 16. The code for the digital record or tape 16 is shown at the right in Fig. 7, that code being binary since only two symbols are employed, either a hole or the absence of a hole in any given position. It will be observed from Fig. 7 and from Figs. 6A, 6B, and 9, that any of eighteen characters may be represented by a particular coded pattern of holes appearing in six columns running longitudinally of the tape. For example, if the characters "×05" are typed successively on the keyboard 15, they will be printed as shown in the first line of the manuscript of Fig. 5, and the paper tape 16 will be punched with three transverse rows of holes patterned to correspondingly represent the characters, ×, 0, and 5 (according to the code shown in Fig. 7) as shown on the tape 16 at the upper left in Fig. 6A.

The "tab" key on the keyboard 15 is a special control key, and the actuation thereof may produce a variety of responses as determined by the control circuits to be described. Moreover, the "0" key on the keyboard 15 is likewise a special key in that its actuation will result in either the printing of a "0" or the spacing of the carriage for the typewriter depending upuon whether the "0" is to be suppressed.

BACKGROUND ENVIRONMENT

The present invention as here specifically illustrated is intended for the production of digital records and will be used with a "computer" type control for a machine tool, as disclosed and claimed in the above-mentioned copending application. While the present invention will find other advantageous applications, it will be helpful to consider here briefly the nature of the "computer" and machine tool control which is to accept the digital record, in order that the problems and the solutions afforded here will be better understood.

To produce any desired shape, including very complex, three-dimensional shapes, in a metal workpiece, a plurality of incremental cuts are made successively by a machine tool cutter susceptible of movement relative to the workpiece. The cutter and the workpiece may be moved relatively along as many as five different axes. By defining the direction and distances of each of the components along the several axes and causing uniform movement over those axes in a selected time interval, an incremental cut of desired length and oriented at any desired angle can be accomplished. The ratio of the distance along any axis of control and the time interval or period selected determines the feed rate or velocity along that axis. Thus, by telling the machine tool to cut a plurality of short components along different axes in a given interval of time, any desired incremental cut may be made; and by causing the machine tool to make a plurality of such incremental cuts (which may be very short), any complex curved surface may be machined to a relatively high accuracy.

To accomplish that control of the movable machine tool elements, however, the "computer" needs to receive numerical information, first, as to the time period for each incremental cut, and second, as to the direction (sign) and the distance of each component along the several axes necessary to produce each of the incremental movements. That numerical information is supplied from the record or punched tape 16 which represents the numerical digits and control symbols in coded binary digital form, e.g., by the presence or absence of holes in a transverse row across the tape. As will be seen from Fig. 6A, the coded binary digit or symbols are serially spaced on the tape, i.e., each transverse row of holes representing one decimal character or special symbol appears successively lengthwise along the tape. A "group" of serially spaced code lines on the tape can be made to represent the sign and numerical distance of a component of movement for one increment; while a plurality of such serially spaced "groups" may, together with a time information group, form one "block" on the digital record which then represents an increment of cut both as to the time in which it is to be carried out, the extent thereof, and the orientation or direction in space thereof. Finally, a plurality of such serially spaced blocks on the punched tape 16 numerically represent a corresponding plurality of successive incremental cuts that are to made by the machine tool. This numerical information may, as explained in the aforesaid copending application, be used to cause the machining of substantially any desired contour on the surface of a workpiece.

Conveniently, the "groups" on the punched tape 16 may be separated by the special codes (tab) and the "blocks" separated by special codes (CR) as shown in Fig. 6A, the "computer" or machine tool control thus being able, upon reading the tape, to recognize where each group or block ends and the next begins.

To prepare the digital record, therefore, it is only necessary to actuate successively keys corresponding to the successive digits in each multiple-place number for time or component distance, inserting a special code between the beginning and end of each number. This will form serially spaced code lines on the punched tape which are divided into the serially spaced groups representing time and distance information. At the end of each block, it is only necessary to cause second special code lines (CR) to be punched, after which the next succeeding block may be typed in serially spaced relation on the tape 16.

At the time that the punched tape or record 16 is being prepared, however, it is desirable to make up a manuscript which is in decimal numbers and readable at a glance to see if the numerical information has been typed correctly. This manuscript may take the form shown by Fig. 5 wherein multiple place numbers representing time in seconds are typed in the first column and multiple place numbers preceded by a sign symbol (either + or P for a positive direction, and − or M for a negative direction) are typed in the second through the sixth columns for components of distance along each of the axes of control. Thus, the numerical digits appearing in each of the six columns form a "group" on the punched tape 16, while one complete line across the manuscript 5 corresponds to one "block" on the punched tape. It will be seen that in order to separate the numbers appearing in successive columns, it is only necessary to cause the typewriter to tabulate from one column to the next, the typewriter having a plurality of tab stops appropriately located to define the six columns. In order to separate successive lines on the manuscript it is only necessary to cause the typewriter to execute a carriage return at the end of one line so that it spaces up to begin the next line. And, when the typewriter is caused to execute a tabulate or carriage return motion, a corresponding special code (tab or CR) is typed on the punched tape 16 to designate the end of one group of digits or one block of digits.

Figure 6B:
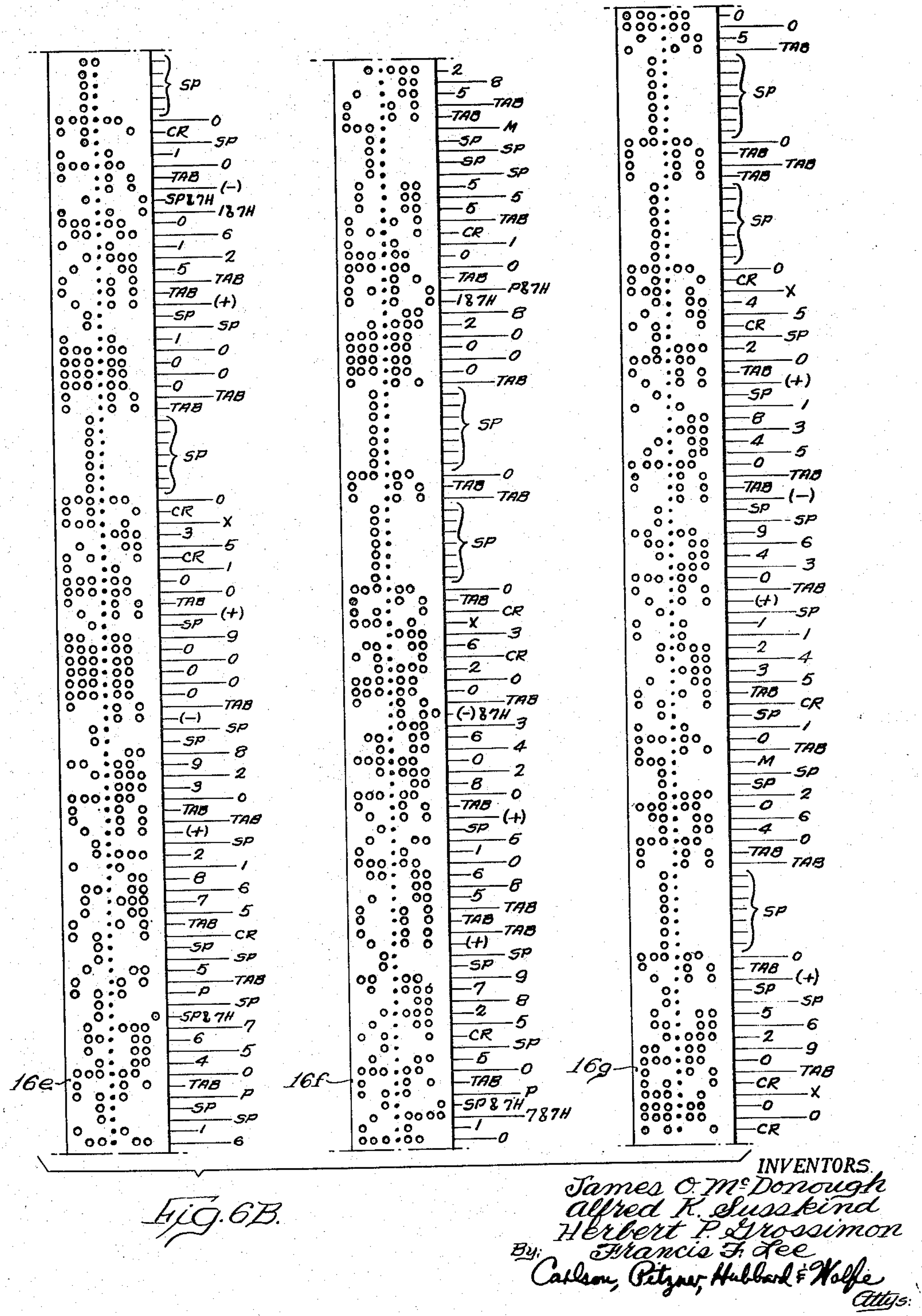

A brief study of Fig. 5 and Figs. 6A and 6B will show that the numerical information printed on the typewriter is represented by the pattern of holes punched in the tape 16, following the code chart shown at the right in Fig. 7. A considerable length of the tape 16 (broken into successive lengths 16*a–g*) is shown in Figs. 6A and 6B so that operation in "3 out of 5" distance axes, to be explained, will be illustrated.

In addition to receiving time information in the first column, the manuscript also contains in the first column, and on separate lines, special three-digit codes which are used to give instructions to the "computer" which accepts the punched tape 16. All of these "extra functions," codes, as they are called, have two numerical digits preceded by the character "×." They are followed by a carriage return so that the typewriter begins on a new line after each such special code. The meaning and purpose of these special "×" codes will be made clear as the following description proceeds.

KEY CIRCUIT AND CODING RELAYS

Referring now to Figs. 8A and 8B, sixteen switches controlled by the keys on the auxiliary keyboard 15 are shown as they are connected in the control circuits, these switches being identified by their corresponding key characters 0–9, +, −, P, M, ×, and tab. All of these switches, except the tab switch, are connected in one of the sixteen input lines of an impedance matrix 20 which has seven output lines 20*a*–20*g*. The output lines are normally held at a low or negative potential by respective resistors 21 connected, for example, to a negative fifteen volt source. If any key switch is closed to ground, as shown in Fig. 8A, those particular ones of the output lines 20*a*–20*f* which are connected therewith by one of the unidirectional impedances or diodes 22, are placed at a higher (i. e. ground) potential due to current flow through the associated resistors 21. The diode matrix 20 is thus a "coding" device, for it converts any one of sixteen codes, represented by closure of the different key switches, into a corresponding unique combination of high and low potentials on the six output lines 20*a*–20*f*. It will be noted that the "0" or "SP" switch can produce either of two responses, depending upon the condition of the relay contacts 15*a*. If the contacts 15*a* are closed, then closure of the "0" or "SP" switch will result in all five of the output lines 20*b*–20*f* being placed at a relatively high potential, and this represents the code for the character "0." On the other hand, if the contacts 15*a* are open, then closure of the "0" or "SP" switch will result in only the output line 20*d* being placed at a relatively high potential, and this corresponds to the code for the typewriter to print a space.

A serious problem arises in utilizing the coded potential output of the lines 20a–20f to actuate in predetermined combinations a corresponding plurality of electro-magnetic devices such as coding relays. When the operator is typing rapidly on the keyboard 15, any given key may be depressed and its switch closed, for only a very short instant of something less than 10 milliseconds. Since high quality relays cannot reliably respond or pick-up in less than about 10 milliseconds, the problem is presented of making certain that the desired combination of coding relays are all actuated each time a key switch is closed.

To overcome this difficulty, the output lines of the coding matrix 20 are not connected directly in circuit with the coils of coding relays to be actuated but are connected to the grids of a corresponding plurality of thyratron discharge devices 24a–24f. A plurality of coding relays, in this instance six, have their respective coils R1–R6 connected in circuit between a positive voltage source and ground with the anodes and cathodes of a corresponding one of the thyratrons 24a–24f. Thus, if the output line 20f is placed at a relatively high potential (ground) in response to the closure of one of the key switches, then the thyratron 24f will be fired and current will flow from the positive voltage source (represented conventionally by the symbol B+) through normally closed relay contacts R38a, and the relay coil R1 to ground. Because the thyratrons 24a–24f are rendered conductive, i.e., "fire," when their grids are raised to the firing potential for only a very short time interval on the order of one millisecond, and remain conductive until their anode circuit is broken, they effectively "store" the fact that one of the key switches has been closed, even for a short interval of less than 10 milliseconds. Once a given one of the thyratrons has fired, it will remain conductive for a sufficiently long time to cause pick-up of the particular relay R1–R6 which is connected in circuit therewith, and until its anode circuit is broken by opening of the relay contacts R38a.

Thus, it will be seen, in review, that closure of any one of the key switches shown in Fig. 8A will result in relatively high potentials being placed on a different combination of the matrix output lines 20a–20f, and this in turn will cause firing of a corresponding combination of the thyratrons 24a–24f. Conduction of the latter will, in turn, cause energization of a corresponding combination of the coding relays R1–R6 and these relays will remain energized until the normally closed relay contacts R38a open. A moment's study of the coding relay chart of Fig. 7 will reveal that for each of the keys which might be pressed on the keyboard 15, a unique combination of the relays R1–R6 will be energized. In this manner, decimal digits 0–9 and special symbols +, −, P, M, and × may be converted into a six-place binary code which may be used to correspondingly cause the typewriter 11 to print a character, and the tape punching device 12 to punch a proper combination of holes in the paper tape 16.

The coding relay chart of Fig. 7 should be kept in mind as the following description proceeds, since the coding relays are used in numerous places to sense or detect if a particular one of the several possible characters has been printed, or if any one of a predetermined group of characters has been printed.

The control circuit shown in Fig. 8B further includes means for preventing the coding relays from being repeatedly picked up and dropped out in response to but a single, prolonged closure of one of the keying switches. In other words, "anti-repeat" means are employed to make sure that a character is printed but once, and its code punched on the paper tape but once, in response to a single closure of the corresponding key switch. For this purpose, an anti-repeat relay R38 is used to make certain that a particular combination of the coding relays R1–R6 which has been energized will be held energized until the corresponding key is released and affirmatively re-actuated.

As shown in Fig. 8A, the output line 20g of the matrix 20 will be placed at a relatively high potential each time that any of the keying switches is closed, and it will remain at such high potential until the key is positively released. Each time that any combination of the coding relays R1–R6 is energized, then a relay R37 (Fig. 8B) will be energized through a contact to a network including parallel relay contacts R2a, R3a and R6a. Brief reference to Fig. 7 will show that at least one of these latter three relay contacts will be closed whenever any one of the eighteen possible combinations for the coding relays R1–R6 is energized. As soon as the relay R37 is energized, its contacts R37a close to place the grid of a thyratron 26 at ground potential, thus causing the latter to fire. Since the relay coil R38 is in the anode-cathode circuit of the thyratron 26, the latter will be energized, so that its contacts 38a open to de-energize those ones of the coding relays R1–R6 which were previously picked up. As soon as the coding relays are de-energized, the relay R37 is again dropped out. However, when the relay R38 was energized, its relay contacts R38b closed, thereby connecting the grid of the thyratron 26 to the matrix output line 20g. The latter remains at a relatively high potential for so long as any of the key switches is held closed. Thus, the thyratron 26 remains conductive and in condition to be fired for so long as that key switch is held closed.

Also, connected in series with the anode of the thyratron 26 is the secondary winding 28a of a transformer 28 having a primary winding 28b connected to an A.C. voltage source. Each time that the voltage induced in the secondary winding 28a swings negative, it tends to extinguish the thyratron 26, but the latter will re-fire as the voltage in the secondary winding 28a again swings positive if the potential on its grid is relatively high. Thus, the thyratron 26 tries to be extinguished on each negative swing of the A.C. voltage induced in the winding 28a, but it cannot be extinguished sufficiently long to drop-out the relay 38 if the matrix output line 20g is at a relatively high potential and the contacts R38b closed. As soon as all the key switches are released, however, the matrix output line 20g is placed at a relatively low or negative potential by the matrix 20, so that upon the next negative half cycle of the A.C. voltage induced in the secondary winding 28a, the thyratron 26 is extinguished and relay 38 de-energized. This re-closes the contacts R38a and opens contacts R38b so that the circuit is in readiness for the actuation of another one of the key switches.

It will be seen from Fig. 8B that the "tab" key switch does not work through the matrix 20 but instead is connected directly in series with a relay coil R45 through normally closed contacts R38d. The response to the energization of the relay R45 will be described at a later point, but for the time being it will be sufficient to note that the same anti-repeat action is obtained through connections with the relay R38. If the "tab" key switch is closed for but an instant, the relay R45 will be energized and will seal in through its own normally open contacts R45a. When the coding relays are energized in any combination, as will be explained below, in response to energization of the relay R45 or closure of the "tab" key switch, the contact network in series with the relay R37 will close to energize the latter, thus closing the contacts R37a which will place a relatively high potential on the grid of the thyratron 26. The latter thus fires and energizes relay R38 which, in turn, will close its contacts R38c so as to seal in through the "tab" key switch. Pick-up of the relay R38 will in turn open the contacts R38d so that the relay R45 drops out. Then, when the "tab" key switch is released, the relay R38 will be unsealed, and will restore so that the coding relays and the relay R45 are ready for another cycle of operation.

The interconnections for actuating the typewriter 11 and the paper tape punching device 12 are schematically shown in Fig. 9. As previously mentioned, the typewriter 11 has a plurality of input terminals 11a–11f. These are respectively connected in series with normally open relay contacts R1b–R6b, the latter in turn leading through a single set of relay contacts R44a to a positive voltage source. Assuming that the contacts R44a are closed (and their control will be explained in more detail below), energization of the coding relays R1–R6 in any particular combination, will result in corresponding closure of the relay contacts R1b–R6b. A positive potential will thus be supplied to a particular combination of the input terminals 11a–11f and this will cause the typewriter to print the corresponding character which has been coded in response to closure of one of the keys. The typewriter 11 is also connected to the tape punching device 12 by six lines and these will be energized in a corresponding combination each time the typewriter prints any character or otherwise acts. As a result, the punching device 12 will actuate a particular combination of tape punching units 12a–12f alined with the respective columns numbered 5, 4, 3, 2, 1 and 6 on the tape 16. In this manner, a transverse row or pattern of holes will be punched in the tape 16, corresponding to the character printed by the typewriter as shown by the chart in Fig. 7. It will be understood that if desired the coding relays may be made to control the device 12 directly, rather than indirectly through the typewriter.

The tape punching device 12 also includes means (not shown) for advancing the tape 16 one step each time that a row of holes is punched, and for punching a longitudinal row of small sprocket holes in between the columns numbered 2 and 3. The sprocket holes are employed in feeding the tape 16 when it is put through a reading device.

RE-CODING CIRCUITS

As the various numerical characters and special symbols are typed on the keyboard and result in energization of the coding relays R1–R6 in unique combinations, there is a necessity for sensing the occurrence of certain codes in order to perform storage and checking functions. For this purpose various circuits including normally open and closed contacts of the different coding relays are provided as shown in Fig. 10 so as to sense, by providing a conduction path, the occurrence of predetermined ones of those codes as reflected by the energization pattern of the relays.

For example, a terminal 30 in Fig. 10 is connected in series from a grounded line G through normally open relay contacts R2c, R6d, and R4c and through normally closed relay contacts R3d and R1d. Referring to the coding relay chart in Fig. 7, it will be seen that the coding relays R2, R6, and R4 are all energized, and the coding relays R3 and R1 both de-energized, only when the coding relays are energized in that particular combination which designates the "+" code. Therefore, when a "+" code character is represented by the energization of the coding relays R1–R6, the terminal 30 will be placed at ground potential.

In like manner, the terminal 31 (Fig. 10) will be placed at ground potential only when the coding relays R1–R6 are energized in that particular combination (see Fig. 7) which corresponds to the character "1." Similarly, terminals 32, 33, and 34 will be placed at ground potential only when the coding relays R1–R6 are energized in combinations corresponding to the characters "2," "0" and "5," respectively. By virtue of diode connections to the terminals 30–32 and 34, the terminal 35 will be placed at ground potential whenever the coding relays are energized in a combination corresponding to the characters "+," "1," "2," or "5."

Further reference to Fig. 7 and to Fig. 10 will reveal that the terminal 36 is placed at ground potential whenever the coding relays R1–R6 are energized in that particular combination corresponding to the "×" character. In like manner, the terminals 37 and 37a will be placed at ground potential whenever the coding relays R1–R6 are energized in the combination corresponding to the "tab" code. Still further, the line 38 in Fig. 10 will be placed at ground potential whenever the coding relays are picked up in a pattern corresponding to the code or carriage return of the typewriter, i.e., "CR." Thus, a terminal 39 will be placed at ground potential, by virtue of its diode connections to the terminals 37 and line 38, whenever the coding relays are in a condition corresponding to either the "tab" or "CR" code. Finally, a terminal 40 is connected to ground through a relay contact network including contacts of the coding relays which closes on all codes except "0," "5" or "6." However, by virtue of the diode connection to a line 41 which is grounded on the "6" code, the terminal 40 is placed at ground potential whenever the coding relays are picked up in any pattern except those which correspond to the codes for "0" or "5."

In this manner, whenever a particular code is reflected by pick-up of the coding relays R1–R6, that code may be represented by a ground potential on different ones of the terminals appearing in Fig. 10. It may be also observed at this point that the coil for relay R14 is connected through a diode to the line 38. That relay will be momentarily energized each time that the coding relays R1–R6 are energized in combination corresponding to carriage return or "CR." The relay R14 is thus used to sense the fact that a carriage return code has been supplied to the typewriter and to the tape punching device. The functions or uses of the re-coding circuits shown in Fig. 10 will become clear as the following description proceeds.

AUXILIARY FUNCTION STORAGE

Besides supplying numerical data representing times and distances to the "computer" for machine tool control, the punched paper tape 16 must also supply certain "instructions." These instructions are called "auxiliary functions" and are recognized or identified in that the first digit code thereof is a "×." Broken into general classifications, such special "×" codes include those for selecting operation of the machine tool in five out of five or three out of five axes, those for selecting operation of the "computer" time multiplier, and those for accomplishing on-off control of auxiliary devices such as coolant pumps or chip conveyors at the machine tool.

As explained previously, the data processing apparatus disclosed in the forementioned copending application is intended to permit the automatic control of motions along five axes of a machine tool. It may often happen, however, that fewer than five axes need be controlled. That is, for a relatively simple workpiece, there need be motion between the machine tool and cutter only along three axes or less. If by so instructing the "computer," it can be made to handle information which is for only three of the five axes involved, then the length of the punched paper tape 16 may be considerably reduced and the processing of the information simplified. As shown by way of example in Fig. 5, the second through the sixth columns in the manuscript correspond to motions along what have been termed the A, B, C, D and E axes. Now by supplying a special code to the director it may be made to operate in five out of five axes, or three out of five axes and in any one of a plurality of combinations of three axes. The particular "instruction" codes for designating the particular axes of operation are as follows:

×05—Axes A, B, C, D and E
×35—Axes B and D
×36—Axes B and E
×45—Axes C and D
×46—Axes C and E The "computer" for processing numerical data so that the latter may be used to control motions of a machine tool requires a certain minimum time for the processing of each block of information. That minimum time is often greater than the time period numerically designated for the processing of a particular block of information. Unless some special provision is made, therefore, it may happen that if the computer were operating an absolute time scale, it would not have sufficient time to process a given block of numerial information. In order to obviate this difficulty, the "computer" is made to have the facility for operating at a "slow" time scale or ratio. In other words, the director may operate either on a 1:1 time ratio; or it may operate on a 2:1 or 4:1 time ratio, in the latter cases taking twice as long or four times as long, respectively, to process any given block of information as the time period actually numerically called for. As explained in the above-mentioned copending application, by recording the "computer" output signals at a correspondingly reduced speed, and playing back those recorded signals at normal speed, the original time periods called for will elapse in the machining of corresponding increments at the machine tool. In order to "instruct" the director as to which of these time ratios it should use, special "×" codes are employed and placed on the punched tape 16. In the present instance, the following codes are used:

×01—1:1 time ratio
×02—2:1 time ratio
×04—4:1 time ratio

Finally, special codes, preceded by a "×," are recognized by the "computer" and processed so that they cause auxiliary devices at the machine tool to be turned on or off at appropriate times during a machining operation. These on-off special codes may have a variety of values such as ×27 (see the seventh line of the manuscript in Fig. 5), ×10, ×78, etc. Because these particular auxiliary codes are not stored in the present circuitry, they need not be discussed in further detail.

In order to perform certain checking functions and to make the typewriter automatically skip over columns corresponding to unused axes, provision is made to store auxiliary codes which are placed on the punched tape to serve as axis selection or time ratio selection instructions. Means are provided for sensing the occurrence of a "×" code and storing that fact, together with means for sensing and storing the numerical digits following a "×" symbol.

This extra function storage circuitry is shown in Fig. 11. It includes a relay R16, which is designated the "×" relay, connected to a positive voltage source and arranged to be energized by current flow to ground over the terminal 36 (see also Fig. 10) whenever the coding relays R1–R6 are energized in that particular combination which corresponds to the "×" character. As shown, the connection from the terminal 36 is through normally closed relay contacts R30*a* which, as will be explained, are closed only when a carriage return signal has been received after the typing of distance information in a dimension column of the manuscript. To energize the "×" relay R16 the typewriter carriage must be in the first column, and striking the "×" key on the keyboard will then result in pick-up of the relay R16 which seals in through its own contacts R16*a* and the normally closed contacts R14*a*. This, in turn, also causes closure of the normally open contacts R16*c* placing ground potential on the line 45. Now if the next character typed on the keyboard is a 3, 4, 5 or 6, then the relay R26, R27, R28 or R29, respectively, will be energized by closure of coding relay contact networks 46, 47, 48 or 49, respectively. Brief inspection of the contact network 46, which includes normally open contacts R2*h* and R1*j* in series with normally closed contacts R3*j* and R4*h*, will reveal from Fig. 7 that this network closes whenever the coding relays R1–R6 are energized in a combination corresponding to the character "3." In like manner, the networks 47, 48 and 49 close whenever the coding relays are picked up in a pattern corresponding to the characters 4, 5 or 6. Whenever the relay R26 is energized, it seals in through its own contacts R26*a* and through normally closed contacts R27*b* and R25*b*. Thus, the relay R26 when once picked up and sealed in will be de-energized only if either the relay R27 or the relay R25 is energized. In like manner, the relay R27 when energized through the network 47 seals in through its own contacts R27*a* and normally closed contacts R26*b* and R25*c*. Similarly, the relay R28 when energized through the network 48 seals in through its own contacts R48 and normally closed contacts R29*b* and R25*d*. Finally, the relay R29 when energized through the network 49 seals in through its own contacts R29*a* and the normally closed contacts R28*b* and R25*e*.

It will be noted that in series with each of the networks 46–49 is a set of normally closed contacts R21*b*, R21*c*, R21*d*, and R21*e*, respectively. These contacts are controlled by the relay R21 which is energized whenever the two characters "×0" are typed in succession. Thus, the axis select relays R26–R29 cannot be changed from their energization pattern by any character such as "4" typed after the two characters "×0." Moreover, referring back to the axis selection codes listed above, it will be seen that the relays R26 and R27 are mutually exclusive since they contain normally closed contacts of the opposite relay in their holding circuits. It will also be seen that the relays R28 and R29 which correspond to axis-select code digits 5 or 6, are mutually exclusive since they include in their holding circuits normally closed contacts of the opposite relay. Finally, any time that the relay R25, designating the axis selection code "×05" is energized, then all of the relays R26–R29 will be de-energized by opening of the contacts R25*d–e*.

It will thus be seen that any time a 3-out-of-5 axis select code is energized, two and only two of the relays R26–R29 will be picked up and sealed in. If that code, for example, is "×36," then the relays R26 and R29 will be energized; and if that code is "×35," then the relays R26 and R28 will be energized.

In order to store the fact that the 5-out-of-5 axis select code, "×05," has been typed, the relay R21, corresponding to the first two digits "×0," is arranged as shown in Fig. 11 to be energized by conduction to ground over the terminal 33*a* in the re-coding circuits of Fig. 10. Thus, when the relay R16 has been energized and sealed in so that the contacts R16*b* (Fig. 11) are closed, energization of the coding relays in a pattern corresponding to the "0" character will cause pick-up of the relay R21 which then seals in through its own contacts R21*a* and the contacts R14*a*. With that, the contacts R21*f* in series with the coil for the relay R25 are closed and the subsequent closure of the contact network 48 will supply a ground signal to the coil of the relay R25. The latter relay will thus pick-up and seal in through its own contacts R25*a* in series with the contacts R29*c*, R28*c*, R27*c* and R26*c*. These latter contacts make certain that the relay "×05" is mutually exclusive with any of the other axis selection relays R26–R29.

In summary, therefore, any of the five axis select codes is stored and represented by the five relays R25–R29, energization of the relay R25 designating the "×05" code and energization of either relay R26 or R27, and either relay R28 or R29 designating any of the three out of five axis operation codes.

After a three digit "×" code has been typed and stored, the "tab" key on the keyboard will be actuated. This, in a manner which will be explained, causes a carriage return signal to be supplied to the typewriter 11, so that the latter returns and spaces up to begin a new line. As an incident to this carriage return signal, however, the coding relays will be energized according to the carriage return code and the relay R14 will be momentarily actuated. This will result in opening of the normally closed contacts R14a (Fig. 11) so that the "×" relay R16 and the "×0" relay R21 will be de-energized.

In order to store and to represent a time ratio selection code, the same response occurs, as previously described, whenever the "×" character is typed. The relay R16 will be sealed in. When the second digit of this code, i.e., "0," is typed, the relay R21 will be picked up and sealed in. Now if the third digit of the "×" code is either a "1," a "2," or a "4," then the relay R22, R23, or R24 will be energized. For example, the relay R22 will be energized by completion of a contact network 51 in series with the "×0" relay contacts R21i, and will seal in through its own contacts R22a and normally closed contacts R23c, R24c. On the other hand, if the third digit of a code beginning with "×0" is a "2," then a contact network 50 will close and supply ground potential through the now closed "×0" relay contacts R21h to the relay R23. The latter will seal in through its own contacts R23a and the normally closed contacts R22c, R24b. Finally, if the third digit of a code beginning with "×0" is a "4," the relay R24 will be energized through the contact network 47 and the now closed relay contacts R21g. The relay R24 will seal in through its own contacts R24a, and the normally closed contacts R22b, R23b.

It will be apparent that only one of the relays R22–R24 can be energized at any one time. This is true because each of those relays has normally closed contacts of the other two relays in its holding circuit, so that the typing in of a new time ratio selection code will simply de-energize the previously sealed-in relay and energize the proper one of the relays for the new time ratio code.

The manner in which this storage of axis selection and time ratio "instructions" is utilized will be made clear in the following description.

TIME INFORMATION STORAGE

The data processing "computer" which is to receive information on the punched tape 16 is able to respond to any one of nine possible time periods which are numerically represented by binary code symbols. These time periods are ½, 1, 2, 5, 10, 20, 50, 100, and 200 seconds. For convenience in the present instance, the ½ second time interval is designated simply by the + symbol, so that when a "+" key is pressed with the typewriter carriage in the first or time column of the manuscript and punched in the paper tape 16, that is read as meaning ½ second. Inspection of the nine possible time periods will show that in any case there is one of four possible significant digits ½, 1, 2 or 5 followed by either none, one, or two zeroes, i.e., having a units, tens, or hundreds order.

Time information is not printed directly upon typing. Rather, it is stored and printed out after all time number digits have been typed in and in response to actuation of the "tab" key which tabulates the carriage over to the first dimension column. This enables checks to be made upon the propriety of the time information. Moreover, time information is stored in order that it may be compared with distance information later typed into the dimension columns for that particular block so that if a velocity or feed rate beyond the capacity of the machine tool has been programmed, it may be detected and an error condition indicated.

Any one of the several possible time intervals, listed above, may be stored in the relay circuits shown by Fig. 12. It will be seen that coils of relays R31, R33, R35 and R36 correspond respectively to the four possible valued significant digits for any of the nine possible time periods, the relay R31 when energized representing the digit "1," and the relays R33, R35, and R36 representing the time digits 2, 5, and ½, respectively. These four relays are connected from a positive voltage source through normally closed contacts R14t, R16t and thence through a set of three series-connected normally closed contacts to the respective terminals 31, 32, 34 and 30. Thus, whenever the character "1" is represented by pick-up of the coding relays R1–R6, and the terminal 31 is grounded by the re-coding circuit of Fig. 10, the relay R31 will be energized and sealed in through its own contacts R31a. In like manner, the relay R33, R35 or R36 will be energized and sealed in through its own contacts whenever a ground potential appears on the terminals 32, 34 or 30 in response to the coding relays R1–R6 being energized in a pattern to represent the characters 2, 5 or +. It will be seen from Fig. 12 that each of the four relays R31, R33, R35 and R36 has in series therewith three normally closed contacts of the other three relays. Thus, whenever any one of those four time storage relays is energized, the other three cannot be energized, and it will be apparent, therefore, that if one of those four relays has been energized, it will remain sealed in and the others sealed out, until the relay contacts R14t momentarily open at the end of a line in response to energization of the coding relays in a pattern representing the code "CR."

The relay R30 shown in Fig. 12 is a "time storage gate." It will be energized each time that the coding relays are picked up in a combination representing "tab" by virtue of a ground potential appearing on the terminal 37. Once energized, the relay R30 seals in through its own contact R30b until either the contacts R14t or R16t open. Also, it will be apparent from Fig. 12 that the relay R30 may be energized in response to a ground potential appearing on the terminal 55. This terminal connects to a stepping switch bank in Fig. 15 and the significance of this will be explained at a later point. The purpose of the relay R30 is to prevent zeros which appear in dimension columns from affecting the time storage circuitry. For once a tab signal has occurred after a carriage return signal, i.e., once a tab signal has occurred indicating that the typewriter has moved from the first to the second column, then the relay R30 will be sealed in until the next carriage return code occurs at the end of a line or the end of a block indicating that that particular block has been completed. And as long as the relay R30 is energized, zeros or time digits of 1, 2, 5, or ½ cannot affect the time storage circuitry.

This will become clear when it is seen that the relay R50, which is to be energized in response to the occurrence of any of the four significant valued time digits is picked up whenever a ground potential appears on the terminal 35 (Fig. 10), if the normally closed contacts R30d (Fig. 12) are then closed. Whenever the relay R50 is picked up in this manner, it seals in through its own normally open contacts R50a and the contacts R48c.

With the relay R50 sealed in, the contacts R50c in series with the relay R48 will be closed so that upon the occurrence of a ground potential on the terminal 33 (indicating a "0" code), the relay R48 will be energized and sealed in through its own contacts R48y. The relay R48 thus represents a "0" following a significant valued time digit since it cannot be energized until the relay R50 is first energized. Thus, whenever the relay R48 is energized it signifies that any valued digit stored by the relays R31, R33 or R35 (1, 2 or 5) is to be followed by a significant "0" and that the time number stored is of the tens order, i.e., 10 seconds, 20 seconds, or 50 seconds. Whenever the relay R48 is picked up, however, the contacts R48c open to break the holding path for the relay R50, so that the latter drops out. When this occurs, the relay contacts R50b return to a closed condition and since the relay R48 is now sealed in, the relay contacts R48b are closed. Under these conditions the appearance of a second ground potential on the terminal 33, indicative of a second "0" following the first significant "0," the relay R46 is energized and sealed in through its own contacts R46a. Thus, when the relay that thereafter in that column, when the "0" key is pressed, a "0" will be printed rather than simply a space.

In this manner, it will be seen that the operator is totally relieved of all care as to whether he should type a "0" or a space at any particular point. He simply strikes the "0" key and if the typewriter is about to print an insignificant figure, it will be left simply as a blank space, but if the typewriter is to print a significant figure, that figure will automatically be printed as a "0."

DELAYED TIME PRINT

It was previously noted in connection with Fig. 9 that the relay contacts R44*a* serve to connect or disconnect the coding relay contacts R1*b*–R6*b* into operative relation with the typewriter 11. The coil for the relay R44 is shown in Fig. 13 connected between a positive voltage source and ground through a relay contact network 59. This network includes normally open contacts SS3*a*, normally closed contacts R13*a* and normally open contacts R16*b* connected in parallel. The contacts SS3*a* are closed when command time information is to be printed after being stored as will be explained. The contacts **R13*a*** are open whenever the typewriter carriage is in the first or time column, and are closed whenever the typewriter carriage is in any of the dimension columns 2 through 6 of the manuscript. The manner in which these contacts R13*a* are controlled will be made clear below. The contacts **R16*d*** are closed whenever a "×" character is typed and thus serve to permit printing of special "×" information in the first column as it is typed on the keyboard.

It will be helpful to first consider the manner in which special "×" codes are typed and printed. If a special code such as "×04" is typed on the keyboard 15, actuation of the "×" key will result in energization of the coding relays in a combination unique to the "×" character and this, as explained, will cause energization of the relay R16 (Fig. 11). That, in turn, will close the contacts **R16*d* in Fig. 13 so that the relay R44** is energized, causing the contacts R44*a* in Fig. 9 to close so that the "×" character is printed by the typewriter 11 and punched on the paper tape 16. Since the "×" relay R16 remains sealed in through the contacts R14*a* (Fig. 11) until the digits following the "×" have been typed and a carriage return executed, the relay R44 will remain energized so that the digits following the "×," e.g., the 3 and the 5 in a code such as "×35," will be printed in the first column of the manuscript and will also be punched into the paper tape.

If, however, no "×" character is typed when the typewriter carriage is in the first column, but rather a three digit time period number such as 050 (meaning 50 seconds) is typed, the typewriter 11 and the tape punching device 12 will not be immediately affected because the relay R44 will be de-energized and the contacts **R44*a* (Fig. 9) open. However, the coding relays R1–R6 (Fig. 8B) will be picked up in different combinations to correspond to the characters which are typed. For example, if the time characters 050 are typed, the coding relays R1–R6 will be picked up in different combinations corresponding to the digits SP, 5, and 0, it being recalled that the first zero is suppressed and the coding relays picked up in the combination representing a space due to the action of the relay R15**.

The three successive combinations of coding relay energization are placed in the time storage circuit previously described in connection with Fig. 12. Pursuing the above example for a time period of 50 seconds, the relay R35 will be energized and sealed in responsive to the occurrence of the "5" code, while the relay R48 will be energized and sealed in responsive to the single "0" code following the "5" code. Thus, the time storage circuit of Fig. 12 will store by energization of different ones of its relays the magnitude of the time number typed on the keyboard.

After the time information has been typed on the keyboard, the "tab" key is depressed, and this is logical from the point of view of the operator since he has completed the time information in the first column and desires the typewriter carriage to tabulate over to the second column. When the "tab" key is depressed, the typewriter will not then execute a tabulate motion, but a terminal 60 in Fig. 8B will be momentarily grounded. This terminal also appears in Fig. 13. If the typewriter carriage is in the first column, the contacts R13*b* shown in Fig. 13 will be closed, while the contacts R16*b* will be closed if an "×" has not been typed since the last carriage return code appeared. The contacts R14*b* will likewise be closed because the carriage return relay R14 under these circumstances will be de-energized. Thus, ground potential appearing on the terminal 60 will energize the coil of a multi-bank stepping switch SS3, the latter then being intermittently energized through its own interrupter contacts SS3*b'* and its normally open contacts SS3*c* which are closed whenever stepping switch rotor is not in its home position. Thus, the ground signal appearing on the terminal 60 steps the stepping switch SS3 from its home position, after which the interrupter contacts SS3*b'* and the off-normal contacts SS3*c* cause it to step around through one complete cycle until it returns to its home position and the contacts SS3*c* reopen.

The contact banks SS3A and SS3B sense the conditions of the time storage relays and supply appropriate signals to the coding matrix in Fig. 8A as the switch SS3 executes one complete cycle of movement. It will be seen that there are five output terminals 62–66 leading from the stepping banks SS3B and SS3A, these being connected to corresponding terminals for the input lines of the coding matrix 20 in Fig. 8A which will result in pick-up of the coding relays in combinations corresponding to the characters 1, 2, 5, +, and "0 or SP." As the wiper of the bank SS3B reaches station 2, it will find a ground signal if the time number stored is of the hundreds order, since the relay contacts R46*d* will be closed. Accordingly, ground potential will be supplied to the line 68 and will then pass through one of the closed contacts R31*e*, R33*e*, R35*e*, or R36*e* to a corresponding one of the terminals 62–65 leading to the coding matrix 20. The character corresponding to the stored valued time digit will thus be printed in the first digit place of the time column on the manuscript, and a corresponding binary code will be punched in the paper tape 16. However, if the time number stored is of the tens or units order, then the relay R46 will be de-energized and the wiper SS3B will not find ground potential at station 2. Rather, the contacts R46*f* will be closed and the wiper SS3A will find ground potential at station 2 and supply it to the terminal 66 which connects to the "0 or SP" input line for the matrix 20 (Fig. 8A). Since the relay contacts R15*a* will at this time be open, as previously explained, the typewriter will be caused to leave the first digit place in the first column blank, and to space over to the second digit place.

Then, as the wiper SS3B reaches station 4, it will find ground potential only if the time number stored is of the tens order, i.e., if both the relay contacts R46*e* and R48*d* are closed. If that is the case, ground potential will appear on the line 68 and be supplied to one of the terminals 62–65 depending upon which of the relays R31, R33, R36, or R35 is energized. If the significant digit stored is a "2," the contacts R33*e* will be closed and ground potential will appear on the terminal 63 thus supplying a signal to the matrix 20 which will cause the coding relays R1–R6 to pick up in that combination unique to the character "2." Therefore, the significant digit will be printed in the second digit place of the time column.

On the other hand, if the time number stored is of the hundreds order or the units order, wiper for the bank SS3B will not find ground potential at station 4 but the wiper for the bank SS3A will find ground potential at station 4 due to the fact that either the contacts **R48*f***

R46 is energized it indicates that two significant zeros follow the valued digit stored in the relay R31, R33 or R35, i.e., that the time period is of the hundreds order, i.e., 100 or 200 seconds.

It will be apparent from the foregoing, that the energized condition of all of the time storage relays is destroyed by opening of either the contacts R14*t* or R16*t*. These open, respectively, when the "×" relay R16 is picked up or when a carriage return code CR occurs. Thus, once time information has been typed in the first column of the manuscript and punched in the first group of a block on the paper tape, the time information will be stored until numerical data in the dimension columns is typed and punched, the carriage return code occurring at the end of a line in the manuscript and at the end of the block on the punched tape, opening the contacts **R14*t*** so that previously stored time information is destroyed and the circuit is ready to receive a new set of information.

SUPPRESSION OF INSIGNIFICANT ZEROS

In order for the digital record or punched tape 16 to be properly read by the data processing "computer," a predetermined, fixed number of binary code lines must appear in each axis component "group." For the time information group, there should be three digits or lines, and for each of the component distance groups there should be a total of eight lines. Correspondingly, on the manuscript as shown in Fig. 5, there are three digit places in the first column and eight digit places in each of the dimension columns 2–6. As previously explained, a time-designating number may be either 1 second, 10 seconds, or 100 seconds, for example, and these may be typed as 001, 010, and 100, respectively. However, in the first two cases, the 1 second and 10 second time periods may be represented simply by the notation "1" or "10," the insignificant zeros at the left of each number being suppressed and simply printed as spaces. Referring to Fig. 5, each number in columns 2–6 represents distance in inches, and the decimal point in each such number is understood to be before the fourth digit from the left. That is, any number between 999.9995 and 000.0005 inch may appear. A number printed as "+−−−−−525" means 000.0525 inch in a positive direction.

Because the shorter time periods and very short distances are often employed, it is desirable to eliminate the printing of zeros before the first significant figure in any number, and to simply cause the typewriter to space or print nothing at all in those digit places. The manuscript is thus much less cluttered and more conveniently read. On the other hand, in a number such as 001.0205, the last two zeros should be printed in order that the full number, i.e., 1.0205, will be directly readable. In Fig. 5, spaces are represented by the letter "s" for illustrative purposes, but in actual practice, no printing at all will appear where the letter "s" is shown.

It will be seen that the keyboard 15 (Fig. 4) has no "space" key. Rather, control means are provided in accordance with one feature of the invention such that the operator may simply press the "0" key whenever any digit place on the manuscript is to contain either a zero or a space, and the typewriter is automatically caused to print either a zero or a blank space as may be necessary to suppress insignificant zeros but to print significant zeros. When the typewriter prints a zero or a space, a corresponding pattern of holes is punched on the paper tape 16, as shown by the code chart in Fig. 7. However, when the paper tape is read by the "computer" for the machine tool, it responds in the same manner to both the space code and the zero code.

Referring again to Fig. 8A, the "0" key switch is connected only to an input line 55 if the relay contacts **R15*a* are open, or is connected to both the input lines 55 and 56 for the matrix 20 if the contacts R15*a* are closed. Thus, when the "0" key switch is closed, only the output line 20*d* will be placed at a high potential and the relay R3 (Fig. 8B) energized to produce a "space" code energization of the coding relays providing the contacts R15*a* are open. On the other hand, if the contacts R15*a* are closed, then closure of the "0" key switch will result in five matrix output lines 20*b*–20*f* being placed at a relatively high potential so that the five coding relays R1–R5** (Fig. 8B) will be energized to represent the "0" code.

The contacts **R15*a* are settable to be either open or closed, and are controlled by a relay coil R15 shown in the upper portion of Fig. 10. The relay coil R15 is connected between a positive voltage source and the ground bus G through a contact network 58 which is responsive to the printing of characters in such a manner that the relay R15** is energized before the appearance of the first significant digit in a column and is de-energized after the appearance of the first significant digit.

A moment's study of the coding relay contacts appearing in the network 58 with reference to the coding chart of Fig. 7 will reveal that the network closes whenever the codes +, —, P, M, CR, or "tab after a dimension column" occurs. Closure of the networks on "tab after a dimension column" is brought about by the contacts **R39*a*, the relay coil for which will be described at a later point. It is sufficient here to note only that the closure of the contact network 58 will result in energization of the relay R15 which will then seal in through its own contacts R15*b*. With the contacts R15*b* closed, the network R58** will open to de-energize the coil R15 upon the occurrence of any of the codes 1–9 or "×."

Thus, if a carriage return has been executed and the typewriter carriage is at the beginning of the first column, the relay R15 will be energized and sealed in, so that the contacts R15*a* (Fig. 8A) are open. Actuation of the zero key will thus cause spaces to be printed until a valued digit 1–9 or the character "×" is printed. If a time period of 010 representing 10 seconds is to be typed in the first column, actuation of the "0" key, the 1 key, and reactuation of the "0" key will result in a space, a 1 and then a 0 being printed. The insignificant first zero is thus suppressed, while the significant second zero is printed.

After the typing of information in the first column is completed, and the typewriter carriage is tabulated to the second column, the relay R15 will remain energized. The first character typed in the second column, however, will be representative of direction, i.e., either a +, —, P or M. When that sign character is typed, the contact network 58 will close, re-energizing the relay R15. Accordingly, if the "0" key is pressed one or more times after the printing of the sign character, the contacts **15*a* will be open and blank spaces will be printed on the manuscript. However, as soon as the first valued numerical digit 1–9 is typed in the number for the second column, then the relay contact network 58 will open, de-energizing R15** so that each time thereafter in that particular column that the "0" key is pressed, zeros will actually be printed on the manuscript.

This action may be better understood with reference to the first number appearing in column 2 of the exemplary manuscript shown in Fig. 5. There, a + sign is typed and printed as the first character of the number. Then, the "0" key is pressed and the typewriter simply spaces over the second digit place, as represented by the small letter "s." When the character "3" is next typed and printed, the relay R15 is de-energized so that after typing the "5" and then typing the "0," the latter is printed as a "0" rather than as a space.

When the typewriter is tabulated from the second to the third column, the contact network 58 will again close, energizing R15. Thus, after the typing of a sign character in the first digit place of the column 3, subsequent actuation of the "0" key will result in printing of spaces until the first valued digit character is typed which will result in opening of the contact network 58 and de-energization of the relay R15. This will close the contacts R15*a* so or the contacts R46*g* will be closed. Accordingly, a ground potential will appear on the terminal 66 and will thus cause printing of either a zero or a space, depending upon whether the relay contacts R15*a* (Fig. 8A) are open or closed.

Finally, if the time number stored is of the units order (i.e., ½, 1, 2, or 5 seconds), then the wiper SS3B will find ground potential at station 6 because the contacts R48*e* and R50*d* will both be closed. Thus, ground potential will be supplied through one of the contacts R31*e*, R33*e*, R35*e*, or R36*e* to the corresponding terminal of the coding matrix 20 so that the particular valued digit which is stored will be printed by the typewriter and punched on the paper tape. When the wiper SS3A reaches station 6, it will not receive a ground potential if the number stored is of the units order because the contacts R48*g* will be open. However, if the number stored is of either the hundreds or tens order, the contacts R48*g* will be closed and ground potential will be supplied to the terminal 66, thus causing the coding matrix to energize the relays R1–R6 in that combination representing a "0," the latter character thus being typed in the third digit place of the time column.

In this manner, time numbers typed on the keyboard 15 when the typewriter carriage is in the first column of the manuscript will be stored in the circuitry illustrated by Fig. 12, and upon actuation of the "tab" key will be "read out" as the stepping switch SS3 goes through one complete cycle. Upon read-out, the wiper SS3B of the stepping switch will energize one of the input lines for the coding matrix 20 to cause printing of the stored value digit at the proper place in the time column, while the wiper SS3A will supply signals to the coding matrix to cause printing of either zeros or spaces at appropriate digit places in the time column, depending upon the action of the relay contacts R15*a*.

The stepping switch SS3 also has a third bank of contacts SS3C with a wiper that moves in unison with the wipers SS3A and SS3B. After the time period digits have been sensed and printed in response to the wipers SS3A and SS3B moving over stations 1–6, the wiper SS3C will contact station 8 and connect a terminal 70 to ground. The latter terminal is an input line for diode connections to the coding relays R2, R5, and R6 in Fig. 8B, and energization of these three relays will result in a "tab" signal being supplied to the typewriter 11. Accordingly, after the time period number has been printed the typewriter will automatically tabulate over to the second column of the manuscript as the wiper SS3C passes station 8 and will then be in readiness to receive numerical information for column 2.

AUTOMATIC PRINTING OF ZERO DISTANCE IN A DIMENSION COLUMN

As previously mentioned, there are a predetermined number *m*, here 8, of digit places in each of the dimension columns 2–6 for the exemplary manuscript shown in Fig. 7. It often happens that one or more of the axis components for a desired increment of movement is zero. To place this on the manuscript and punched tape, it would be possible to simply type successive zeros on the keyboard, so that the column would be filled with zeros on the manuscript, and eight serially spaced lines of punched holes for the "0" code would be punched on the paper tape 16. Following that, it would be necessary to strike the "tab" key in order to tab the carriage over to the next column.

Such a procedure would be time consuming and conducive to error, since the operator might easily miscount the number of times that the "0" key is depressed.

In accordance with one feature of the present invention, provision is made to automatically cause the typewriter to print successively a predetermined number *m* of a particular character in response to but a single actuation of a special control key at the beginning of a dimension column. Correspondingly, the predetermined number *m* of code lines will be punched on the tape corresponding to that particular character. The special control key may be the "tab" key of the keyboard 15, and provision is made to prevent the typing of the particular character when the "tab" key is struck if any other character key is first actuated after the typewriter carriage has moved into a dimension column.

In a more specific sense, the invention contemplates that the keyboard operator will be able to press the "tab" key at the beginning of a dimension column. In response, the typewriter will automatically print seven successive spaces (indicative of zero) and a "0" in that column and then automatically tabulate to the next column. If any column is to receive "0" distance information, therefore, the operator may dispose of that simply by hitting the "tab" key one time. In the graphic language of the technicians, the control circuits "squirt seven spaces and a zero."

To make this possible, first means are provided to sense whether any key except the "tab" key has been actuated after the typewriter has been placed in any dimension column. For if a sign or digit character is typed, it is an indication that the distance to be placed in that column is not "0." As illustrated in the exemplary form here shown, such means include a relay R20 (Fig. 14) which is connected between a positive voltage source and ground through a relay contact and network 72. All of the relay contacts in that network are controlled by different ones of the coding relays R1–R6, except for the normally closed contacts R13*c* which, as will be made clear below, are open only when the typewriter carriage is in the first column for the manuscript. A moment's study of the coding relay contacts shown in the network 72 with reference to the code chart of Fig. 7 will reveal that the network 72 closes whenever the coding relays are picked up in any code combination except that for "tab," and providing the typewriter carriage is then in a dimension column so that the contacts R13*c* are closed. Whenever the relay R20 is energized, therefore, it indicates that some character other than "tab" has been proviously typed in that particular dimension column. The relay R20 is sealed in through its own contacts R20*b* and a stepping switch bank SS1F until that column is completed, as will be made more clear below. It is sufficient to note that if the relay R20 is de-energized when the typewriter carriage is in a dimension column it is an indication that the typewriter is at the very beginning of that column because no other character has been typed in the column.

Further, second means are provided to prevent closure of the "tab" key from energizing the coding relays in a "tab" combination, thus preventing the typewriter from producing a tabulate action if the "tab" key is depressed at the beginning of a dimension column. Such means also include the relay R20, controlled as explained immediately above, together with its contacts R20*d* (Fig. 15) which serve to isolate the contacts R45*b*, the latter being closed when the "tab" key is pressed.

Finally, third means are provided to make the typewriter print (and the tape punching device to punch) a predetermined number *m* of symbols (either 0 or space) indicative of a particular character (zero) if the "tab" key is pressed whenever the relay R20 is de-energized. Such means include a stepping switch having a coil SS1 (Fig. 14) controlling the movement of wipers for a plurality of contact banks, and a relay R39. The "tab" key and the relay contacts R38*e* which appear in Fig. 8B are reproduced, for convenience of understanding, in Fig. 14. When the "tab" key is pressed, its permits current to flow through the stepping switch coil SS1, the relay contacts R13*f*, and the normally closed stepping switch interrupter contacts SS1*b'*. This can occur, of course, only if the relay contacts F13*f* are closed, and as will be made clear these latter contacts will be closed only if the typewriter carriage is then in a dimension column. Such energization of the coil SS1 moves the stepping switch wipers from their home position, station 1, to station 2. Closure of the "tab" key also resulted in energization and pick-up of the relay R39, and as soon as the stepping switch moved from its home position, the normally open off-normal stepping switch contacts SS1*a* closed, so that the relay R39 is sealed in through its own contacts R39*b*. As a result, the relay R39 causes the stepping switch SS1 to step around until it reaches its home position, since the interrupter contacts SS1*b'* will alternately make and break to successively energize the coil SS1 through a conduction path which includes the contacts SS1*a* and R39*b*. When the stepping switch SS1 returns to its home position, the contacts SS1*a* will reopen, stopping the stepping action and unsealing the relay R39.

The stepping switch SS1 is thus, in effect, a counting device which is set into free running operation in response to actuation of the "tab" key when the typewriter carriage is at the beginning of the dimension column. As a counting device, the stepping switch SS1 has, as illustrated by the contact banks SS1F and SS1B, a complete counting cycle which includes a number of units equal to or in excess of the number *m* of the particular characters which are to be automatically printed. As here shown, eight characters are to be automatically typed in succession, whereas the stepping switch SS1 as here shown has a counting cycle of eleven units (twelve stations, including two home contacts).

When the relay R20 is de-energized so that the contacts R20*c* are closed, then ground potential is supplied to the wiper of the contacts bank SS1B. As the latter steps through one complete counting cycle it contacts successively the contact points or stations 2 through 8 and these lead to a common terminal 74 which also appears in Fig. 8B and connects to the coding relay coil R3. Thus, as the wiper for the contact bank SS1B steps over stations 2 through 8, it supplies seven successive ground signals to the terminal 74, and these ground signals in turn pick up the coding relays, i.e., relay R3, so as to produce a space code signal which is supplied to the typewriter. The latter is caused to print seven successive spaces, and seven corresponding code lines are punched in the paper tape. When the wiper for the contact bank SS1B reaches station 9, a ground signal appears on the terminal 75 which is shown also in Fig. 8A connected to the matrix input line 56. This energizes those particular ones of the coding relays (i.e., relays R1–R6) which supply a signal to the typewriter which makes the latter print a "0." When the "0" is printed, a corresponding code line is punched in the paper tape. Thus, when the "tab" key is pressed at the beginning of a dimension column, seven successive spaces and a "0" are "squirted" automatically into the typewriter.

Finally, when the wiper for the contact bank SS1B reaches station 10, ground potential appears on the terminal 76 which is also shown in Fig. 15. In a manner which will be more fully described below, this ground signal causes the typewriter to either execute a tabulate motion or a carriage return motion depending upon which column it then is in. Finally, when the wiper for the contact bank SS1B returns to its home position, the intermittent energization of the coil SS1 is terminated by opening of the contacts SS1*a* and the circuit is returned to its original condition.

It was mentioned above that the relay R20 when once energized seals in through its own normally open contacts R20*b*. This holding path includes a contact bank SS1F of the stepping switch SS1. If any character but "tab" is first typed in a dimension column, the stepping switch SS1 will move from its home or first station to its second station, as will be made clear presently. Also, this will cause energization of the relay coil R20 and closure of the contacts R20*b* so that thereafter, the relay R20 is sealed in as the stepping switch SS1 moves through stations 2–9. As the stepping switch SS1 completes its eight unit counting cycle, and then steps home via stations 10 and 11, however, the holding circuit for relay R20 will be broken so that the latter is de-energized and restored to its original condition.

The stepping switch SS1 performs an additional function, that of sensing the number of digits which have been typed at any instant in a dimension column. In other words, the stepping switch SS1 senses the particular digit place or order in any given dimension column in which the typewriter carriage is then located. To make the stepping switch SS1 move one step each time that any character or space is typed into and printed in a dimension column, a coding relay contact network 78 leads from ground and through a stepping switch bank SS1E, relay contacts **R39*a* and contacts R13*f* to the coil SS1. The contact network 78, as will be apparent by study thereof in the light of the coding chart in Fig. 7, closes when the coding relays are energized in any of their possible combinations except those for "tab" or "CR." Thus, any time that a character is typed by the typewriter, the wiper of the contact bank SS1E will be placed momentarily at ground potential. The relay contacts R39*a*** will, under most circumstances, be closed unless the relay R39 is energized and sealed in to effect the homing operation of SS1 previously described. Moreover, the contacts R13*f* will be closed any time that the typewriter carriage is not in the first column, i.e., when the typewriter carriage is in any dimension column. Therefore, each time that a character is typed in a dimension column, the stepping switch coil SS1 will be momentarily energized, causing all its wipers to move from one station to the next. The position of these wipers, therefore, represents the number of digits which have been typed in a dimension column up to that instant. The position of the wipers, in other words senses the digit position of the typewriter carriage within a dimension column, at any time.

At the end of a dimension column, when the "tab" key is depressed, then SS1 and R39 will be energized as previously explained so that the stepping switch SS1 will automatically return to its home position. As it is stepping back to its home position, however, the relay R20 will be energized and the contacts R20*c* open so that no ground potentials appear on the terminals 74, 75 and 76 associated with the contact bank SS1B. The manner in which this counting or sensing action of the stepping switch SS1 is utilized will be more fully explained below in connection with the checking and alarm features of the invention.

AUTOMATIC TABULATE AND CARRIAGE RETURN

It will be apparent from Fig. 4 that no "carriage return" key is provided on the keyboard 15. In accordance with one feature of the invention, provision is made to cause the typewriter carriage to automatically tabulate or execute a carriage return motion depending upon whether it is at the end of the first column after having received a special "×" code (so that it must execute a carriage return), or whether it is at the end of the last dimension column (so that it must execute a carriage return). In all other cases, the typewriter carriage is caused to simply tabulate in response to actuation of the "tab" key. The operator thus never has to concern himself with whether the typewriter is to tabulate or whether it is to execute a carriage return motion. He just presses the "tab" key and the proper action takes place, including the punching of a "tab" or "CR" code line in the paper tape 16.

It will be recalled that in 3-out-of-5 axis operation (when a special code ×35, ×45, ×36, or ×46 has been typed and stored) no data at all is to be typed (and none is to be punched in the tape) for the columns corresponding to the unused axes. These columns must be skipped. In accordance with still another feature of the invention, means are provided to cause the typewriter to automatically tabulate past these columns which must be skipped, so that the operator need not ever be concerned as to whether he has pressed the "tab" key a sufficient number of times and as to whether the typewriter carriage is in the proper column. The operator needs simply to press the "tab" key once at the end of any column and the typewriter does, under the control of the means about to be described, what it must properly do.

In the exemplary arrangement here shown by Fig. 15, means are provided, first, to sense the column position of the typewriter carriage. This is done by counting the number of tabulate signals which are supplied to the typewriter after its carriage has been located in the first column of the manuscript. For example, if the sensing means indicate that three tabulate signals have been supplied to the typewriter, since the carriage of the latter was in the first column, then the carriage for the typewriter must at that time be in the fourth column of the manuscript as shown in Fig. 5.

Such sensing or counting means, here take the form of a stepping switch having a coil SS2. That coil is associated with a plurality of stepping switch contact banks including the banks SS2A and SS2B as shown in Fig. 15. Whenever, the wipers for the stepping switch banks are in their home positions, i.e., contacting station 1 of the respective banks, the normally closed "off normal" contacts SS2*a* will be closed, thereby energizing the relay coil R13. Whenever the stepping switch SS2 is in any other position but home, indicating that the typewriter carriage is in some column other than the first, then the contacts SS2*a* will be open and the relay R13 de-energized. It is in this manner that the relay R13 and the contacts controlled thereby at all times indicate whether the typewriter carriage is in the first column or in one of the five dimension columns of the manuscript.

To illustrate how the typewriter carriage is automatically caused to tab once or more than once in response to a single actuation of the "tab" key, or is caused to execute a carriage return movement if that is necessary in response to actuation of the "tab" key, the various conditions that can exist will be considered in the order of their appearance in the exemplary manuscript of Fig. 5.

To begin, with the typewriter carriage at the beginning of the first column, a special "×" code may be typed in on the keyboard 15 and it is both desirable and necessary for the typewriter carriage to execute a carriage return and space up one line in response to the actuation of the "tab" key following the three digit "×" code. Referring for example, to the top line in the manuscript of Fig. 5, the operator types "×05" and this is printed by the typewriter and stored in the extra function storage circuit of Fig. 11. The "×" relay R16 will thus be energized. The operator next presses the "tab" key. However, this does not energize the coding relays in a combination which supplies a "tab" signal to the typewriter. Rather, the relay R45 (Fig. 8B) is momentarily energized, as previously explained, so that its contacts R45*b* (Fig. 15) are momentarily closed. Since the relay R16 is at this time energized, the contacts R16*g* and R16*h* in Fig. 15 will be closed so that a ground signal is supplied directly to the terminal 80. The terminal 80 also appears in Fig. 8B and is connected by a plurality of diodes to those particular ones of the coding relays which, according to the table of Fig. 7, will cause the typewriter to execute a carriage return motion. Thus, at the end of a three digit "×" code in the first column when the "tab" key is pressed, the relay R45 will momentarily be energized, and as a result, the coding relays will be energized in a particular combination to supply a carriage return signal to the typewriter.

It is to be noted from Fig. 15 that this action will not result in energization of the stepping switch coil SS2 since the normally closed relay contacts R16*f* will under these circumstances be open. Also, as previously noted, when the coding relays are energized in a pattern corresponding to the carriage return code, the recording network in Fig. 10 will momentarily energize the carriage return relay R14. This, in turn, will open the contacts R14*a* in Fig. 11, thereby dropping out the "×" storage relay R16, so that the contacts of the latter restore to their normal conditions.

Therefore, whenever the "tab" key is actuated following an "X" code in the first column, the typewriter carriage does not tabulate to the second column but, instead, automatically executes a carriage return.

The same operation will take place following the typing of a special "×" code "×04" as shown at the top of the exemplary manuscript in Fig. 5. The next information to be typed is a time number. The response to the typing of a time number in the first column was previously described with reference to Fig. 13. It was there explained that time information stored in the circuits of Fig. 12 resulted in read-out and printing of that time information when actuation of the "tab" key placed a ground potential on the terminals 60. It was also explained, however, that when the wiper for the contact bank SS3C reaches station 8, ground potential is automatically placed on the terminal 70, the latter also appearing in Fig. 8B and being connected to the coding relays R2, R5, and R6, causing them to pick up and supply a tabulate signal to the typewriter. When the coding relays thus pick up, the recoding circuit in Fig. 10 places a ground potential on the terminal 37*a*.

The terminal 37*a* also appears in Fig. 15 and leads through the coil SS2 to a positive voltage source. The relay contacts R13*d* and R16*f* in series with that connection will both be closed under these circumstances, since the typewriter carriage is in the first column and since the "×" relay R16*f* will be de-energized. As a result, when the typewriter has printed the time number in the first column of the manuscript and as it tabulates to the second column automatically, the coil of the stepping switch SS2 is momentarily energized. The wiper for the contact bank SS2A thus steps from position 1 to position 2. The position of the wiper in station 2 indicates that the typewriter carriage is now operating in the second column of the manuscript. Next, numerical digits are typed into the second column. And the eighth one of these digits is followed by depression of the "tab" key. This, in turn, will cause momentary closure of the relay contacts R45*b* in Fig. 15. The contacts R16*g* are at this time open, but the contacts R20*d* will be closed because as previously explained, the relay R20 is energized whenever any key other than "tab" is pressed in a dimension column. Thus, ground potential will be supplied in response to actuation of the "tab" key through the contacts R45*b* and R20*d* to the wiper of the contact bank SS2A. Station 2 of that contact bank is connected to terminal 70 which also appears in Fig. 8B and this will cause pick-up of the coding relays R2, R5, and R6 which thus supply a "tab" signal to the typewriter.

When the "tab" key is released and the contacts R45*b* open, the coil SS2 which was energized through the contacts R16*f* in response to closure of those contacts is de-energized and the wipers of the stepping switch SS2 advance from station 2 to station 3. At the end of the typing of numerical information into column 3, the "tab" key is again depressed so that a ground signal is again supplied to the terminal 70, causing a tabulate signal to be supplied to the typewriter. Again, the stepping switch SS2 will be momentarily energized and will step from station 3 to station 4. At the end of typing of numerical information in column 4 of the typewriter, the "tab" key will be pressed and the relay contact R45*b* momentarily closed. The ground signal will thus again be supplied to the terminal 70, causing a "tab" signal to be supplied to the typewriter, and causing the stepping switch SS2 to advance its wipers from station 4 to station 5. At the end of typing of information in the fifth column of the manuscript, the same action takes place and the carriage is advanced to column 6, while the wipers of the stepping switch SS2*a* advance to station 6.

At the end of typing information in column 6, however, when the "tab" key is pressed and the relay contacts R45*b* close, a ground signal is not supplied to the terminal 70. Rather, station 6 of the contact bank SS2A leads directly to the terminal 80, so that the ground signals supplied thereon go to the carriage return input terminal shown in Fig. 8B, energizing the coding relays in a pattern which causes a carriage return signal to be supplied to the typewriter. Thus, at the end of the last dimension column, when the "tab" key is pressed, the typewriter automatically executes a carriage return motion.

As an incident to the execution of that carriage return motion, the wipers of the contact banks for the stepping switch SS2 will advance to station 7. At this point, the contact bank SS2B (Fig. 15) assumes control. It will be seen that stations 7 through 11 thereof are connected directly to ground, and that the associated wiper is connected through interrupter contacts SS2*b'* to the coil of the stepping switch SS2. By virtue of this arrangement, therefore, when the stepping switch SS2 senses that six columns have been passed through by the typewriter carriage, the SS2*b'* interrupter contacts pulse the coil SS2 until the wipers of all of its contact banks return to the home position. When the wiper for the contact bank SS2B reaches station 12 it no longer is connected to ground, and thus the stepping operation stops with the stepping switch in its home position ready to repeat the sensing of successive columns.

The above description makes clear the operation of the tabulate-carriage return select logic when the "tab" key is depressed following the typing of a special "×" code in the first column, or when the "tab" key is pressed at the end of a dimension column when all five of those columns are being filled with numerical information. However, as explained above, it is often desirable to operate the present typewriter and tape punching device so that it will prepare a punched record 16 without numerical data for components along certain ones, or non-selected, axes. When 3-out-of-5 axis operation is called for, the code "×35" designates that information is to be typed in columns 2, 3 and 5 of the manuscript (Fig. 5) with columns 4 and 6 being skipped; the code "×45" designates that information is to be typed in columns 2, 4 and 5 of the manuscript, with columns 3 and 6 skipped; the code "×36" designates that the columns 2, 3 and 6 in the manuscript are to receive numerical information, with the columns 4 and 5 being skipped; and the code "×46" designates that the columns 2, 4 and 6 are to receive numerical information with the columns 3 and 5 being skipped.

Provision is here made to automatically skip the proper ones of those columns depending upon the particular axis selection code that has been previously typed on the manuscript. The operator need only press the "tab" key but once at the end of each distance number.

It will be recalled with reference to Fig. 11 that the extra function storage relays R26–R29 are energized in different combinations according to any of the four possible axis-select codes. For the code "×35," the relays R26 and R28 are energized; for the code "×36," the relays R26 and R29 are energized, and so on. These relays store any particular axis-select code until a new and different code is typed on the keyboard.

Now if the relay R27 is energized, it signifies that column 3 on the manuscript is to be skipped. In other words, column 3 is a non-selected column. Therefore, when the wiper for the contact bank SS2B in Fig. 15 reaches station 3 signifying that the typewriter carriage has been tabulated into column 3 of the manuscript, it will find the relay contacts R27*b* closed and (after a short time delay occasioned by a time delay circuit diagrammatically indicated at 85) will receive a ground potential. This time delay permits the coil SS2 to be momentarily de-energized when the contacts R45*b* open with the release of the "tab" key pressed at the end of column 2. Therefore, shortly after the wiper for the contact bank SS2B reaches station 3 it is placed at ground potential, and this ground potential is supplied through the interrupter contacts SS2*b'* both to the coil SS2 and the wiper of the bank SS2A. Accordingly, a ground signal is supplied to the terminal 70, resulting in the coding relays being energized, as previously explained, to supply a second tabulate signal to the typewriter so that the latter automatically tabs immediately from column 3 to column 4. Likewise, the interrupter contacts SS2*b'* open with the energization of the coil SS2 so that the latter is de-energized and steps the wipers of the contact banks from station 3 to station 4.

Numerical information can then be typed in column 4, since the contacts R26*d* in Fig. 3 will be open.

On the other hand, if the contacts R27*d* are open and the contacts R26*d* closed in Fig. 15, the tabulating operation will proceed normally until the typewriter is tabbed from column 3 to column 4. Under these circumstances, ground potential will be supplied immediately through the closed contacts R26*d* and the interrupter contacts SS2*b'*, contacts R16*f*, and the contact bank SS2A to the terminal 70, causing the typewriter to immediately tabulate over to column 5. The stepping switch coil SS2 will also be energized, causing the stepping switch wipers to step from station 4 to station 5.

Now if the particular three-out-of-five axis-select code which is stored in the circuitry of Fig. 11 includes a "6," (i.e., "×36" or "×46"), the relay contacts R29*b* in Fig. 15 will be closed. Accordingly, when the stepping switch wiper for the bank SS2B reaches station 5, it will shortly thereafter receive a ground potential which is supplied to the terminal 70 and to the coil SS2. With that, the typewriter carriage will immediately be tabulated from column 5 to column 6 and the stepping switch wipers advanced from station 5 to station 6.

On the other hand, if the stored 3-out-of-5 axis-select code includes a "5," indicating that the sixth column is to be skipped, when the wiper for the contact bank SS2B reaches station 6, it will find the relay contact R28d closed, so that a ground potential will be supplied to the wiper of the contact bank SS2A which is then connected through station 6 thereof to the terminal 80 which leads to those coding relays which are energized to produce a carriage return signal. Thus, if column 6 is to be skipped, as soon as the typewriter carriage is tabbed into column 6, a carriage return signal is automatically supplied to the typewriter causing the latter to return to column 1. Also, the ground potential appearing on station 6 of the contact bank SS2B is supplied directly to the coil SS2 energizing the latter so that the stepping switch wipers step to station 7, and with that, the contact bank SS2B in combination with the interrupter contacts SS2*b'* causes the wipers of stepping switch SS2 to move around to their home position.

To summarize the foregoing, it will be seen that the typewriter here is responsive to tabulate and carriage return signals supplied by energization of particular combinations of the coding relays, and will execute, tabulate and return motions when those signals are supplied to it. Moreover, there is a code storage means as shown in Fig. 11 for representing a selected combination of the plurality of columns in which the typewriter may operate. The single "tab" key controls the tabulating and carriage return functions of the typewriter because it works in cooperation with the means for sensing the column position of the typewriter carriage, here exemplified by the stepping switch SS2 and its contact banks SS2A and SS2B. It will be seen that the contact bank SS2A supplies one tabulate signal to the typewriter whenever the "tab" key is actuated, if the typewriter carriage is in a column preceding a "selected" column because the wiper of the contact bank SS2A supplies ground potential to the terminal 70 which works into the coding relays. When the "tab" key is pressed with the carriage in a column preceding a "selected" column as the wiper for the contact bank SS2A steps to the next station, it will not sense a ground potential there because the corresponding one of the relay contacts R26*d*–R29*d* will be open.

However, the latter contacts are responsive to the conditions of the code storage means and they operate in cooperation with the sensing means or the SS2B bank of the stepping switch SS2 to supply a second ground signal to the terminal 70 which causes a second tabulation action of the typewriter carriage automatically whenever the "tab" key is pressed if the carriage is in a column preceding a "non-selected" column. Thus, in general terms, if the "tab" key is actuated once when the typewriter is in a column preceding a number, *n*, of non-selected columns, the typewriter will receive a number, $n+1$, of successive tabulate signals, causing the non-selected columns to be skipped.

Finally, the wiper of the SS2A contact bank in reaching station 6 converts the last tabulate signal generated and which would otherwise be supplied to the terminal 70 into a carriage return signal which is supplied to the terminal 80, the latter causing pick-up of the coding relays in a combination which supplies a carriage return signal to the typewriter instead of a tabulate signal.

Through the operation of this control circuitry, the operator is relieved of all worry as to whether he should cause the typewriter carriage to tabulate or execute a carriage return at the end of any given column; and he is relieved of all worry as to whether any particular column is to be skipped. All he needs do is press the "tab" key once at the end of the numbers which are typed into any of the six columns of the manuscript. In response the typewriter carriage is caused either to tabulate once or a plurality of times if it is necessary to skip succeeding columns, or is caused to execute a carriage return movement if that is necessary either because the typewriter has completed the printing of a special "×" code in the first column, or because the typewriter has completed the printing of a number in the last column.

At this point it will be appropriate to refer back to Fig. 14 in order to make clear the manner in which either a tabulate or carriage return signal is supplied to the typewriter at the end of the automatic "squirting" of seven spaces and a zero in response to the actuation of the "tab" key at the beginning of any dimension column. It will be recalled that after the wiper for the contact bank SS1B reaches station 9 a ground signal appears on the terminal 75 which causes the coding relays to make the typewriter print a zero in the last digit place. The wiper for the bank SS1B then steps to station 10 and supplies a ground signal to the terminal 76. This terminal also appears in Fig. 15 and results in ground potential being passed through the closed contacts R16*f* to the wiper of the contact bank SS2A. If that wiper is at stations 2, 3, 4 or 5 (indicating that the typewriter carriage is in columns 2, 3, 4 or 5) a ground potential will appear on the terminal 70 which, as previously explained, will cause the typewriter to execute a tabulate motion to the next column. On the other hand, if the wiper for the bank SS2*a* is at station 6, ground potential will appear on the terminal 80, and this as previously explained, will cause the typewriter to execute a carriage return movement. In either case, ground potential appearing at the terminal 76 will also energize the coil SS2 and will thus cause the wipers for the stepping switch banks SS2A to advance from one station to the next.

Thus, the automatic "squirting" of the zero information in any dimension column in response to a single actuation of the "tab" key at the beginning of that column also causes the typewriter carriage to automatically tabulate over to the next column or to execute a carriage return, as may be required. It will be understood, also, that if "0" information is typed into a selected column which is followed by a non-selected column, then a second "tab" signal will be supplied through the contact bank SS2B to cause the typewriter carriage to skip that non-selected column.

AUTOMATIC CHECKING OF ERRONEOUS CONDITIONS

In originally compiling the numerical data of time and component distances for successive incremental cuts by a machine tool on a workpiece, the work of the programming engineer becomes progressively more routine and requires progressively less judgment. Minute attention to details and accuracy becomes more important, however, because the "computer" which is to process the numerical data as it is represented in coded binary digital form on the punched tape 16 cannot of itself exercise judgment and make alterations for erroneous instructions or conditions. In order to prevent some slip of the program engineer or some inadvertent mistake of the operator who types the numerical data on the keyboard 15, it is extremely desirable to indicate when certain erroneous conditions exist during the preparation of the tape. Correction of mistakes at this point may result in the saving of ruined materials and lost time amounting to thousands of dollars. And such mistakes may frequently occur even though the program engineer and keyboard operator are careful, due to the very routine nature of the work involved at this stage of the process.

In keeping with the present invention, a number of conditions are automatically checked and an indication of any error given in order that it may be corrected before the punched tape 16 is actually used to supply the "computer" with data which will ultimately be used to control a machine tool's motions. Each of these may best be treated separately with reference to Fig. 16.

*Axis-select check*

It has been indicated previously that the data processing "computer" may handle numerical information for the control of motions along five axes of the machine tool or, alternatively, along three predetermined axes of the five it is possible to control. The "computer" needs to be told which axis it is to work in and, accordingly, it needs to receive from the tape 16 at the very beginning of its operation an axis-select code, either "×05," "×35," "×36," "×45," or "×46." It has been explained with reference to Fig. 12 that when such axis-select codes are typed on the keyboard, they are stored by the relays R25–R29 (Fig. 11). Thus, either the relay R25, or one of each of the pairs of relays R26, R27 and R28, R29 must be energized to indicate that axis-select instructions have been typed and have been placed on the punched tape 16.

In order to indicate an erroneous condition if such an axis-select code has not been typed, a contact network 90 is connected between ground and an alarm relay coil R51 connected at its opposite end to a positive voltage source. The contact network includes normally open contacts R14*c* which are closed each time that a carriage return code signal is supplied to the typewriter. These are in series with normally closed contacts R25*f* and with two parallel branches which respectively include series-connected normally closed contacts R27*e*, R26*e*, and R29*e*, R28*e*. Thus, whenever a carriage return code signal is supplied to the typewriter and the contacts R14*c* close, the contact network 90 will be closed to complete an energizing path for the relay R51 if no axis-selection code has been stored in the relays R25–R29 of Fig. 11. In that event, the relay R51 will be energized and sealed in through its own normally open contacts R51*b* in series with a normally closed "stop" push button switch 91. Pick-up and seal-in of the relay R51 will result in closure of the contacts R51*c* and the consequent energization of an alarm device 92 which may give either the visual or audible indication that an erroneous condition exists. The keyboard operator may then de-energize the relay R51 and inactivate the alarm device 92 by momentarily pressing the push button switch 91. He may also then see, by reference to the manuscript which has been printed by the typewriter, that no axis-select code has been provided, and he may correct the situation either by correcting the tape or starting the typing operation anew.

*Time checks*

It has been explained previously that any one of nine possible time periods may be numerically typed into the first column of the manuscript, and correspondingly punched on the paper tape 16 to designate the time in which the successive steps of the machining process are to be carried out. That is, each of the time periods for the machining of one increment is numerically designated by typing any one of nine possible sets of numbers in the first column of the manuscript. When the digital record or punched tape 16 is supplied to the "computer" which converts that numerical information into control signals for a machine tool, the "computer" can complete the processing of one block of information in a certain predetermined minimum time period. That minimum time period may, for example, be two seconds. Now it will be noted that the two shortest of the available time periods, i.e., ½ second and 1 second are actually less than the minimum time required for the "computer" to process one block of information. If the "computer" were working on absolute time, therefore, it could not produce in ½ or 1 second the signals which must be modulated over those short time periods to correspondingly control the machine tool. It is for this reason that the time multiplier or ratio codes "×04," "×02," and "×01" are provided to make the director work on either a 4:1, 2:1, or 1:1 time ratio. Thus, if a ½ second time period is called for in the manuscript and on the punched tape, and if it has been preceded by an "×04" code which calls for a 4:1 time ratio, the "computer" will work on a "stretched" time scale and will actually take 2 whole seconds to process and produce signals which will later be employed over a ½ second time interval to control the machine tool. In a similar way, if a 1 second time period is called for on the manuscript and the punched tape 16, and if an "×02" code has been previously typed into the punched tape, the director will work on a 2:1 time ratio and will be able to take 2 seconds to process numerical information which will be later used over a 1 second time period to control the machine tool. Thus, it is necessary that the value of the time multiplier, when multiplied by any time interval called for, equal or exceed the minimum time in which the "computer" is capable of processing one block of information.

The requirements, specifically, are that if a ½ second time interval is called for, then a time multiplier code of "×04" which multiplies time by four, must have been previously put onto the punched tape. If a 1 second time period is called for, then either an "×02" or "×04" multiplier code must have been previously put onto the punched tape. If a 2 second time period or any time period of longer duration is called for, then it is permissible for the previously typed time multiplier to be either "×01," "×02," or "×04" which designate, respectively, multipliers of one, two, or four.

In order to provide an indication of an error in the time periods called for, when compared with the programmed time multipliers, a relay contact network 95 is provided as shown in Fig. 16, having a plurality of circuit paths leading from the positive voltage source through the relay coil R51 to a terminal 96 which connects to station 2 of the SS3C contact bank for the stepping switch SS3 (Fig. 13). Thus, whenever the wiper for the contact bank SS3C contacts station 2, ground potential will appear on the terminal 96 and the relay R51 will be energized if a conduction path then exists through the contact network 95.

As previously indicated, during the time that the stepping switch SS3 is completing one complete cycle of stepping motion, the time information which has been typed on the keyboard will be stored in the relays illustrated in Fig. 12. Moreover, the previously typed time multiplier code "×04," "×01," or "×02" will be stored by the energization of one of the relays R22, R23, or R24 in Fig. 11.

If a ½ second time period has been stored, then the contacts R36*f* in Fig. 16 will be closed; and if the time multiplier code "×04" has not been stored, then one of the other time multiplier codes "×01" or "×02" will be stored so that either the contacts R22*d* or R23*d* will be closed. This condition, therefore, will result in a conduction path for current flow through the relay R51 as the stepping switch SS3 passes station 2. The relay R51 will thus be energized and will cause the alarm device 92 to give an indication that an error exists.

In order to make certain that a time multiplier code of either "×04" or "×02" has been provided on the punched tape 16 when a time period of 1 second is called for, contacts R48*h*, R46*h*, R31*f* and R22*e* are connected in series as a part of the network 95. If a 1 second time period has been stored by the circuitry of Fig. 12, then the contacts R31*f* will be closed. Moreover, the contacts R48*h* and R46*h* will be closed because the time number stored is neither of the tens or hundreds order. Now if a time multiplier code other than "×04" or "×02" has been punched on the paper tape, it will have been an "×01" code calling for a time ratio of 1:1. This will mean that the relay R22 is energized and the contacts R22*e* closed. Thus under these circumstances, a conduction path will be provided for the relay coil R51, and that relay will pick up to energize the alarm device 92.

It will be realized upon an inspection of the nine available time periods that one of four significant valued digits ½, 1, 2, and 5 are possible and these may be followed (with the exception of the ½ value) by either one or two zeros. However, the "computer" may not have the capacity for working over the relatively long time period of 500 seconds. If this number should be typed onto the manuscript and punched into the paper tape 16, it would constitute an erroneous condition. To give an alarm or indication of this, the contacts R35*f*, R46*i*, and R48*i* are connected in series as a part of the contact network 95. If the number 500 has been typed as a time period, then all of these contacts will be closed, and they will result in the energization of the relay R51 as the stepping switch SS3 passes station 2, so that the alarm device 92 will be actuated.

Finally, if no command time at all has been typed into the manuscript and punched onto the paper tape 16 for a given line of numerical data, then this would constitute an erroneous condtion, for the "computer" must have time information before it can work on distance information. Such an erroneous condition could arise, for example, if three zeros were typed successively in the first column of the manuscript, resulting in none of the time storage relays of Fig. 11 being energized. Under these circumstances, an alarm is given by energizing R51 through a path in the network 95 which includes normally closed contacts R50*e* and normally closed contacts R48*j*. These latter contacts will both be closed if no command time has been stored and thus has not been printed on the manuscript and punched into the paper tape.

*Overspeed checks*

In any block of numerical information, i.e., a line typed on the manuscript or a block punched into the paper tape 16, there is a numerical value of time and a plurality of numerical values representing distances to be moved along different axes during that time interval. The ratio of any distance number to its associated time number represents a velocity or a feed rate which must be accomplished by the machine tool. In almost every instance, the machine tool feed mechanism or drive will have a certain maximum velocity or feed rate which it can produce. It may be assumed, for example, that the machine tool which is to be controlled from the punched tape 16 prepared on the typewriter and tape punching device here illustrated has a maximum feed rate for its various movable elements of two inches per second. This means, therefore, that any combination of time and distance typed onto the manuscript and punched into the paper tape 16 will exceed the capacity of the machine tool and constitute an erroneous condition if the velocity ratio thereof exceeds the value of two inches per second.

In accordance with the present invention, means are provided to store both time and distance information, to compare the two, and to provide an indication if their ratio exceeds the predetermined maximum feed rate at which the machine tool elements can move. With the nine available time periods selected as set forth above, the maximum distances which can be called for in combination with each may be tabulated as follows, and distance digits which constitute erroneous conditions also may be tabulated as follows:

| Time in Seconds | Maximum Digit Condition | Largest Correct Dimension |
|---|---|---|
| 200 | 4--.---- | 399.9995 |
| 100 | 2--.---- | 199.9995 |
| 50 | 1--.---- | 99.9995 |
| 20 | -4-.---- | 39.9995 |
| 10 | -2-.---- | 19.9995 |
| 5 | -1-.---- | 9.9995 |
| 2 | --4.---- | 3.9995 |
| 1 | --2.---- | 1.9995 |
| ½ | --1.---- | .9995 |

It will be seen, that with a time period of 200 seconds, if the numerical decimal digit of 4 or of greater value is typed in the first digit place (hundreds order) of any dimension column, an error condition exists. Similarly, with the time period of 100 seconds, if a numerical digit of the value 2 or any higher value is typed in the first digit place, an alarm condition exists. Moreover, with a time period of 50 seconds, if a numerical digit 1 or of any higher value appears in the first digit place of a distance number, an alarm condition exists. With a time period of 20 seconds, if a numerical digit of 4 or any higher value appears in the second digit place (tens order) of a distance number an error condition exists, while with a time period of 10 seconds, an error condition exists if a numerical digit of 2 or any higher value appears in the second digit place of a distance number. Similarly, with a time period of 5 seconds, an error condition exists if a numerical digit of 1 or any higher value appears in the second digit place. Still further, with a time period of 2 or 1 seconds, an error condition exists if a numerical digit 4 or 2, respectively, or one of any higher value appears in the third digit place (units order) of a distance number. Finally, with a time period of ½ second, an error condition exists if a numerical digit of 1 or any higher value appears in the third digit place of a distance number.

In the present instance, as shown in Fig. 16, means are provided to sense the value of each numerical digit as it is typed on the keyboard, printed by the typewriter and punched on the paper tape. Means are provided also, to sense the digit place or the order of that numerical digit. Means are further provided to store time numbers and to compare them with the sensed distance numbers to indicate the existence of the various conditions of error set forth above.

Referring to Fig. 16 it will be seen that a numerical distance sensing contact network 100 is provided which includes contacts of the various coding relays R1–R6. Reference to the coding relay contacts shown in the network 100 and the coding relay table of Fig. 7 will show that this network closes or provides a conduction path therethrough whenever the coding relays are energized in a combination representing any of the numerical digits 1 through 9 inclusive. Thus, the line 101 will be at ground potential whenever any numerical digit between 1 and 9 is typed on the keyboard and printed by the typewriter.

Leading from the line 101 to a second line 102, is a parallel connection of contacts **R4*m* and normally closed contacts R2*r*. Thus, as may be seen by reference to the coding relay chart of Fig. 7, a terminal 102** will be grounded whenever the coding relays are energized to represent any decimal value of 4 through 9 inclusive.

Also leading from the line 101 to a terminal line 103, is a normally open set of relay contacts **R1*r*. The terminal 103** will therefore be grounded whenever the coding relays are energized in any combination corresponding to the decimal digits 2 through 9 inclusive.

Leading from the terminal 102 to a line 104 is a normally open set of relay contacts **R33*f*, and these will be closed, as may be seen by reference to Fig. 12, whenever the time period typed and stored includes as its significant valued digit the decimal number 2. Leading from the terminal 103 to the line 104 are normally open relay contacts R31*g*** which will be closed whenever the stored time number includes as its significant valued digit the decimal number 1.

Thus, a line 104 will be at ground potential each time that the coding relays are energized in a combination representing the digits 4–9 inclusive if the stored time information contains a 2; or if the coding relays are energized in the combination representing any of the digits 2–9 inclusive, and if the stored time information includes the valued digit 1. The lines 104 and 101 are connected through various time storage relay contacts to different stations of a stepping switch bank SS1C which is stepped around in response to the energization of the coil SS1 (Fig. 14). When the first digit of a distance number is typed, a wiper of the contact bank SS1C will be at station 1, and will then step to station 2. This first digit will be a character representative of direction or sign information, i.e., +, —, P, or M. When the second digit of a distance number (i.e., the hundreds order digit) is typed, the wiper of the bank SS1C will be at station 2 and will then step to station 3.

Now if when the wiper is at station 2, and a time number of less than 100 seconds is stored, any digit value other than "0" typed in the first digit place of the distance number is erroneous, and the normally closed contacts **R46*k* will be closed to place ground potential (appearing on the line 101) to station 2 of the bank SS1C, thus energizing the relay R51. Accordingly, the alarm device 92** will be actuated.

On the other hand, if a time number of 100 seconds or more (i.e., 100 or 200 seconds) is stored, then the relay contacts **R46*k* will be open and the contacts R46*j* closed. If the stored value is 200 seconds, then the contacts R33*f* will be closed and ground will be supplied to the terminal 104 and thence to the contacts at station 2 of the bank SS1C if the numerical value of the first digit typed in a dimension column is 4 or above. This will result in energization of the relay R51 and actuation of the alarm device 92. But if the stored time number is 100 seconds, then the contacts R31*g* will be closed and ground potential supplied to the line 104** only if the value of the first numerical digit typed in the dimension column is 2 or more. Under those circumstances, a conduction path will be supplied by the closed contacts R46*j* through the wiper station 2 for the relay R51, and the alarm device 92 will be actuated.

When the wiper for the contact bank SS1C is at station 3, indicating that the second significant digit in a distance number is about to be typed, an indication must be given if that number is 4 or greater and the stored time period is 50 seconds, if that number is 2 or greater and the stored time period is 10 seconds, or if that number is 1 or greater and the stored time period is 5 seconds. Connected to the station 3 contact of the SS1C bank is normally closed relay contact R46*l*. The latter will be open in the event that the time period is 100 seconds or more. If the time period is less than 100 seconds but greater than 10 seconds, then the contacts R48*k* will be closed and the contacts R48*l* open. Under these circumstances, if the time period stored is 20 seconds, then the contacts **R33*f* will be closed, and a conduction path for the relay R51** provided if the digit typed by pick-up of the coding relays is 4 or greater. Secondly, if the time period stored is 10 seconds, then the relay contacts R31*g* will be closed and a conduction path to ground for the relay R51 will be provided if the value of the numerical digit typed, as sensed by the coding relay contacts, is 2 or greater. Finally, if the time period stored is only 5 seconds, then the relay contacts R48*l* will be closed and the contacts R48*k* open. Under these circumstances, a conduction path to ground will be provided for the relay R51 through the contacts R48*l* if any value digit, i.e., one other than zero, is typed and sensed by the contact network 100 so that a ground potential appears on the line 101. Thus, the alarm device 92 will be actuated if any of these erroneous conditions exist when time periods stored are 20, 10 or 5 seconds.

When the wiper for the contact bank SS1C is at station 4, it leads from the relay R51 through normally open contacts R51*f*, and thence either through normally closed relay contacts R36*g* to the line 104 or normally open relay contacts R36*h* to the line 101. If the time period stored is less than 10 seconds (½, 1, 2, or 5 seconds), then the relay contacts R50*f* will be closed, as will be apparent from the previous description of the time storage circuits in Fig. 12. If the particular one of those four possible time periods which is stored is 2 seconds, then the relay contacts R36*g* (which store a ½ second value) will be closed, and the contacts R33*f* will also be closed. Thus, a conduction path to ground for the relay R51 will be provided if the coding relays are picked up in a combination representing any numerical digit between 4 and 9 inclusive. This represents an erroneous condition and will result in actuation of the alarm device 92. On the other hand, if the time period stored is 1 second, the contacts R36*g* will be closed and the contacts R31*g* will also be closed. If the coding relays are energized in any combination representing the numerical value 2–9 inclusive, a conduction path to ground for the relay R51 will be provided, so that the alarm device 92 will be actuated. Finally, if the time period stored is ½ second, the relay contacts R36*g* will be open, but the contacts R36*h* will be closed. These lead to the line 101 and if any digit having a value of 1–9 is sensed by closure of the contact network 100, a conduction path for the relay R51 will be provided.

It will be seen from the foregoing that any of the error conditions listed in the foregoing table results in an indication or alarm. As each numerical digit is typed in a dimension column, the coding relay contacts in Fig. 16 serve as means to sense the value of that digit, or, more particularly, the range of values of that digit. The stepping switch bank SS1C, since it moves from one station to another each time a digit is typed in a dimension column serves as means to sense the order of any particular digit, that is, whether it is in the hundreds place, the tens place, or the units place. Finally, the time storage relay contacts which are shown in Fig. 16 serve as means to indicate the value of the time number which with any distance number forms a velocity ratio or feed rate. These time storage relay contacts are connected in circuit so that they form a complete energization path for the relay R51 when the predetermined maximum feed rate, here 2 inches per second, occurs or is exceeded.

*Sign check*

It will be apparent with reference to the exemplary manuscript in Fig. 5 that each distance number must have in its first digit place a sign symbol which indicates the desired direction of movement. The symbols + and — indicate positive and negative directions, while the symbols P and M also indicate positive and negative directions but carry additional information which is useful in the data processing "computer." Without this sign information, the "computer" might not operate properly; so that it becomes important to make certain that each seven digit distance number is preceded by a sign symbol on the manuscript, and correspondingly that each binary code digit group on the punched tape 16 is preceded by a sign code line.

In order to give an indication when the sign symbol is inadvertently omitted, means are provided as shown in Fig. 16 to sense when the typewriter carriage is at the very beginning of a dimension column. Such means in the present instance, comprise the stepping bank SS1C, and particularly the station 1 contact thereof which is connected with the wiper whenever the typewriter carriage has just been moved into a dimension column and is ready to receive the first character for that column. Second means are provided for sensing when any character except one designating sign information is typed into the typewriter. This means comprises in Fig. 16 a contact network 110 which includes a plurality of coding relay contacts in series with the contacts **R13*e*. As previously noted, the relay R13 will be de-energized and the contacts R13*e* closed only when the typewriter carriage is not in the first column, i.e., when it is in any dimension column. Study of the coding relay contacts in the network 110 with reference to the coding chart of Fig. 7 will show that the network closes as the coding relays are picked up in different combinations for all codes except +, —, P, M, or tab. As shown in Fig. 16, the network 110 is connected from ground in series with station 1 of the contact bank SS1C to the relay coil R51. Therefore, if the first character typed into a dimension column is neither +, —, P, M nor tab, an energization circuit for the relay R51 will be created and the alarm device 92** actuated to indicate an erroneous condition.

*Last digit check*

The last numerical digit appearing in any distance number in a dimension column may, for proper operation of the "computer" which uses the punched tape 16, be one of a selected group of permissible characters. In this instance, the last digit must be either a "0" or a "5," since the "computer" can process data which is accurate only to the nearest .0005 inch. It will be seen on reference to the exemplary manuscript in Fig. 5 that each and everyone of the dimension column numbers ends in either a "0" or a "5." If the dimension column ends in some number which is not one of the group of permissible characters, i.e., is not either a "0" or a "5," then an error condition exists and the keyboard operator should be warned of the fact that he has typed the wrong character.

Such an indication and warning are provided by a part of the circuitry shown in Fig. 16. First, means are provided for sensing when the typewriter has printed all but the last digit in a distance number appearing in a dimension column. Such means in the present instance include the contact bank SS1C with its wiper which is stepped to successive stations as the successive characters are typed in a dimension column. When seven characters, i.e., one sign character and six numerical characters have been typed in any given column, the wiper for the contact bank SS1C will be connected with station 8, and this will represent the fact that all but the last digit in that dimension column has been printed by the typewriter.

Secondly, means are provided for sensing when any character except one from the selected group of permissible characters is typed on the keyboard and printed by the typewriter. Such means in the present instance constitutes coding relay contacts which provide a conduction path when any of the eighteen codes except the permissible codes "0" or "5" are represented by an energization pattern of the coding relays. As shown in Fig. 16, station 8 of the contact bank SS1C is connected directly to a terminal 40 which also appears in the re-coding circuit of Fig. 10. As previously explained, the terminal 40 in Fig. 10 is at ground potential whenever the coding relays are picked up in a combination indicative of any character except "0" or "5."

Thus, when all but the last digit in a dimension column has been typed and if any character but "0" or "5" is next typed, a conduction path will be provided through the wiper of the contact bank SS1C and station 8 thereof for the relay R51 which serves as a means to indicate an error condition. The alarm device 92 will be actuated in response to energization of the relay R51.

*Too few digits check*

It is necessary that whenever any dimension column in the manuscript is a "selected column" or one which is not to be skipped due to the previous storing of an axis selection code, that eight characters be typed into that column. Otherwise, there would be fewer than eight lines in the corresponding "group" on the punched tape 16 and the "computer" could not properly process that group of code lines.

In order to give an indication of this erroneous condition, means are provided to complete an electrical circuit if a "tab" or "CR" code is printed by the typewriter befor eight digit characters have been typed in a dimension column. For this purpose, the stepping switch contact bank SS1C serves as means to sense when the typewriter carriage is in readiness to type a character in any of the second through the seventh digit places of a dimension column. Such means comprises diode connections from stations 2, 3 and 4 of the bank SS1C to the terminal 39 appearing in Fig. 16, as well as direct connections from stations 5, 6 and 7 of the bank SS1C to the terminal 39. The terminal 39 appears also in Fig. 10 and, as previously explained, is at ground potential whenever the coding relays are picked up in a combination which represents either "tab" or "CR." If a "tab" or a "CR" signal should be supplied to the typewriter before the latter has typed seven digits or characters in a distance column, a conduction path will be created for the relay R51 through the wiper of the contact bank SS1C and through one of the stations 2–7 therefor. Energization of the relay R51 will actuate the alarm device, calling this condition to the attention of the operator who may then, by inspecting the manuscript readily see that too few digits have been typed in a dimension column.

*Too many digits check*

By the same token, the "computer" which accepts the punched tape 16 cannot properly process a "group" of coded lines on the tape if there are more than eight lines in the group. In other words, after eight characters (one sign character and seven spaces or numerical characters) have been typed in a dimension column, the next character typed into the typewriter and the next line appearing on the punched tape must be one representing either "tab" or "carriage return." In a general sense, it may be considered that the typewriter must print a predetermined number, *m*, of digits in each dimension column.

To give an alarm indication when too many digits are typed, means are provided for sensing when *m* digits (here eight) have been printed in any column. Such means include the contact bank SS1C and particularly station 9 thereof, since the wiper will be in connection with station 9 after eight characters have been typed in a dimension column. Further, means are provided for sensing if any character other than one which moves the typewriter to the next column is typed on the keyboard. Such means may include a network 112 made up of a particular combination of coding relay contacts such that it will close when the coding relays are energized in any combination except those two combinations which indicate that either a "tab" or a carriage return signal is supplied to the typewriter.

For indicating when both of the sensing means are so conditioned in that an erroneous situation exists, the network 112 is connected from a ground point to station 9 of the contact bank SS1C, so that the relay R51 will be energized under these conditions. With that, the alarm device 92 will be actuated and the keyboard operator will be apprised of the fact that some error has been made.

It will be seen from Fig. 16 that normally open relay contacts R20*a* are interposed in series between the network 112 and station 9 of the contact bank SS1C. These contacts will in most cases be closed, because as previously explained, the relay R20 is picked up and sealed in whenever any character other than "tab" is typed in a dimension column. However, if the automatic "squirt" of zero distance information is used in any particular column, the last character is squirted from station 9 of the contact bank SS1B in Fig. 14. When this "squirt" zero distance information operation is progressing, the contacts R20*a* will be open so that an error condition will not be indicated.

AUTOMATIC PROVISION OF SPECIAL SYMBOL ON A DIGITAL RECORD TO PROVIDE TIME CONTROL FOR DATA PROCESSING APPARATUS

As is made clear in the above-mentioned copending application, the data processing equipment or "computer" which is intended to accept and utilize the punched tape 16 has means for adjusting the time scale or speed with which it works. If time periods are called for on the digital record which are, say, 20 or 200 seconds, the "clock" in the "computer" may be turned up to run on faster than absolute time, as high as 150 percent of absolute time. Thus, 20 seconds coded on the tape 16 would require but 16.66 seconds in the "computer" for the corresponding operation of the controlled machine tool; and 200 seconds coded on the tape 16 would result in a given increment being cut in 166.6 seconds. The distance components and the corresponding increment would remain the same as that represented numerically on the coded digital tape 16. If time is "speeded up" in the "computer" while distances called for remain the same, then the velocity or feed rate of the movable machine tool components will be correspondingly increased. If the original ratio of time and distance as represented for an increment on the punched tape 16 represented a feed rate which is near the maximum feed rate of the machine tool, setting of the "computer" to operate on faster time might result in an attempt of the machine tool elements to move at a velocity or feed rate faster than their maximum rated feed rate. Accordingly, some special signal needs to be supplied to the director in order that it will be returned to operation on absolute time if it has been set to operate on a faster time scale and if the feed rate represented by the numerical data on the punched tape is within a predetermined percentage of the maximum feed rate capable of being produced at the machine tool.

Moreover, when relatively short time periods are called for by data typed on the manuscript and punched into the paper tape 16, and if the "computer" has been set to operate on an accelerated time scale, then it might happen that the "computer" in processing one block of information would not have sufficient time to completely handle that information. As previously explained, a minimum time period on the order of 2 seconds is necessary for the processing of each block of information. If a 2 second time period is called for by the punched tape and the clock is operating at 150 percent rate, then the "computer" would only take 1.66 seconds, and this would be an insufficient interval of time.

A special signal on the punched tape 16 which is accepted by the "computer" to automatically compensate for the foregoing conditions is a hole punched in the seventh column of the tape. Referring to Fig. 9, a punching mechanism 115 for creating holes in the seventh column of the tape is there diagrammatically shown, being actuated in response to energization of a coil 116. The hole in the seventh column may be placed at any location within a block.

In accordance with a feature of this invention, the coil 116 is energized whenever conditions exist which require that the "computer" receive a special compensating signal.

The coil 116 connects from a positive voltage source to a terminal 118 which also appears at the right in Fig. 17. Means are provided to supply ground potential to the terminal 118 and to thus energize the coil 116 and cause punching of a hole in the seventh column of the tape 16 whenever the combination of time and a component distance in any block represents more than a predetermined feed rate. In the present instance, that predetermined feed rate is 50 percent of the maximum feed rate produceable by machine tool movable elements, and specifically, one inch per second. If any one of the nine available time intervals are typed by the typewriter and correspondingly punched on the tape 16, then if certain numerical digits appear in different digit places of the dimension columns, they will indicate that a feed rate of more than 1 inch per second is called for, and thus will indicate that a hole should be punched in the seventh column of the tape. These conditions may be tabulated as follows:

| Time in seconds: | Special symbol required |
|---|---|
| 200 | 2 – –.– – – – |
| 100 | 1 – –.– – – – |
| 50 | – 5 –.– – – – |
| 20 | – 2 –.– – – – |
| 10 | – 1 –.– – – – |
| 5 | – – 5.– – – – |
| 2 | – – 2.– – – – |
| 1 | – – 1.– – – – |

Referring to the above table it will be seen that with a time period of 200 seconds, if a distance of greater than 200 inches is called for, the predetermined velocity or feed rate will be equalled or exceeded. Thus, that condition may be detected by sensing whether or not the numerical digit 2, or one of greater value, appears in the hundreds place of a distance number. Correspondingly, it will be seen that with the time period of 100 seconds, the 1 inch per second feed rate will be equalled or exceeded if the numerical digit 1 or any digit of greater value appears in the hundreds place of any distance number. Similarly, the predetermined feed rate of 1 inch per second will be exceeded if the time interval is 50 seconds and the numerical digit of 5 or one of greater value appears in the tens place of a distance number. Further, the predetermined feed rate will be equalled or exceeded if a time period of 20 seconds has been selected and the numerical digit 2 or one of greater value appears in the tens place of a distance number. If a time period of 10 seconds has been selected and stored, the predetermined feed rate will be exceeded if the numerical digit 1, or one of greater value, appears in the tens place of a distance number. In like manner, it will be seen that the predetermined feed rate is exceeded with time periods of 5, 2, and 1 seconds if the numerical digits 5, 2 or 1 (or digits exceeding those in value), respectively, appear in the units place of any distance number.

Referring now to Fig. 17, a ground potential is placed on the terminal 118 when any of the above conditions exist. This is done by providing first means to sense the values of numerical digits typed in dimension columns. For this purpose, a contact network 120 made up of contacts controlled by the coding relays R1–R6 is connected from a ground point to a terminal 121. The network 120 is substantially identical to the network 100 appearing in Fig. 16, so that it may be seen with reference to the coding chart in Fig. 7 that the terminal 121 will be placed at ground potential whenever the coding relays are energized in any combination to represent one of the numerical digits 1–9 inclusive.

Normally open relay contacts R1*u* are connected from the terminal 121 to a second terminal 122. The terminal 122 will, therefore, be grounded whenever the coding relays are energized in a combination representing any one of the digits 2–9 inclusive.

Connected between the terminals 121 and a third terminal 123 are series-connected sets of parallel contacts R2*t*, R4*q* and R3*y*, R4*r*. With reference to the coding chart in Fig. 7, it will be apparent that the terminal 123 is placed at ground potential whenever the coding relays R1–R6 are energized in combinations to represent any one of the digits 5–9 inclusive. Thus, the coding relay contacts leading from ground to the terminals 121, 122 and 123 serve to sense whether any digit typed into the typewriter has the value between 1 and 9, between 2 and 9, or between 5 and 9, respectively.

To sense the order of any such numerical digit when it is typed into the typewriter, a stepping switch contact bank SS1A, controlled by the stepping switch coil SS1 in Fig. 14, is employed. When the wiper of the bank SS1A is at station 2, it signifies that the first character or sign symbol has been typed in a dimension column and that the next character to be typed will be the first numerical character or the one which will be printed in the hundreds place in the distance number. Similarly, when the wiper of the bank SS1A is at station 3, it signifies that the next character to be typed will be of the tens order. Finally, when the wiper of the bank SS1A is at station 4, it signifies that the next character to be typed is of the units order.

To determine the ratio between distance information represented by the coding relay contacts and the position of the wiper for the stepping switch bank SS1A, the time storage means are employed. As shown in Fig. 17, relay contacts controlled by the time storage relays of Fig. 12 are interconnected between the terminals 121–123 and the station contacts 2, 3 and 4 of the stepping switch bank SS1A. As previously indicated, if the relay R46 is energized, the time stored is of the hundreds order; if the relay R48 is energized but not the relay R46 then the time stored is of the tens order; and if neither of the relays R46 and R48 are energized, but the relay R50 is energized, then the time stored is of the units order. The significant valued digit of a stored time number is represented by energization of the relays R31, R33, or R35, if that valued digit is a 1, 2, or 5.

With the foregoing in mind, it will be understood that if the time period stored is 100 or 200 seconds, then the relay contacts R46*m* in Fig. 17 will be closed; and if the time number stored is 200 seconds, then the relay contacts R33*q* will be closed. Under these conditions, the terminal 122 is connected to station 2 of the contact bank SS2A so that if the value of the numerical digit then typed is between 2 and 9, inclusive, ground potential will appear on the wiper of the bank SS1A. This will be supplied to stations 2–6 of a contact bank SS2C controlled by the stepping switch coil SS2 in Fig. 15. Since the stepping switch SS2 is a column-sensing device, as previously explained, if the wiper of the bank SS2C is at any of the stations 2 through 6, it indicates that the typewriter carriege is operating in one of the the dimension columns. If this is the case, then ground will be supplied from the wiper of the bank SS1A to the wiper of the bank SS2C and thence to the terminal 118. This, in turn, will energize the coil 116 and actuate the device 115 (Fig. 9) to cause punching of a hole in the seventh column of the paper tape 16.

If the time period stored is 100 seconds, then the relay contacts R31*h* will be closed, and ground will be supplied from station 2 of the bank SS1A to the terminal 118, providing the numerical digit typed is between 1 and 9 inclusive. This, as illustrated by the foregoing table, will provide punching of a hole in the seventh column to indicate that the feed rate greater than the predetermined feed rate is being called for.

Further, when the wiper of the contact bank SS1A is at station 3, it indicates that the next character typed will appear in the tens place of a distance number. Station 3 of the bank SS1A is connected through normally open contacts R48*m* and normally closed contacts R46*h* to the three contacts R33*q*, R31*h*, R35*q*. If the time period stored is of the tens order, then both the contacts R48*m* and R46*h* will be closed. If the time stored is specifically 50 seconds, the relay contacts R35*q* will be closed so that the terminal 123 is placed in direct connection with station 3 of the bank SS1A. If the next character typed is one of the numerical digits between 5 and 9 inclusive, a ground signal will thus be supplied to the wiper of the bank SS1A and thence to the terminal 118 if the stepping switch bank SS2C is at one of the stations. 2–6. On the other hand, if the time stored is specifically 20 seconds, then the relay contact R33*q* will be closed and station 3 of the bank SS1A connected directly to the terminal 122. Under these conditions, if the next numerical digit typed is between 2–9 inclusive, a ground signal will be supplied to the terminal 118. Finally, if the specific time period stored is 10 seconds, station 3 of the bank SS1A will be connected directly to the terminal 121. If the next character typed is between 1–9 inclusive, a ground signal will be supplied to the terminal 118.

Now if the time period is of the units order, the relay contacts R50*q* connected to station 4 of the bank SS1A will be closed. If the wiper of the contact bank SS1A is at station 4, it indicates that numerical digits typed are of the units order, i.e., will appear in the third digit place of the distance number. If the specific time period stored is 5 seconds, then the contacts R35*q* will be closed and station 4 of the contact bank SS1A connected to the terminal 123. If the next numerical digit type falls between 5 and 9 inclusive, a ground signal will thus be supplied to the wiper of the bank SS1A and thence to the terminal 118. If the specific time stored is 2 seconds, then the contacts R33*q* will be closed and station 4 of the bank SS1A connected to the terminal 122. If the next digit typed is between 2 and 9, inclusive, therefore, a ground signal will appear on the terminal 118. Finally, if the specific time stored is 1 second, the contacts R31*h* will be closed and station 4 of the contact bank SS1A will be placed at ground potential if the next digit typed is between 1 and 9 inclusive. This, in turn, will supply ground potential to the terminal 118, and cause punching of a hole in the seventh column of the paper tape 16, assuming the wiper of the contact bank SS2C to be at one of its stations 2–6.

In summary, it will be seen that the control circuits in Fig. 17 operate to sense both the value and order of numerical digits typed in a dimension column, and to compare the distance information represented thereby with stored time numbers so that if the ratio of distance to time exceeds a predetermined feed rate, a ground signal is supplied to the terminal 118 and a special symbol or hole in the seventh column of the tape 16 is automatically punched.

In addition to providing a hole in the seventh column of the paper tape 16 when the feed rate called for exceeds a predetermined value, it is also desirable to provide that special symbol or hole in the seventh column if the stored time interval is less than the predetermined minimum time which the "computer" must have to completely process one block of information. For this purpose, the terminal 118 is connected through a series of time storage relay contacts to a terminal 128 which also appears in Fig. 13. As shown in Fig. 13, the terminal 128 connects directly to station 4 of the contact bank SS3C so that it will be grounded by the wiper of the bank SS3C as the latter steps through one complete cycle when time information is printed out from the storage. Thus, the terminal 128 shown in Fig. 17 will be grounded once each time that time information is printed on the manuscript and punched into the tape 16. If the relay contacts shown in Fig. 17 as connected between the terminal 128 and the terminal 118 present a complete path at this time, the coil 116 in Fig. 9 will be energized to cause a hole to be punched in the seventh column of the tape.

The time storage relay contacts in Fig. 17 are arranged such that they will present a complete conduction path whenever the time period stored is 1 second, 2 seconds, or ½ second. It will be seen that the series-connected contacts R46*p* and R48*p* will both be closed only if the time period stored is of the units order. If the time period stored is specifically 1 second, then the relay contacts R31*i* will be closed; if the time period stored is 2 seconds, then the relay contacts R33 will be closed; and if the time period stored is ½ second, then the contacts R36*i* will be closed. Thus, when the time period called for is either ½ second, 1 second, or 2 seconds, a special symbol or hole in the seventh column of the paper tape will be provided. This will be sensed when the tape is read into the data processing "computer" to cause the latter to automatically compensate in the event that there would not otherwise be sufficient time for the processing of blocks of information having these relatively short time periods.

We claim:

1. In a control for a typewriter intended to print successively the characters of multi-character numbers in which the first character represents a sign, the combination comprising a "zero" key, means settable to a first or a second condition for causing said typewriter to print either a space or a zero character, respectively, in response to actuation of said key, means for setting said settable means to its first condition in response to printing of a sign character, and means for resetting said settable means to its second condition in response to the printing of any significant character representing a numerical value other than zero, so that zeros are suppressed and printed as spaces after a sign character and before the first significant character in a number.

2. In a control for a typewriter intended to print successively the characters of multi-character numbers in each of a plurality of columns, the combination comprising a keyboard having a plurality of keys and means interconnecting the latter with the typewriter to cause successive printing of characters corresponding to the respective successively actuated key, a "0" key, means for normally causing said typewriter to print spaces in response to actuation of said "0" key, means responsive to printing by said typewriter of any significant character representing a numerical value other than zero for causing said typewriter to thereafter print zeros in response to actuation of said "0" key, means for selectively causing said typewriter to tabulate from one column to the next, and means for disabling said responsive means in response to tabulation of the typewriter into a new column, whereby actuation of said key before typing of the first significant character of any of said numbers result in suppressed zeros which are printed as spaces.

3. In a control for an electric typewriter having a carriage adapted to print characters in columns of a predetermined number, *m*, of digit places and to tabulate between successive columns in response to corresponding electric signals supplied thereto, the combination comprising a keyboard having a plurality of character keys and a "tab" key, first means connected between said keyboard and said typewriter for supplying signals to the latter which correspond to the actuation of respective ones of said keys, second means for preventing a tabulate signal from reaching the typewriter if said "tab" key is actuated at the beginning of a column, third means for automatically supplying to the typewriter $m$ successive signals for particular characters in response to actuation of said "tab" key at the beginning of a column, fourth means responsive to the completion of all of said sucsive signals to automatically supply a tabulate signal to said typewriter so that it steps to the next column, and fifth means for disabling said second means when any key but said "tab" key is actuated at the beginning of a column.

4. In a control for a typewriter adapted to print characters in successive columns which each contain a predetermined number, $m$, of digit places and to tabulate between successive columns, the combination comprising a keyboard having a plurality of character keys and a "tab" key, first means for causing said typewriter to print different characters or to tabulate in response to actuation of corresponding ones of said keys, second means for preventing the typewriter from tabulating if said "tab" key is actuated at the beginning of a column, third means for causing the typewriter to print successively $m$ predetermined characters in response to a single actuation of said "tab" key at the beginning of a column, and fourth means for automatically causing the typewriter to tabulate from one column to the next as an incident to the completion of printing said particular character $m$ times.

5. In a control for a typewriter adapted to print characters in successive columns which each contain a predetermined number $m$ of digit places and to tabulate between successive columns, the combination comprising a keyboard having a plurality of character keys and a"tab" key, first means for causing said typewriter to print different characters or to tabulate in response to actuation of corresponding ones of said keys, second means to sense whether any of said keys except the "tab" key has been actuated with the typewriter in any given one of said columns, third means responsive to said second means to prevent tabulation of said typewriter in response to actuation of said "tab" key unless one of the other keys has first been actuated, and fourth means controlled by said second means for causing said typewriter to print successively $m$ predetermined characters if said "tab" key is actuated once before any other of said keys is actuated in a column.

6. The combination set forth in claim 5 in which said predetermined characters are zero or an equivalent of zero, so that when no numerical value is to be printed in a column the actuation of said "tab" key at the beginning of a column automatically fills the column digit places with zero information.

7. In a control for an electric typewriter adapted to print characters in successive columns each containing a predetermined number, $m$, of digit places, and to tabulate between columns in response to respective signals supplied thereto, the combination comprising a keyboard having a plurality of character keys and a "tab" key, first means interposed between said keyboard and the typewriter for supplying different signals to the latter in response to actuation of corresponding ones of said keys, a counting device having a fixed counting cycle of at least $m$ units, second means for preventing tabulation of the typewriter and initiating free-running counting operation of said device if said "tab" key is actuated before any other of said keys in any one of said columns, third means for successively supplying signals for $m$ predetermined characters from said device to said typewriter as said device counts through one cycle, and fourth means for preventing the initiation of free-running operation of said counting device when said "tab" key is actuated if any other of said keys has been previously actuated in any one of said columns.

8. In a control for a typewriter adapted to print characters in successive columns each having a predetermined number, $m$, of digit places and to tabulate between successive columns, the combination comprising a plurality of keys including at least one control key for causing the typewriter to print respective ones of said characters and to tabulate, means for causing said typewriter to print successively $m$ predetermined characters in response to actuation of said control key at the beginning of any column, and means for disabling said last-named means if any character is typed in the column before said control key is actuated.

9. In a control for an electric typewriter having a plurality of tabulate stops for typing in any of several combinations of a plurality of columns, the combination comprising a keyboard interconnected with said typewriter and having a plurality of character keys and a "tab" key, means for electrically storing a plural digit code typed on said keyboard and printed by said typewriter and which is representative of a combination of selected columns, means responsive to the actuation of said "tab" key after typing of such code to cause the typewriter to execute a carriage return, means to sense and store each tabulate signal which is supplied to said typewriter and which causes the latter to tabulate from one column to the next so that the condition of such storage means represents the column being worked in at any time, means controlled by said code storage means and said tabulate signal storage means for supplying either one or two tabulate signals to said typewriter each time said "tab" key is actuated in a column preceding a selected or a non-selected column, respectively, means responsive to said tabulate signal storage means for converting a tabulate signal occurring when the typewriter is in the last of said columns into a carriage return signal to cause the typewriter to execute a carriage return motion, and means responsive to said carriage return signal for resetting said tabulate signal storage means.

10. In a control for an electric typewriter having a plurality of tabulate stops and responsive to tabulate and carriage return signals for making its carriage execute tabulate and return motions, the combination comprising code storage means for representing a selected combination of the plurality of columns for which the said tabulate stops are set up, a single key for controlling the tabulating and carriage return functions of the typewriter, means for sensing the column position of the typewriter carriage, means responsive to the conditions of said code storage means and said position sensing means for supplying one tabulate signal to the typewriter whenever said key is actuated and the typewriter carriage is in a column preceding a selected column, means responsive to the conditions of said code storage means and said sensing means for supplying two successive tabulate signals to the typewriter whenever said key is actuated and the carriage is in a column preceding a non-selected column, and means responsive to said sensing means for converting the tabulate signal generated when the carriage is in the last column into a carriage return signal before transmitting the same to the typewriter.

11. In a control for a typewriter having a carriage with tabulate stops to define a plurality of printing columns, the combination of means for representing a selected combination of said columns to receive typed data therein, a single key for controlling the tabulating and return motions of said carriage, means for sensing the column position of said carriage, means responsive to said representing means and said sensing means for causing said carriage to tabulate a number of times which is equal to one plus the number of non-selected columns immediately succeeding the column in which the carriage is positioned whenever said key is actuated once, and means responsive to said last-named means and said sensing means for preventing the carriage from tabulating out of the last of said columns but instead causing it to execute a return motion.

12. In a control for a typewriter having a carriage with tabulate stops to define a plurality of columns to receive printed numerical data, said typewriter carriage being controllable by "tab" and "CR" electric signals to execute tabulate and carriage return motions, respectively, the combination comprising means for sensing the column position of said carriage, a single key, and means responsive to the condition of said sensing means and the actuation of said key to supply a "tab" electric signal to the typewriter if the carriage is in any column position but the last and to supply a "CR" electric signal to the typewriter it the carriage is in the last column position.

13. The combination set forth in claim 12 further characterized in that special code information may be printed in the first of said columns, and including means for electrically storing such special code information, and means responsive to a stored condition in said code storage means and the actuation of said key for supplying a "CR" signal to the typewriter so that the latter executes a carriage return movement after printing special code information in the first column position.

14. In a control for a typewriter having a carriage movable successively to a plurality of columns in response to "tab" signals supplied thereto, the combination of code storage means conditionable to represent a selected combination of said columns to receive data printed therein and to correspondingly represent non-selected columns, means for sensing the column position of the carriage, a tab key, and means responsive jointly to the condition of said code storage means and said sensing means for supplying $n+1$ "tab" signals in succession to the typewriter when said key is actuated once, where $n$ is the number of non-selected columns immediately following the column position in which the carriage is located when said key is actuated.

15. In a control for a typewriter on which are printed numbers representative of time periods, as well as numerical codes representative of time-multipliers, the combination of means for storing and electrically representing a time-multiplying ratio when the code therefor is printed by the typewriter, means for storing and electrically representing a time period when the numbers therefor are printed by the typewriter, and circuit means responsive to the conditions of said two storage means for indicating if the value of the stored time multiplied by the stored ratio is less than a predetermined amount.

16. In a control for a typewriter on which are printed numbers representative of any one of a plurality of time periods in which successive steps of a process are to be carried out, some of said time periods being less than the minimum time for the completion of one step, the combination comprising means for printing on the typewriter and storing multiplier numbers, means for storing the time numbers when they are typed, a plurality of switch means one of which is closed when said time storing means holds a corresponding one of said time periods less than said minimum time, switch contacts in series with each of said switch means and controlled by said multiplier storage means, said switch contacts and said switch means being arranged such that a series circuit through one set of them is completed if the product of the stored time and the stored multiplier is less than said minimum time.

17. In a control for a typewriter intended to print successively numbers representing time information and numbers representing distance information, the velocity determined by the ratio of the two numbers having a maximum permissible value, the combination comprising, means to store said time numbers as they are typed into the typewriter, means to sense and represent said distance numbers as they are typed into the typewriter, and means responsive to the condition of said storing means and sensing means to indicate if the ratio of the stored to the sensed numbers exceeds said permissible value.

18. In a control for a typewriter intended to print in two columns paired numbers of time and distance, the velocity represented by the ratio of the two numbers having a maximum permissible value, the combination of means for storing each numerical digit between 1 and 9 appearing in the time number printed by the typewriter, means for storing the order of each time number digit, means for sensing electrically the value of each digit in the distance numbers as that digit is printed by the typewriter, means for sensing the order of each digit in the distance number as it is printed by the typewriter, and means responsive to said time digit and order storage means and to said distance digit and order sensing means for completing an indicating circuit if the said ratio exceeds said permissable value.

19. In a control for a typewriter arranged to print in two columns a first number representing time information and which contains a valued digit and none, one or two zeroes to represent the order assigned to that valued digit, and a second number representing distance information and which contains a plurality of digits of descending order, the velocity represented by the ratio of said two numbers having a maximum permissible value, the combination comprising time information storage means including a storage device for each possible valued digit and a storage device for each order-representing zero which are respectively actuated when a time information number is printed by the typewriter, a plurality of sensing devices energized in different combinations when each digit of a distance information number is printed by the typewriter, a counter device and means for changing the state thereof by one increment when a digit of any value is typed in each successive digit place of a distance information number to thereby represent the order of that digit, a plurality of circuits partially completed by said counter device in each of its states, means controlled by said sensing devices for further partially completing each of said circuits when the distance digit corresponding in order represented by the state of the counter device is typed and falls between predetermined values, each of said circuits further including means controlled by said storage devices for further partially completing each of said circuits when the value of the stored time number has different respective values, whereby one of said circuits is totally completed as an indication of error if the ratio of said time and distance numbers exceeds said permissible value.

20. In a control for a typewriter adapted to print the sign and the successive digits of numbers in each of a plurality of columns, the combination comprising means for sensing when the typewriter is at the beginning of a column, means for sensing when any character except that designating a sign is typed by the typewriter, and means actuated when both said sensing means are active to indicate that the first typed digit in a column is not representative of a sign and is thus erroneous.

21. In a control for a typewriter adapted to print characters in the successive digit places of a plurality of columns, and in which the first character typed in each column must be of a predetermined group, the combination comprising a circuit and means for partially completing the same only when the typewriter is at the beginning of a column so that the next character will be printed in the first digit place of the column, and means for partially completing said circuit only when the typewriter prints any character except one from said predetermined group, whereby said circuit is totally completed to indicate an error if the first character typed in a column is not included in said group.

22. In a control for a typewriter adapted to print the sign and a predetermined number of numerical digits in each of a plurality of columns, the combination comprising a stepping switch and control means for stepping it once each time a character is printed in a column and for returning it to the home position when the typewriter tabs into a column, a set of contacts which are closed only when the stepping switch is in the home column, a plurality of relays energized in different combinations each time a character is typed into the typewriter, a network of contacts controlled by said relays and closed when any but a sign character is typed into the typewriter, and a circuit including said set of contacts and said contact network in series which is closed only when the first character typed in a column is not a sign character to indicate an erroneous condition.

23. In a control for a typewriter adapted to print the successive characters in each of a plurality of columns each of which has a predetermined number of digit places, the combination comprising means for sensing when the typewriter has typed all but the last digit in a column, means for sensing when any character except one from a selected group of permissible characters is typed by the typewriter, and means actuated when both said sensing means are active to indicate that the last typed character in a column is not one of the permissible characters and is thus erroneous.

24. In a control for a typewriter adapted to print one of a plurality of characters in the successive digit places of a plurality of columns, and in which the character typed in the last digit place in each column must be one of a predetermined group, the combination comprising a circuit and means for partially completing the same only when the typewriter has completed printing of a character in the next-to-last digit place of a column so that the next character will be printed in the last digit place of the column, and means for partially completing said circuit only when the typewriter prints any character except one from said predetermined group, whereby said circuit is totally completed to indicate an error if the last character typed in a column is not included in said group.

25. In a control for a typewriter adapted to print one of a plurality of characters in each of a predetermined number of digit places in each of a plurality of columns, the combination comprising a stepping switch and control means for stepping it once each time a character is printed in a column and for returning it to the home position when the typewriter tabs into a column, a set of contacts which are closed only when the stepping switch is in that position indicating that all but the last digit place of a column has been filled, a plurality of relays energized in different combinations each time a character is typed into the typewriter, a network of contacts controlled by said relays and closed when any but an "0" or a "5" character is typed into the typewriter, and a circuit including said set of contacts and said contact network in series which is closed only when the last character typed in a column is not an "0" or a "5" character to indicate an erroneous condition.

26. In a control for a typewriter intended to print a predetermined number, *m*, of digits in each of a plurality of columns and having a "tab" key for tabulating the typewriter from one column to the next, the combination comprising accounting device connected to be actuated once as each of *m* digits are successively printed in any column, means for sensing if any character other than one which moves the typewriter to the next column is typed into the typewriter, means for indicating when said sensing means are conditioned and said counting device simultaneously stores a count of *m* to thus indicate when more than *m* digits are printed in any column.

27. In a control for a typewriter adapted to print a predetermined number of digits in each of a plurality of columns, the combination comprising means for counting the digits typed in any column, switch means closed by said counting means only after the latter has completed a count of said predetermined number, switch means closed when any character other than one to tabulate the typewriter out of a column is typed into the typewrtier, and means connecting said two switch means in series to form a circuit which is complete only when more than said predetermined number of digits is printed in a column.

28. In a control for a typewriter adapted to print a predetermined minimum number of digits in each of a plurality of columns, the combination comprising means for counting the digits typed in any column, switch means closed by said counting means until the latter has completed a count of said predetermined number, switch means closed when a character causing tabulation of the typewriter to the next column is typed, and means connecting said two switch means in series to form a circuit which is complete if too few digits are printed in a column.

29. In a control for a typewriter intended to print a predetermined number, *m*, of digits in each of a plurality of columns and to tabulate between successive columns, the combination comprising means for counting and indicating the number of digits printed in any column, means for sensing when a character which moves the typewriter to the next column is typed into the typewriter, and means actuated if said sensing means is conditioned before said counting means has counted *m* digits in any column to indicate the reception of too few digits.

30. In apparatus for applying successively to a record in coded digital form numbers representing time information and numbers representing distance information, the combination comprising, means to store said time numbers as they are applied to said record, means to sense and represent said distance numbers as they are applied to said record, and means responsive to the condition of said storing means and sensing means to apply special symbol to said record if the ratio of the stored time numbers to sensed distance numbers exceeds a predetermined value.

31. In apparatus for successively applying numbers representing time and distance and in coded digital form on a record, the velocity represented by the ratio of the two numbers having a maximum permissible value, the combination of means for storing each numerical digit appearing in the time number as the latter is applied to said record, means for storing the order of each time number digit, means for sensing electrically the value of each digit in the distance numbers as that digit is applied to said record, means for sensing the order of each digit in the digit number as it is applied to said record, and means controlled by said time digit and storage means and to said distance digit and order sensing means for applying a special code symbol on said record if the velocity ratio of the distance and time numbers exceeds a predetermined value.

32. In a control for apparatus arranged to place on a coded record successive digits of a first number representing time information and which contains a valued digit and none, one or two zeroes representing the order assigned to that valued digit, and successive digits of a second number representing distance information and which contains a plurality of digits of successively descending order, the velocity represented by the ratio of said two numbers having a maximum permissible value, the combination comprising time information storage means including a storage device for each possible valued digit and storage device for each order-representing zero which are respectively actuated when a time information number is applied to said record, a plurality of sensing devices actuated in a unique combination when each digit of a distance information number is applied to said record, a counter device and means for changing the state thereof by one increment when a digit of any value is applied to said record for each successive digit place of a distance information number to thereby represent the order of that digit, a plurality of circuits partially completed by said counter device in each of its states, means controlled by said sensing devices for further partially completing each of said circuits when the distance digit corresponding in order represented by the state of the counter device is applied to said record and falls between predetermined values, each of said circuits further including means controlled by said storage devices for further partially completing each of said circuits when the value of the stored time number has different respective values, and means actuated when one of said circuits is totally completed when the velocity ratio exceeds a predetermined percentage of said maximum permissible value to place a special symbol on the coded record.

33. In a control for coding apparatus adapted to apply successive characters in coded digital form to a record, such characters being in successive groups each containing a predetermined number *m* of characters and with each said group being separated from the next by a "tab" character, the combination comprising a keyboard having a plurality of character keys and a special "tab" key, first means for causing said coding apparatus to apply to said record different characters or to apply a "tab" character in response to actuation of corresponding ones of said keys, second means to sense whether any of said keys except the "tab" key has been actuated during the application of each group of characters to said record, third means responsive to said second means to prevent the application of a "tab" character to said record in response to actuation of said "tab" key unless one of the other keys has first been actuated, and fourth means controlled by said second means for causing said coding apparatus to apply to said record successively *m* predetermined characters if said "tab" key is actuated once before any other of said keys is actuated at the beginning of a character group.

34. The combination set forth in claim 33 in which said predetermined characters are zero or an equivalent of zero, so that when no numerical value is to be represented by a character group the actuation of said "tab" key at the beginning of the group automatically fills character places of the group with zero information.

35. In a control for apparatus adapted to apply successive characters in coded digital form to a record device, such characters being in successive groups each containing a predetermined number, *m*, of characters and with each said group separated from the next by a "tab" character, the combination comprising a keyboard having a plurality of character keys and a "tab" key, first means interposed between said keyboard and the applying apparatus for supplying different signals to the latter in response to actuation of corresponding ones of said keys, a counting device having a fixed counting cycle of at least *m* units, second means for preventing the apparatus from applying a "tab" character to the record and for initiating free-running counting operation of said device if said "tab" key is actuated before any other of said keys at the beginning of one of said groups, third means for successively supplying signals *m* predetermined characters from said counting device to said applying apparatus as said counting device counts through one cycle, and fourth means for preventing the initiation of free-running operation of said counting device when said "tab" key is actuated if any other of said keys has been previously actuated at the beginning of one of said groups.

36. In apparatus for successively applying in coded digital form to a record device successive characters, such characters being in successive groups each containing a predetermined number, *m*, of characters and with each said group separated from the next by a special character, the combination comprising a plurality of keys including a special key and means responsive to the actuation of said keys for applying the corresponding character to the record device, means for causing said applying means to apply successively to said record device *m* predetermined characters in response to actuation of said special key at the the beginning of any character group, and means for disabling said last-named means if any character is applied to the record device in a group before said special key is actuated.

37. In a control for apparatus which applies to a record in coded digital form successive numbers representing time information and numbers representing distance information, the velocity determined by the ratio of the two numbers having a maximum permissible value, the combination comprising, means to store said time numbers as they are applied to the record, means to sense and represent said distance numbers as they are applied to the record, and means responsive to the condition of said storing means and sensing means to indicate if the ratio of the stored to the sensed numbers exceeds said permissible value.

38. In a control for apparatus which applies to a record in coded digital form paired numbers representing time and distance, the velocity represented by the ratio of the two numbers having a maximum permissible value, the combination of means for storing each numerical digit between 1 and 9 appearing in the time number applied to the record, means for storing the order of each time number digit, means for sensing electrically the value of each digit in the distance numbers as that digit is applied to the record, means for sensing the order of each digit in the distance numbers as it is applied to the record, and means responsive to said time digit and order storage means and to said distance digit and order sensing means for completing an indicating circuit if the said ratio exceeds said permissible value.

39. In a control for apparatus which applies to a record in coded digital form a first number representing time information and which contains a valued digit and none, one or two zeros to represent the order assigned to that valued digit, and a second number representing distance information and which contains a plurality of digits of descending order, the velocity represented by the ratio of said two numbers having a maximum permissible value, the combination comprising time information storage means including a storage device for each possible valued digit and a storage device for each order-representing zero which are respectively actuated when a time information number is applied to the record, a plurality of sensing devices energized in different combinations when each digit of a distance information number is applied to the record, a counter device and means for changing the state thereof by one increment when a digit of any value is applied to the record in each successive digit place of a distance information number to thereby represent the order of that digit, a plurality of circuits partially completed by said counter device in each of its states, means controlled by said sensing devices for further partially completing each of said circuits when the distance digit corresponding in order represented by the state of the counter device is applied to the record and falls between predetermined values, each of said circuits further including means controlled by said storage devices for further partially completing each of said circuits when the value of the stored time number has different respective values, whereby one of said circuits is totally completed as an indication of error if the ratio of said time and distance numbers exceeds said permissible value.

40. In a control for apparatus which applies to a record in coded digital form successive characters forming the sign and the successive digits of numbers, the combination comprising means for sensing when the apparatus is conditioned to apply the first character of a number, means for sensing when any character except that designating a sign is applied to a record, and means actuated when both said sensing means are active to indicate that the first character of a number applied to said record is not representative of a sign and is thus erroneous.

41. In a control for coding apparatus adapted to apply in coded digital form to a record successive groups of characters representing multi-digit numbers, and in which the first digit of each number must be a character included in a predetermined group, the combination comprising a circuit and means for partially completing the same only when the apparatus is conditioned to apply the first digit character of a number, and means for partially completing said circuit only when the apparatus applies to the record any character except one from said predetermined group, whereby said circuit is totally completed to indicate an error if the first charatcer of a number applied to said record is not included in said group.

42. In a control for apparatus which applies to a record in coded digital form multi-digit numbers in which the first character is a sign and the following successive characters are a predetermined number of numerical digits, each multi-digit number being separated from the next by a special character, the combination comprising a stepping switch and control means for stepping it once each time a character is applied to a record and for returning it to the home position when said special character is applied to a record, a set of contacts which are closed only when the stepping switch is in the home position, a plurality of relays energized in different combinations each time a character is applied to a record, a network of contacts controlled by said relays and closed when any but a sign character is applied to a record, and a circuit including said set of contacts and said contact network in series which is closed only when the first character of any number applied to said record is not a sign character to indicate an erroneous condition.

43. In a control for apparatus which applies to a record in coded digital form the successive characters in each of a plurality of numbers each of which has a predetermined number of digit places, the combination comprising means for sensing when the apparatus has applied to the record all but the last digit character of a number, means for sensing when any character except one from a selected group of permissible characters is applied to a record, and means actuated when both said sensing means are active to indicate that the last character of a number applied to the record is not one of the permissible characters and is thus erroneous.

44. In a control for apparatus which applies to a record in coded digital form a plurality of characters in the successive digit places of a plurality of numbers, and in which the character in the last digit place in each number must be one of a predetermined group, the combination comprising a circuit and means for partially completing the same only when the apparatus has applied to the record a character in the next-to-last digit place of a number so that the next character will be applied in the last digit place of the number, and means for partially completing said circuit only when the apparatus applies to said record any character except one from said predetermined group, whereby said circuit is totally completed to indicate an error if the last character in a number applied to said record is not included in said group.

45. In a control for apparatus which applies successively in coded digital form to a record successive characters, such characters being in successive groups each containing a predetermined number, $m$, of characters and with each group separated from the next by a special character, the combination comprising a counting device and means for actuating the same once each time a character in a number group is applied to said record, means for sensing when any character other than said special character is applied to said record, and means for indicating when said sensing means are conditioned and said counting device simultaneously stores a count of $m$ to thus indicate when more than $m$ characters are applied in a group to the record.

46. In a control for apparatus which applies successively in coded digital form to a record successive characters, such characters being in successive groups each containing a predetermined number, $m$, of characters and with each group separated from the next by a special character, the combination comprising means for counting the characters in each group as they are applied to the record, switch means closed by said counting means only after the latter has completed a count of said predetermined number $m$, switch means closed when any character other than said special character is applied to said record, and means connecting said two switch means in series to form a circuit which is complete only when more than said predetermined number of characters is applied to said record in one group.

47. In a control for apparatus which applies successively in coded digital form to a record successive characters, such characters being in successive groups each containing a predetermined number, $m$, of characters and with each group separated from the next by a special character, the combination comprising means for counting the characters in each group as they are applied to the record, means for sensing when said special character is applied to said record, and means actuated if said sensing means is conditioned before said counting means has counted $m$ characters to indicate that too few characters are included in a group on the record.

References Cited in the file of this patent

UNITED STATES PATENTS

| | | |
|---|---|---|
| 2,028,747 | Horton et al. | Jan. 28, 1936 |
| 2,199,547 | Peirce | May 7, 1940 |
| 2,366,861 | Lake et al. | Jan. 9, 1945 |
| 2,590,950 | Eckert et al. | Apr. 1, 1952 |
| 2,622,141 | Oberman et al. | Dec. 16, 1952 |
| 2,781,847 | Kilheffer et al. | Feb. 19, 1957 |
| 2,784,785 | Doty | Mar. 12, 1957 |